United States Patent
Freda

(10) Patent No.: US 8,089,173 B2
(45) Date of Patent: Jan. 3, 2012

(54) WIND POWER NOZZLE WITH OPTIMIZED INTAKE LENGTH

(75) Inventor: Robert M. Freda, West Roxbury, MA (US)

(73) Assignee: V Squared Wind, Inc., West Roxbury, MA (US)

( * ) Notice: Subject to any disclaimer, the term of this patent is extended or adjusted under 35 U.S.C. 154(b) by 0 days.

(21) Appl. No.: 12/861,263

(22) Filed: Aug. 23, 2010

(65) Prior Publication Data

US 2011/0049904 A1    Mar. 3, 2011

Related U.S. Application Data

(63) Continuation of application No. 12/332,313, filed on Dec. 10, 2008, now Pat. No. 7,804,186.

(60) Provisional application No. 61/012,759, filed on Dec. 10, 2007.

(51) Int. Cl.
*F03D 1/02* (2006.01)
*F03D 9/00* (2006.01)

(52) U.S. Cl. .......................................... 290/54; 416/41

(58) Field of Classification Search .................. 290/43, 290/44, 54, 55; 416/41, 44
See application file for complete search history.

(56) References Cited

U.S. PATENT DOCUMENTS

| | | | |
|---|---|---|---|
| 2,169,165 A * | 8/1939 | Reedy | 416/9 |
| 4,110,631 A | 8/1978 | Salter | |
| 4,140,433 A | 2/1979 | Eckel | |
| 4,220,870 A | 9/1980 | Kelly | |
| 4,550,259 A | 10/1985 | Bertels et al. | |
| 4,945,693 A | 8/1990 | Cooley | |
| 5,146,096 A | 9/1992 | McConachy | |
| 5,457,346 A * | 10/1995 | Blumberg et al. | 290/55 |
| 5,623,790 A | 4/1997 | Lalvani | |
| 5,982,046 A | 11/1999 | Minh | |
| 6,100,600 A | 8/2000 | Pflanz | |
| 6,749,399 B2 | 6/2004 | Heronemus | |
| 6,932,561 B2 * | 8/2005 | Yoo | 415/4.3 |
| 7,075,189 B2 | 7/2006 | Heronemus et al. | |
| 7,293,960 B2 * | 11/2007 | Yamamoto et al. | 416/85 |
| 7,528,498 B2 * | 5/2009 | Yeh | 290/55 |
| 7,595,565 B2 * | 9/2009 | Chen et al. | 290/55 |
| 7,640,897 B2 * | 1/2010 | Gandrud et al. | 123/41.49 |

(Continued)

FOREIGN PATENT DOCUMENTS

JP    0397415    4/2003

(Continued)

OTHER PUBLICATIONS

"U.S. Appl. No. 10/985,834, Notice of Allowance mailed Jun. 3, 2010", , 10 pages.

(Continued)

*Primary Examiner* — Nicholas Ponomarenko
(74) *Attorney, Agent, or Firm* — Strategic Patents, P.C.

(57) ABSTRACT

In embodiments of the present invention improved capabilities are described for wind power nozzle configurations, comprising a throat coupled in fluid communication with a wind power generating turbine, the throat having a diameter, a leading edge distal from the throat, and an intake length between the leading edge of the nozzle and the throat of the nozzle, wherein the intake length is less than two times the diameter of the throat. In embodiments, further comprising a wind energy conversion module that includes the nozzle and the wind power generating turbine, the wind energy conversion module forming a modular portion of a modular wind energy system that includes a plurality of wind energy conversion modules.

21 Claims, 42 Drawing Sheets

U.S. PATENT DOCUMENTS

| | | | |
|---|---|---|---|
| 7,728,455 B2 * | 6/2010 | Branco | 290/55 |
| 7,777,363 B2 * | 8/2010 | Wang et al. | 290/55 |
| 7,804,186 B2 * | 9/2010 | Freda | 290/55 |
| 2003/0168864 A1 | 9/2003 | Heronemus et al. | |
| 2005/0232753 A1 | 10/2005 | Hopkins | |
| 2007/0138797 A1 | 6/2007 | Reidy et al. | |
| 2008/0152496 A1 | 6/2008 | Wobben | |
| 2008/0217925 A1 | 9/2008 | Boone et al. | |
| 2008/0258467 A1 | 10/2008 | Wilson et al. | |
| 2009/0146435 A1 | 6/2009 | Freda | |
| 2010/0090473 A1 | 4/2010 | Glass | |
| 2010/0150718 A1 | 6/2010 | Freda | |

FOREIGN PATENT DOCUMENTS

| | | |
|---|---|---|
| JP | 0397416 | 4/2003 |
| WO | WO-2009/076479 A2 | 6/2009 |
| WO | WO-2009/076479 A3 | 6/2009 |
| WO | WO-2010/045441 A2 | 4/2010 |
| WO | WO-2010068780 A1 | 6/2010 |

OTHER PUBLICATIONS

"International Application Serial No. PCT/US08/86295, PCT Search Report and PCT Written Opinion mailed Aug. 21, 2009", , 13 Pgs.

"International Application Serial No. PCT/US2009/67535, Search Report and Written Opinion mailed Mar. 23, 2010", , 13.

* cited by examiner

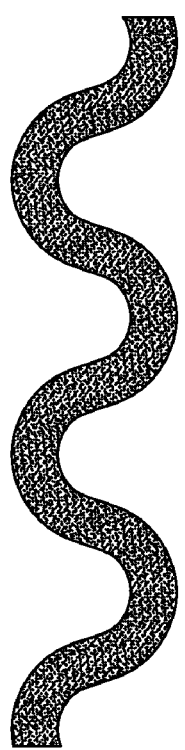
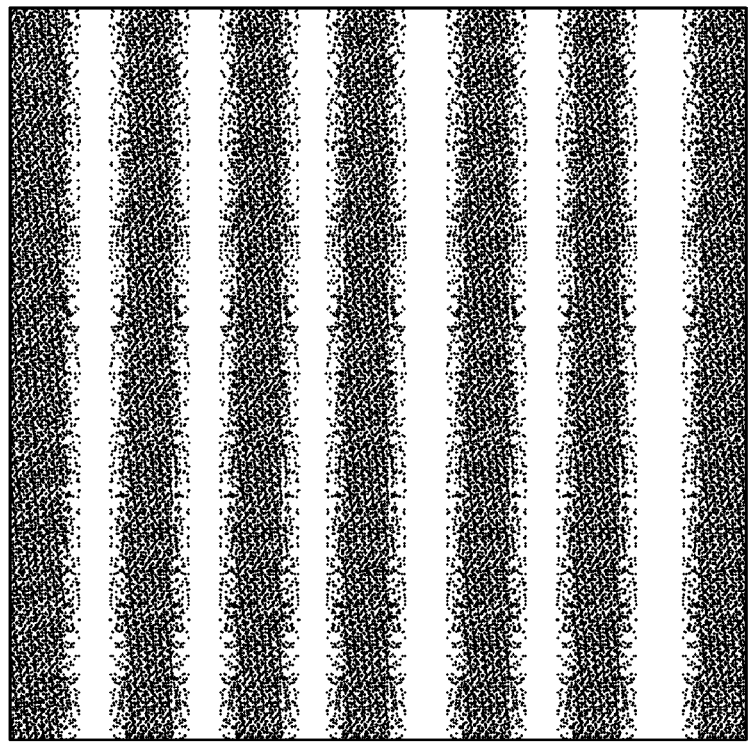

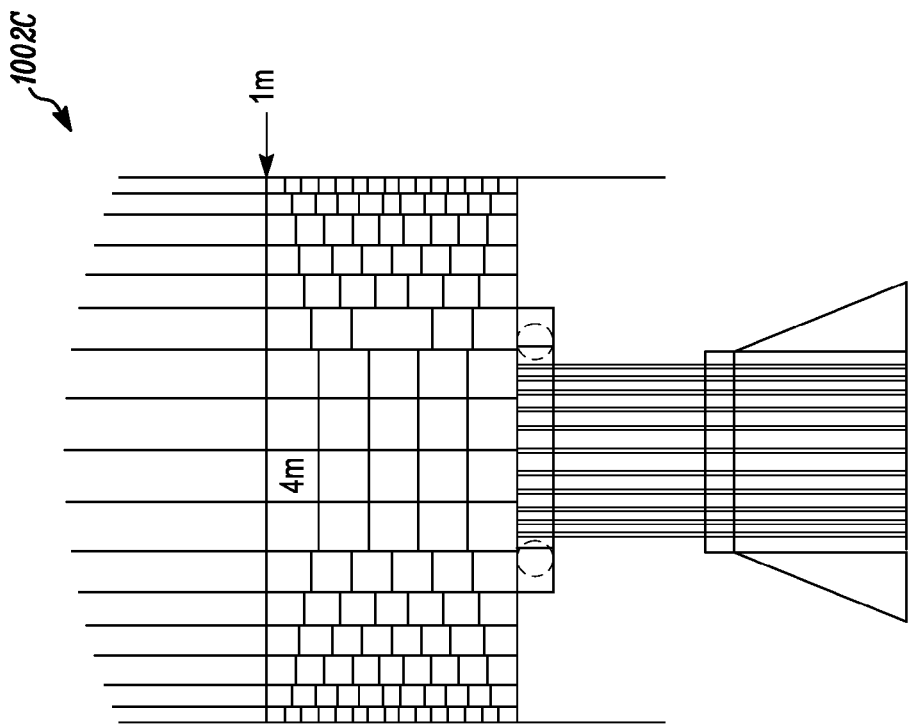
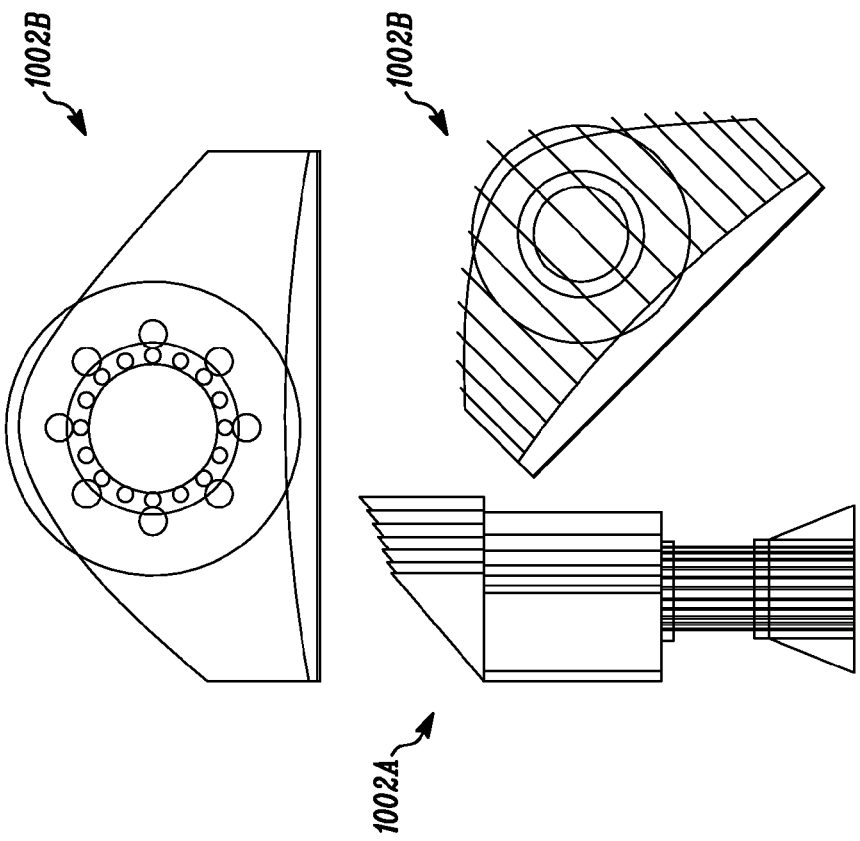
FIG. 10

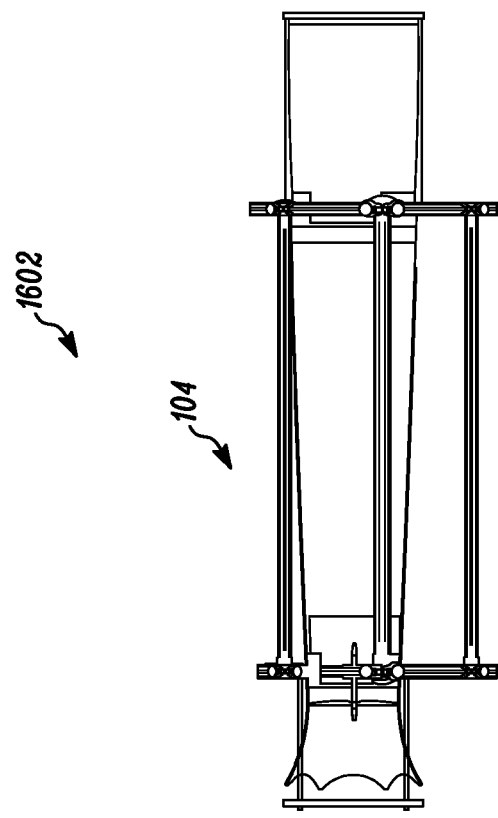
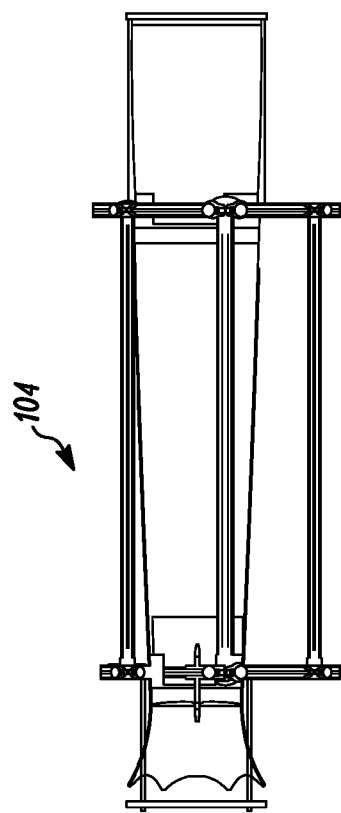
FIG. 16

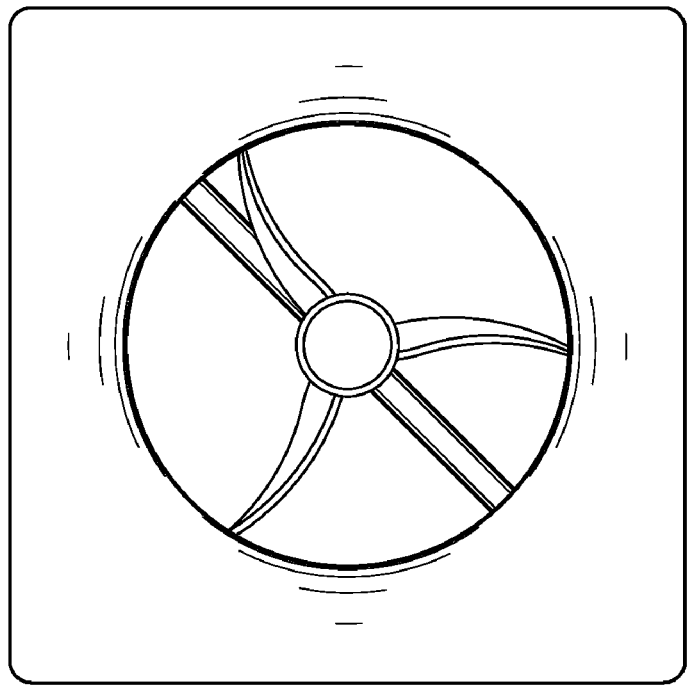
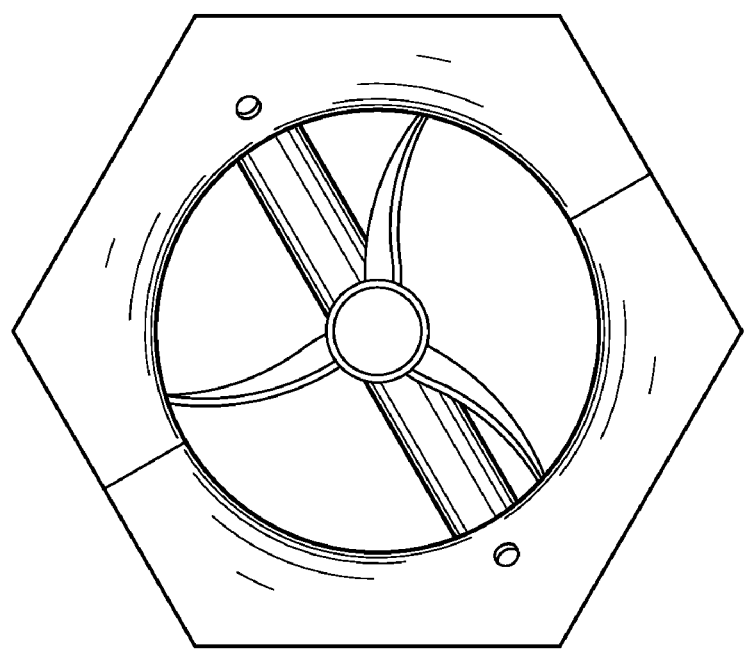
FIG. 24

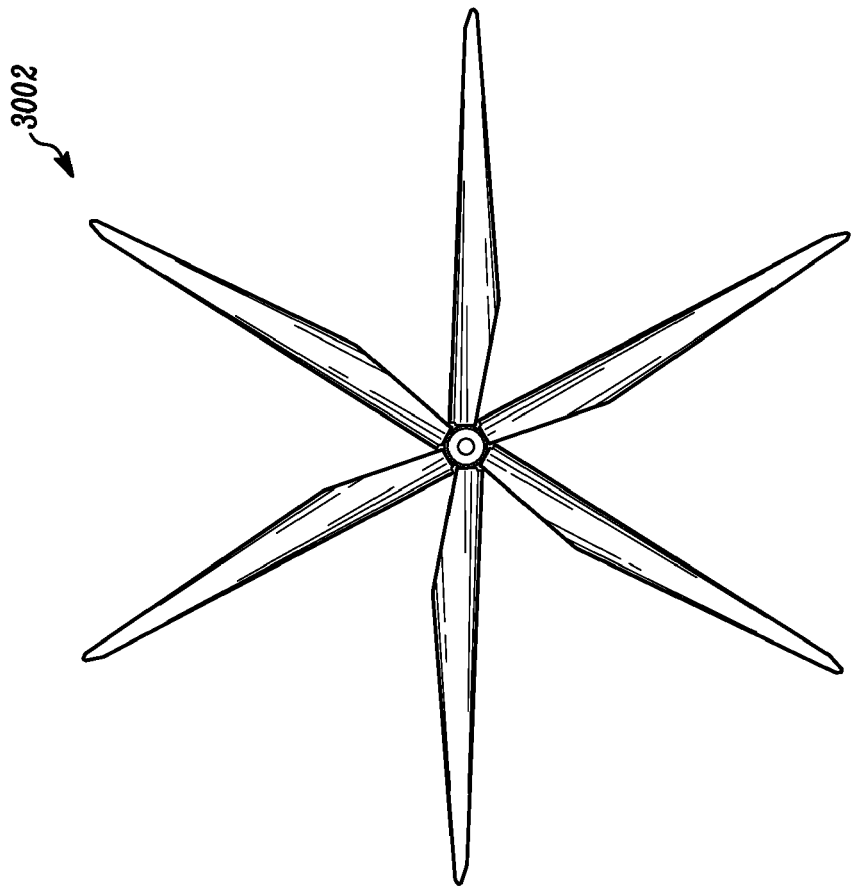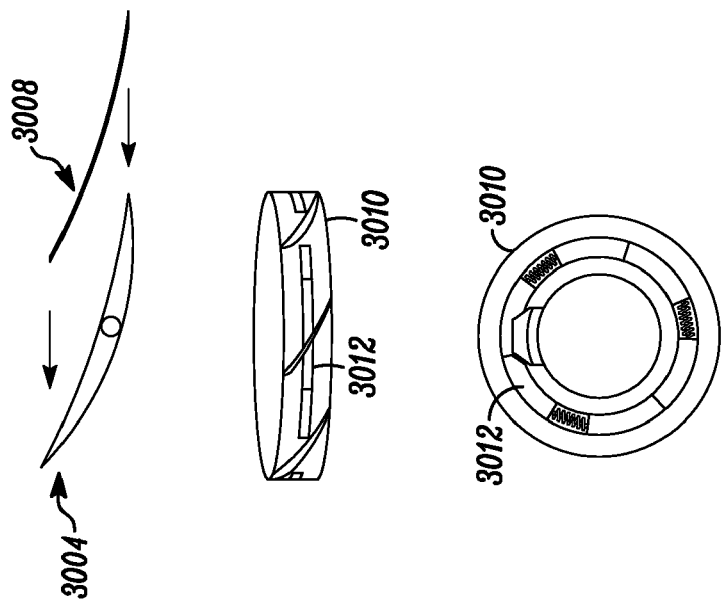
FIG. 30

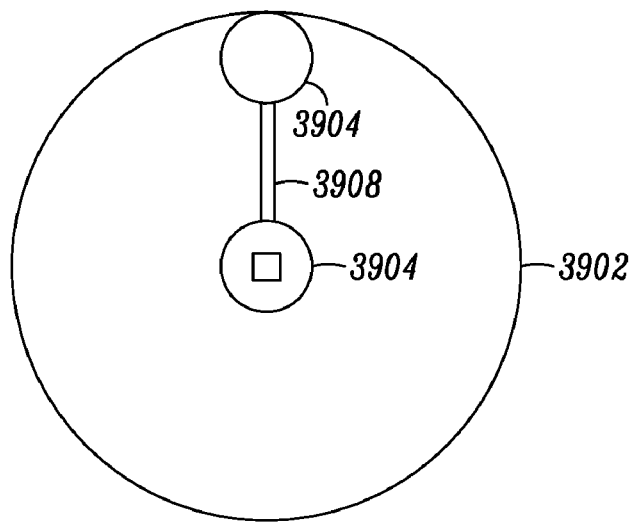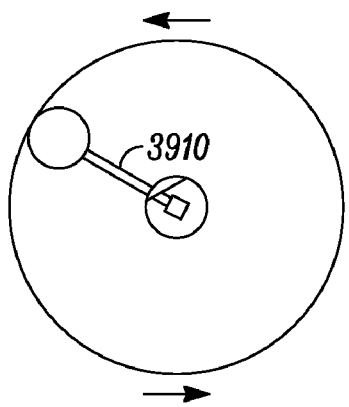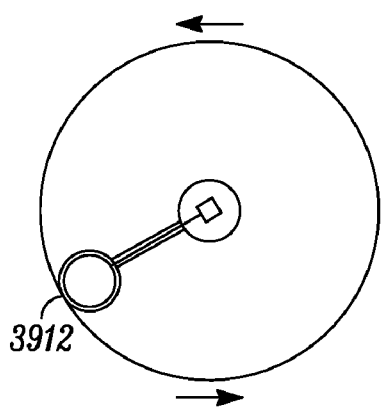
FIG. 39

WIND POWER NOZZLE WITH OPTIMIZED INTAKE LENGTH

CROSS-REFERENCE TO RELATED APPLICATIONS

This application is a continuation of U.S. application Ser. No. 12/332,313 filed Dec. 10, 2008, which claims the benefit of U.S. Provisional App. No. U.S. 61/012,759, filed Dec. 10, 2007, each of which is hereby incorporated by reference in its entirety.

FIELD OF INVENTION

The present invention is related to energy conversion, and in certain preferred embodiments to the energy conversion from a fluid flow, such as wind, to another type of energy, such as electrical energy.

BACKGROUND

The conversion of energy from a fluid flow, such as from the wind, to electrical energy has been typically implemented in the past with large singular horizontal axis turbines. The energy conversion efficiency for such a configuration may be limited. As alternate energy sources such as wind energy are increasingly utilized to counter the rising energy costs of fossil fuels, it becomes more vital that energy efficiencies associated with these alternate energy sources be maximized. A need exists for improved methods and systems for converting energy from a fluid flow to electrical energy.

SUMMARY

Improved capabilities are described for the efficiency with which fluid energy is converted into another form of energy, such as electrical energy. In embodiment, an array of fluid energy conversion modules is contained in a scalable modular networked superstructure. In certain preferred embodiments, a plurality of turbines, such as for instance wind turbines, may be disposed in an array in a suitable arrangement in proximity to each other and provided with geometry suitable for tight packing in an array with other parameters optimized to extract energy from the fluid flow. In addition, the turbines may be a more effective adaptation of a turbine, or an array of turbines, to varying conditions, including fluid conditions that may differ among different turbines in an array, or among different turbines in a set of arrays.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIGS. 6A and 6B depict linear scalloping on a surface and in profile.
FIG. 10 depicts non-uniform array with orientation tails.
FIG. 16 depicts two nozzles in a serial arrangement.
FIG. 24 depicts examples of nozzle polygon entrances.
FIG. 30 depicts a multi-blade configuration
FIG. 39 depicts a rotor consisting of a rotatable body with a central mass reservoir.

DETAILED DESCRIPTION

The present invention may include an n x m modular array having a number of energy producing modules (in certain preferred embodiments, wind turbines) arranged in the array and oriented with respect to a fluid flow, with a plurality of modular energy conversion units optimally placed in a given array configuration to maximize energy output.

Figure 1:
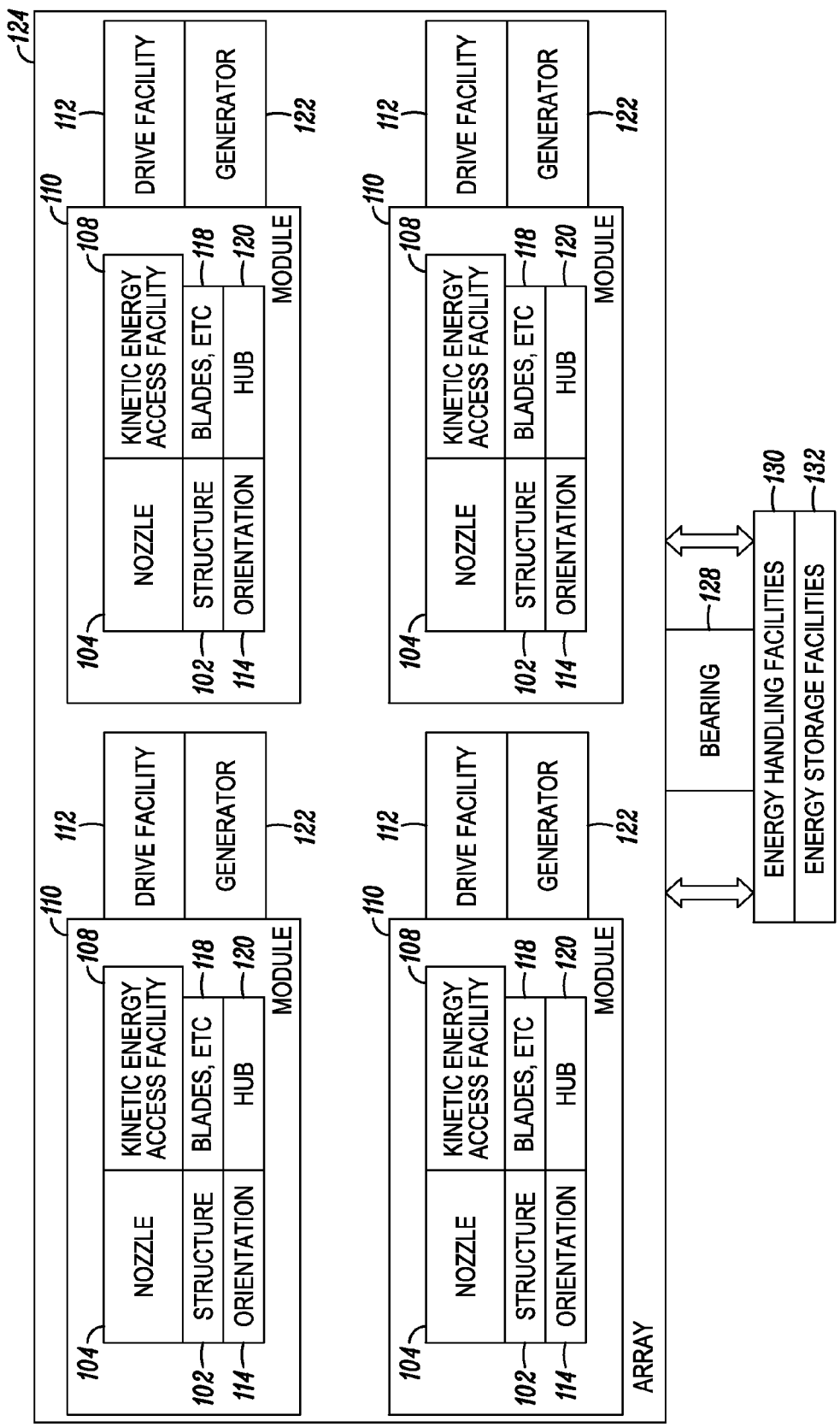
FIG. 1 depicts a kinetic access facility.

In embodiments, the fluid flow toward which the array is oriented may be preferably a natural or artificial generated differential flow, such as wind, solar chimney, a differential tunnel flow, and the like in the natural case, or in the artificial case, but may also be a "wake" flow or its inverse that is generated by a motive force, such a tide, rotation, fluid, gas displacement, and the like. FIG. 1 depicts an embodiment of the invention, showing components of four representative modules 110 in an array 124 with superstructure and electrical infrastructure, including a nozzle facility 104 (which in turn may have structural characteristics and an orientation facility), a kinetic energy access facility 108 (which may include a rotor, such as with blades and a hub), a drive facility 112 (such as a transmission drive facility), a generator 122, structure 102, orientation facility 114, blades 118, hub 120, and the like. In embodiments, the array 124 of modules 110 may be associated with an integrated or non-integrated superstructure and electrical infrastructure that may interface with energy handling facilities 130 and energy storage facilities 132. It should be understood that any number of modules 110 might be provided in an array 124, with optimal arrays 124 possibly including far more than four modules 110.

As depicted in FIG. 1, a bearing 128, such as a ball roller bearing, and the like, or such as a material property bearing, such as a Teflon bearing or the like, or a fluid bearing, magnetic bearing, monolithic bearing such as a cone/ball bearing, and the like, or some combination bearing having all or a portion of the properties of these bearings may be used to support an array of modules, such as to allow the array to rotate about a vertical axis, allowing the array to be oriented (or to self-orient, as described below in certain preferred embodiments) with respect to a direction of fluid flow. In the case where a magnetic bearing or similar bearing structure is used, the bearing structure may generate additional energy either for immediate use or for temporary storage. The drive facility and generator may be associated with an electrical infrastructure including a conducting medium such as conductive metals, conductive fluids, and the like, such as magnetorhetological fluids, ferrofluid, superconductors, and the like, or a conducting gas., which may be integrated or associated with the superstructure of the array, so that energy from the modules may be passed to an external energy handling facility, and optionally to a local or global energy storage facility, such as a flywheel, compressed air, gravitational storage (pumping fluid, gas or solids up a height differential), battery, plurality of batteries, and the like to an energy conversion facility, such as an electrolysis hydrogen and oxygen production facility, or some combination of transport, end-use, storage, facilities, and the like. In embodiments, the magnetic properties associated with electrical distribution or transmission system may be utilized to help orient the array, such as in generator rotor (e.g. use the magnetic properties of the electrical flow to excite a stator that contains the transportation facility).

Figure 2:
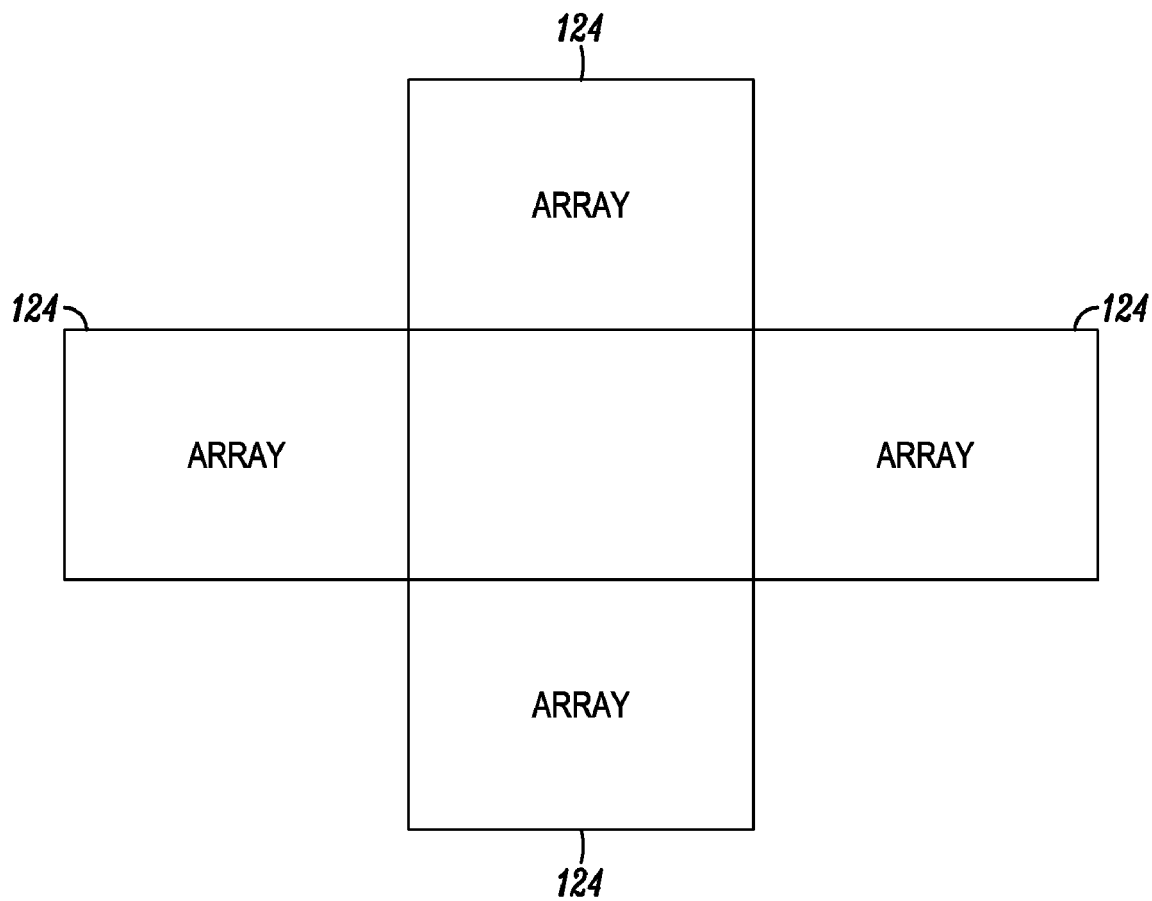
FIG. 2 depicts a kinetic access facility array.

Referring to FIG. 2, arrays 124 such as those described in connection with FIG. 1, each containing a plurality of modules 110, may in turn be configured into a plurality of arrays 124, arranged with respect to each other and oriented with respect to a direction of fluid flow. FIG. 2 shows one possible view of four arrays 124 configured in a checkerboard pattern, which is one preferred embodiment of a grouping of arrays 124. In embodiments, arrays 124 may be arranged in a number of combinations, such as the checkerboard described herein, which may use a matrix to divide a given site. One option may be a diamond pattern with spacing ranging from the 1×1 checkerboard implementation to an n×m implementation where the 1–n may refer to the number of cells by which the diamond is formed. Another option may be a curved arrangement wherein the rate of curvature can range from 0 to 1 with the spacing structure ranging from 1 to n. Alternatively the matrix may be filled completely dependent on the particular properties of the arrays deployed in the formation. Additionally the arrays may be co-mounted on singular substructures in any of the distributions of machines described herein. In embodiments, the present invention may provide an array of nozzles adapted to generate electrical power from the flow of air. The array may be configured with arrays located in a matrix arrangement with a plurality of similar arrays, such as embodied in a checkerboard pattern, a diamond pattern, a regular pattern, an irregular pattern, a curved pattern, filled pattern, and the like.

Figure 3:
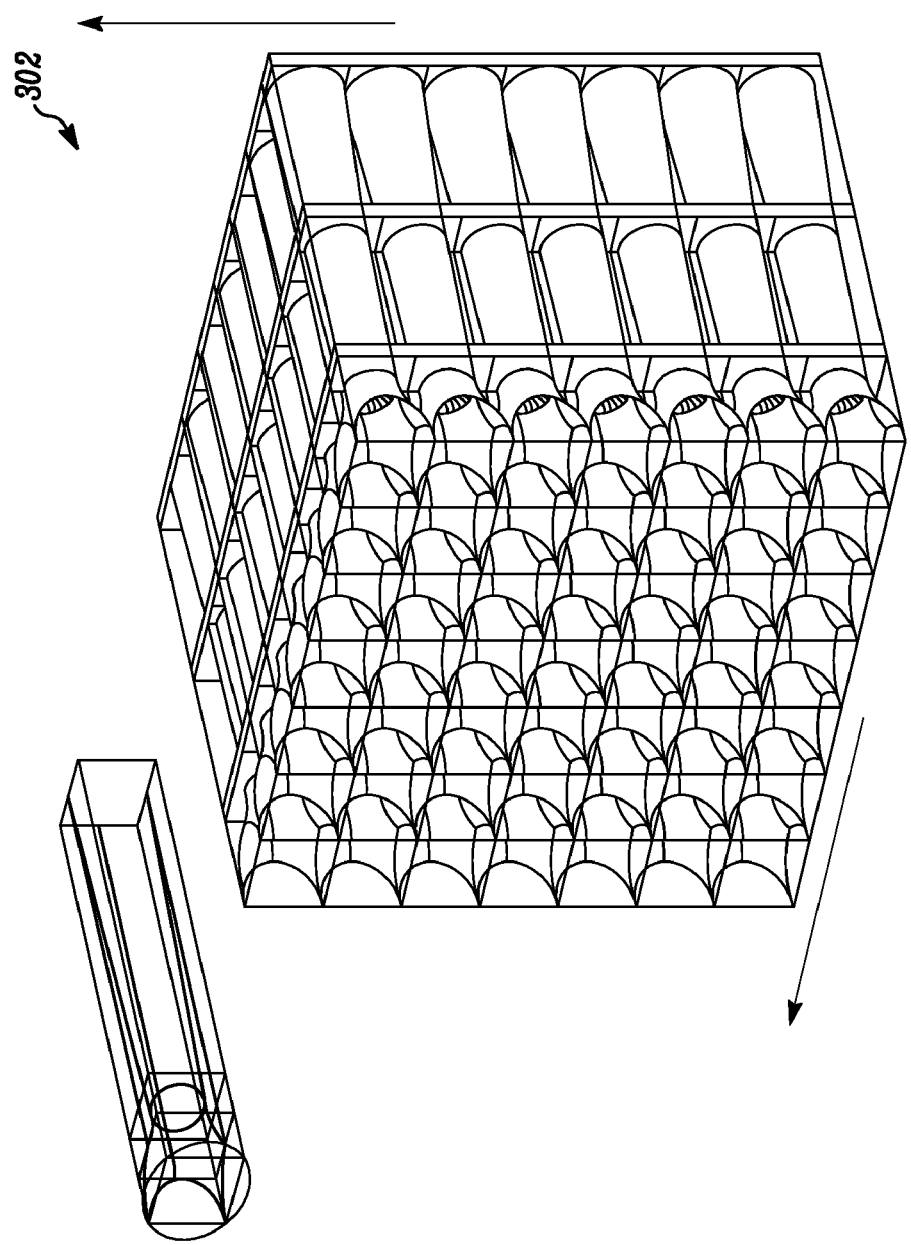
FIG. 3 depicts a square polygon expansion exit, module, and array.

As shown in FIG. 3, the n×m modular array 302 may be comprised of a scalable modular networked superstructure providing both support for at least one module and the facility for power control, management, and collection of power from individual modules, and conversion and transfer of said power to either a plurality of storage units, a grid, or a combination thereof. In embodiments, the present invention may provide an array of nozzles adapted to generate electrical power from the flow of air, where the array may be supported by a scalable modular superstructure. The superstructure may be a modular assembly employing a shape such as a space frame type, geodesic, orthogonal, and the like. The superstructure may be of a nozzle-structural integrated type, such as a flexible pressure based integrated structure, a rigid cell integrated structure, and the like. The superstructure elements may be connected by a connection facility such as a weld, a glue, a contact fusing facility, a locking mechanism, and the like. In embodiments, the superstructure may include structural components and connectors which can be assembled on-site. The superstructure and its elements may have a complex local and global 3 dimensional topography, such as to maximize load bearing properties, minimize material use, minimize material weight, and the like. Structural members of the superstructure may have a uniform circular profile, polygonal profile, elliptical profile, square profile, triangular profile, n-pointed star profile, and the like. Structural members of the superstructure may have a variable profile, such as with linear scalloping, radial curvature variability, elliptical curvature variability, square variability, and the like. The members of the superstructure may be an isotruss type variable solidity structure. The elements of the superstructure may include at least one of a polymer, composite, metallic foam, composite foam, alloy, and the like.

Figure 4:
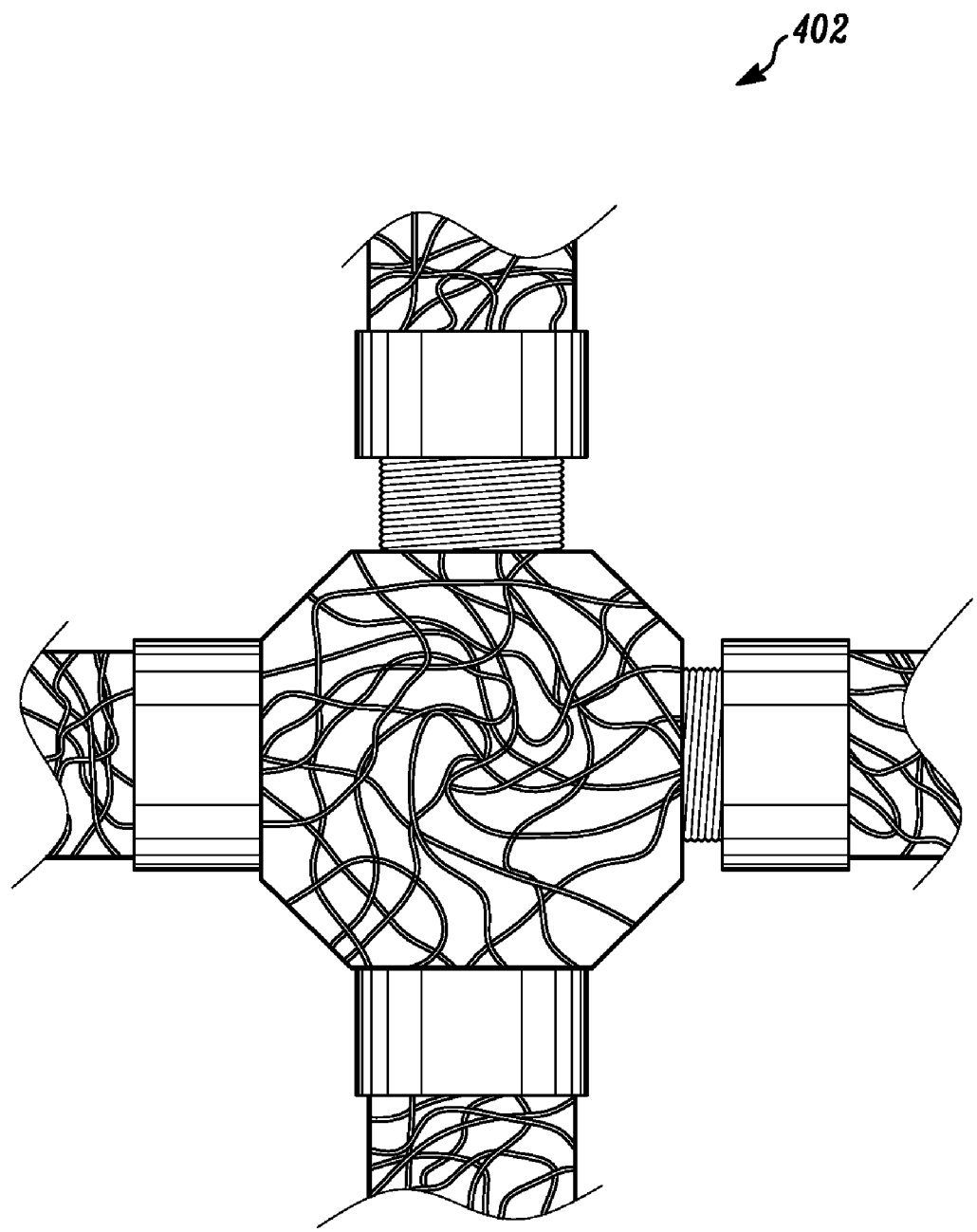
FIG. 4 depicts a complex topography connector and members.

FIG. 4 shows an embodiment of a complex topography connector and members 402. In embodiments, this may provide an example of complex mold topography intended to reduce material use and maximize structural properties, and take the form of surface structures, profiles, variable solidity structures, and the like.

Figure 5A:
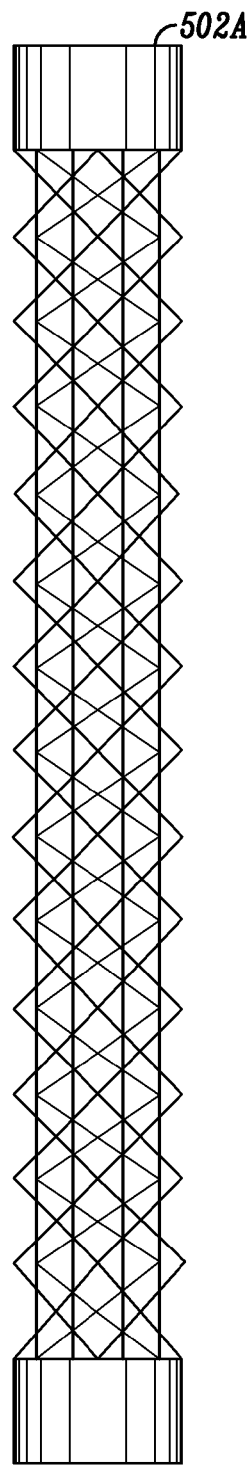
FIGS. 5A and 5B depict examples of structural members of variable density and profile.
Figure 5B:
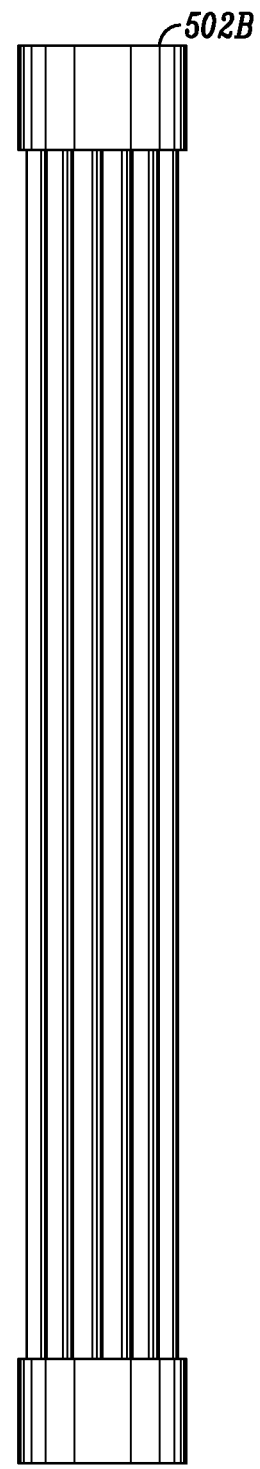

FIGS. 5A and 5B show embodiments of structural members 502A and 502B. These examples may be of structural members of variable density and profile. These may represent a subset of possible complex topography members. For example, the member 502A one on the left may be made by filament winding, and the member 502B to the right may be extruded or molded fiber reinforced plastic.

FIGS. 6A and 6B shows an embodiment of linear scalloping, such as for a wall nozzle, structural member, and the like. This may provide a complex wall for the nozzle, structural member, and the like. The depiction of linear scalloping 602A to the left represents a scalloping surface orientation, and the depiction of linear scalloping 602B to the right represents the scalloping in a profile view.

The superstructures, may be self-orienting (such as due to the shape of the nozzle) and may include methods or systems to mechanically (as described herein) or otherwise control the orientation of the array, or of a module within the array, with regard to the direction of the fluid flow in a fixed implementation. Methods of mechanical orientation may include yaw motors, stored energy flywheels, and the like, or other methods known in the art. Alternately, they may be mounted onto a mobile platform to seek out optimal flow conditions. In embodiments, the present invention may provide an array of nozzles adapted to generate electrical power from the flow of air. The array may include self-orienting nozzles, self-orienting nozzles configured with a non-mechanized element that uses airflow to orient the nozzles, self-orienting nozzles with independent orientation at different locations in the array, and the like. The array may include a nozzle capable of orientation to a vertical component of airflow. In embodiments, the present invention may provide a nozzle adapted for use in a wind power generating turbine. The nozzle may be configured to be capable of orientation to a vertical component of the wind. In addition, the nozzle may be self-orienting relative to the direction of the wind, such as when there is a tail on the nozzle.

The superstructure may be supported by a number of methods and systems depending on the nature of the flow, such as floatation suspension, tower/towers, building integration, cable suspension, and the like. Additionally arrays may be fabricated of materials that enable a lighter than air implementation. In embodiments, the present invention may provide an array of nozzles adapted to generate electrical power from the flow of air, where the array may be supported by a scalable modular superstructure. The superstructure may be a suspension type of superstructure, supported by a lighter-than-air mechanism, and the like. In embodiments, the present invention may be mounted on land or at sea, attached to existing structures such as a building, bridge, tower, and the like, or stand alone as a dedicated structure.

The superstructure may be executed as a separate modular support structure inclusive of the method of load bearing and power distribution. The superstructure elements may also be integrated into the nozzle structure such that the module becomes a wholly contained element. In this case the preferred superstructure may provide a columnar method of plugging the integrated module into the power system. In embodiments, the present invention may provide an array of nozzles adapted to generate electrical power from the flow of air, where the array may be supported by a scalable modular superstructure. The superstructure may be of a variable type, such as with regard to load bearing properties, structural properties, and the like. The elements of the superstructure may be of a uniform type with regard to load bearing properties, structural properties, and the like. The elements of the superstructure may be variably adapted to the lowest cost solution for local load bearing parameters within the array. In embodiments, the superstructure may be rigid, may have global flexing mechanisms to accommodate live loading, may have local flexing mechanisms to accommodate live loading, and the like.

Figure 7:
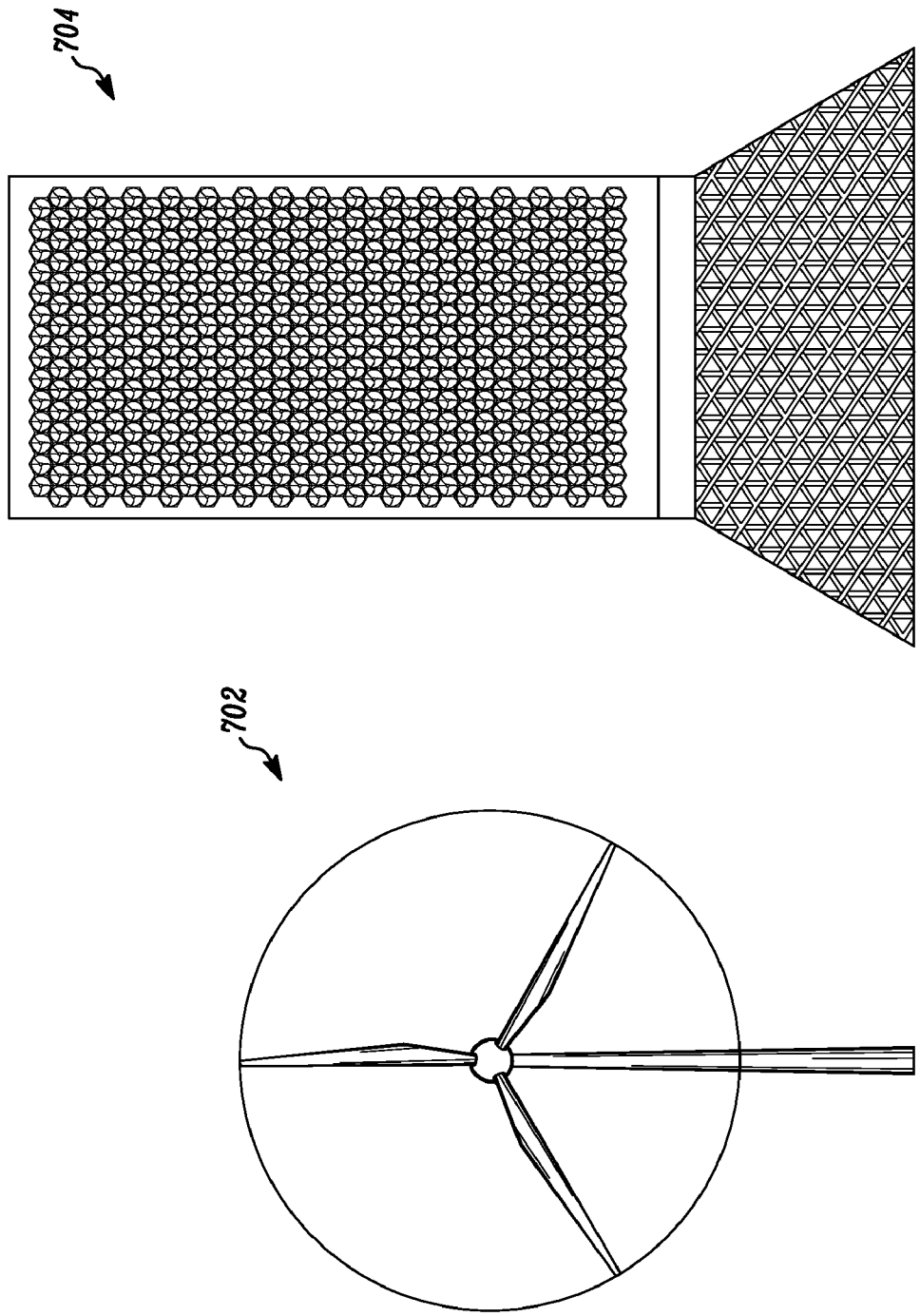
FIG. 7 depicts an 85 m×51 m uniform array compared with the same area of a 75 m horizontal axis wind turbine.
Figure 8:
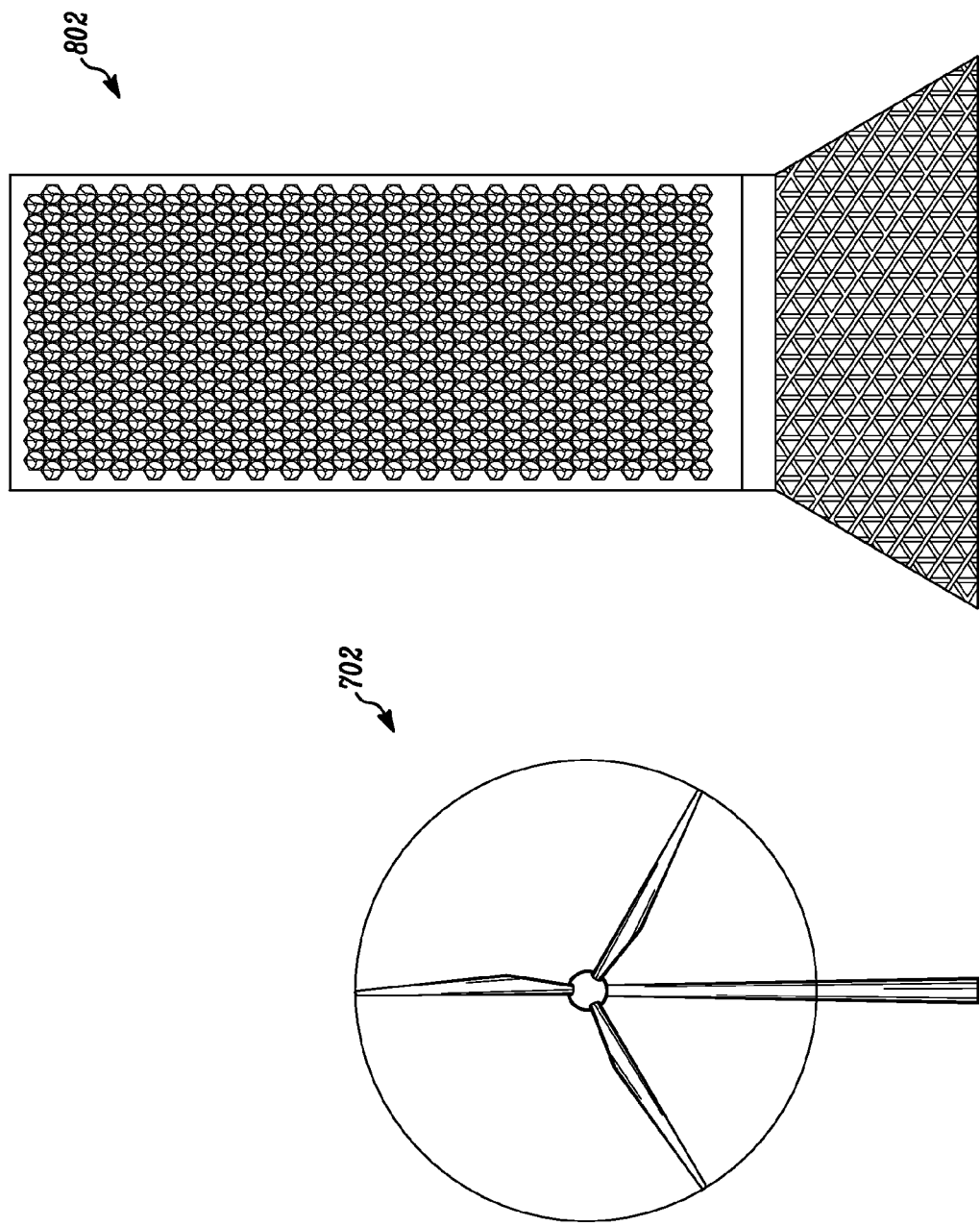
FIG. 8 depicts a 100 m×44 m uniform array compared with the same area of a 75 m horizontal axis wind turbine.

As shown in FIG. 7 and FIG. 8, the array implementation may provide various advantages. First it may allow the modules to cover any given area without being subject to the inefficiency introduced by the length of an efficient divergent component. Secondly the implementation need not be uniform as in a horizontal-axis wind turbine (HAWT). By housing the n×m modular array in such a superstructure, the structural upper limit of flow area or plane a system can cover and gather energy from may be substantially increased. By covering, say, a rectangular area, the upper rows of an array may be producing energy, if wind is the medium, potentially at a substantially faster mean velocity than lower modules (because the wind is greater at the top of the array than it is closer to the ground). This means that in addition to the increases engendered by the modules, the array structure itself may engender an increase. In this regard, if the medium is wind, a structure wherein the height is greater than the width may be the most efficient use of the plane for energy production with the multiple of power production increasing as the height value increases from a baseline wherein the height value is less than the width value. For example, both FIG. 7 and FIG. 8 depict a HAWT 702 that has a 75 meter diameter circular sweep area of approximately 4400 sq. m., and with a hub height of 50 m with a wind speed of 6 m/s. In FIG. 7 the array implementation 704 has an equivalent swept area provided with a 50 meter wide array area with the lowest row at 30 meters and wind speed of 5.4 m/s, and an upper row at 117 meters with a wind speed of 7.6 m/s. In FIG. 8, the same swept area is accommodated with an array implementation 802 of the same lower height and wind speed, but this time with a narrowing 44 m width and higher upper row, now with an elevated wind speed f 8.1 m/s. In embodiments, the present invention may provide an array of nozzles adapted to generate electrical power from the flow of air. The array may be of variable width at different heights. The depth of the array may be less than or equal to the width of the array, such as greater than or equal to the width of the array, more than about 1.25 times the width of the array, more than about 2 times the width of the array, and the like.

In this system the dynamic pressure acting on the structure may be distributed equally through the structure as opposed to being focused on a propeller root or tower as in most horizontal axis machines thereby expanding the overall swept area that can be covered per linear foot of machine width. Additionally, nozzle efficiency may reduce dynamic pressure on the structure. The determination of the number of modules in a given array implementation may be predicated on the necessary nozzle length ratio, structural loading, and desired energy output.

Some array geometries, such as rectangular/square, triangular, trapezoidal, or a combination or inversion thereof (e.g. and inverted trapezoid or a hexagon), in the x,y dimensions may maximize wind plane usage relative to cost. Note that a non-uniform x,y implementation would also fall within the scope of the present invention. Structure in the z dimension may be implemented as a uniform or non-uniform plane, with curvature either of equal or variable depth, or the like. An array of dimensions wherein said wind facing plane is equal to or greater than the depth may provide improved performance in terms of area utilization. In embodiments a configuration wherein the flow-facing width of the machine is greater than depth may provide similar plane coverage as freestanding rotor systems.

FIGS. 9A and 9B depict a series of arrays side and front elevations 902A and 902B. In addition, superstructures may be mounted to a platform singly or in series in the z dimension.

Modules mounted in the superstructure may be comprised of a nozzle configuration, a single or plurality of energy capture device/s, a single or plurality of flow enhancement surface structures, and the like. The modules and modular elements of the superstructure may be "plug and play" devices allowing maintenance or refitting of the array components to be performed on- or offsite.

Module nozzle geometry may be optimized, based on unique intake-to-throat geometry, exit geometry, volumetric ratios, and a revised theory of fluid dynamic forces, to maximize plane usage, minimize forward and inlet overpressure, entrain and accelerate high percentage flows with at least one optimized fascia to maximize flow establishment, and the like. The nozzle may further be of variable geometry to adapt velocity conditions in the nozzle configuration relative to ambient velocity conditions and help stabilize said velocity within a desired operating range. The variable intake geometry and nozzle configuration geometry may be executed as a single fascia or with a plurality of dependent and independent fascia depending on module size and/or the properties of a given fluid. In embodiments, the present invention may provide an array of nozzles adapted to generate electrical power from the flow of air. The array may include nozzles of variable size, nozzles of variable type, and the like. For instance, variation may relate to constriction rates of the nozzles and or the power generation characteristics of the nozzles. The array may include nozzles of a shape represented by truncation of a catenoid and the nozzles shaped to facilitate air flow at the entrance of the nozzles. The array may be a packed array of nozzles of variable intake shapes, such as hexagonal intake shapes, triangular intake shapes, square intake shapes, octagonal intake shapes, and the like.

Nozzles additionally may be implemented in either single or multistage configurations inclusive of reaccelerating or pressurizing a fluid flow within or exterior to the module for additional use in energy production. Both uniform and non-uniform execution of the array with regard to nozzle geometry and constriction fall within the scope of the invention. In embodiments, the present invention may provide an array of nozzles adapted to generate electrical power from the flow of air. The array may include nozzles configured in series relative to the direction of airflow, configured in a nested series, and the like.

Module energy conversion may be comprised of a plurality of kinetic energy conversion devices, such as single or multi-blade rotors, or other facility for kinetic energy conversion, coupled with a facility for producing a usable form of power such as a generator, a transmission and a generator, multiple generators and a usable form of power electronics, and the like, to control the loading parameters under which the conversion facility operates and to convert or condition the power produced into a usable form by whatever end-use facility may be intended, such as a local grid, national grid, storage, or the like. In embodiments, the conversion may be devices adapted specifically to the optimized and variable properties of the nozzle configuration and module design, wherein the KE conversion and energy producing devices may be integrated to the particular parameters of an embodiment to optimize use of the flow.

To maximize energy production relative to cost across a broad range of wind velocities, a variable blade number rotor may be used as the method of kinetic energy (KE) conversion. In the case of a variable blade number rotor, a self- or mechanically folding blade design may be used, wherein the number of blades is reduced by slotting a divisible number of blades into the preceding blades in the series. Rotors with different numbers of blades and different profiles may have performance profiles that closely fit a given flow velocity range. Since it is desirable to optimize the power output of a flow driven power device, a rotor that adapts the disc solidity presented to the flow may be more efficient at gathering power in the lower speed regimens, and/or under high load conditions, than a fixed solidity rotor. A variable solidity rotor may have a plurality of prime number rotors sets, for example 2, 3, 5, and the like. Rotor sets may be mounted to a series of dual position slip rings wherein when the dynamic force on a given set is exceeded the ring may be released and dynamic force on the blades may shift it to a closed position on the following set of blades. In embodiments, a mechanism may be slotted on closure such that when the dynamic force on the closed blade sets indicates a drop in velocity the blade set is released to open position. In embodiments, the present invention may provide an array of nozzles adapted to generate electrical power from the flow of air. In embodiments, a rotor may be configured to operate within a wind power generating turbine, where the rotor is configured to present a variable number of blades. In embodiments, the number of blades on rotors of nozzles of the array may vary from one nozzle to other nozzle.

Additionally an "inertial" rotor is described wherein the rotational momentum of the blades may be manipulated to alter the inertia of rotor.

Additionally the rotor generator relationship may be executed as in a HAWT wind turbine, with the generator or generators receiving their motive force from a central shaft either directly or through a geared design, as a fully integrated implementation, as an integrated component, and the like.

In a fully integrated implementation the nozzle itself may constitute the generator, wherein the rotor blades may be manufactured as induced, excited, permanent magnet rotors, or with a magnetic fluid such as magneto-rheological fluids and the stator is integrated into the nozzle mold, and the like. An alternative implementation may be one wherein the rotor is attached to a magnetic bearing of the same diameter as the throat to generate power. Another may be the rotor attached to a bearing of the same diameter as throat that is geared on the outward face to drive a plurality of generators surrounding the throat area.

Pressure gradient (PG) enhancement devices/techniques may be used throughout modules and the superstructure to perform the task of both local and global gradient enhancement with respect to flow through the modules and superstructure. PG enhancement may be performed by utilizing properties of thermo and fluid dynamics to create regions of additional fluid sparsity thereby engendering enhanced local and global gradient differentials and allowing the establishment of higher percentage flows through a given module configuration. In addition, a method of achieving directional suction pressure may also be used to enhance the rate of system flow.

Due to the wake profile of the nozzles they may be placed in a wind-farm array in a series of more efficient patterns than is possible with current generation technology, as described herein. For instance, a filled or binary checkerboard pattern may maximize cost to benefit and land use. Additionally, a method of efficient energy storage and integration of buildings and arrays is disclosed herein.

Figure 9:
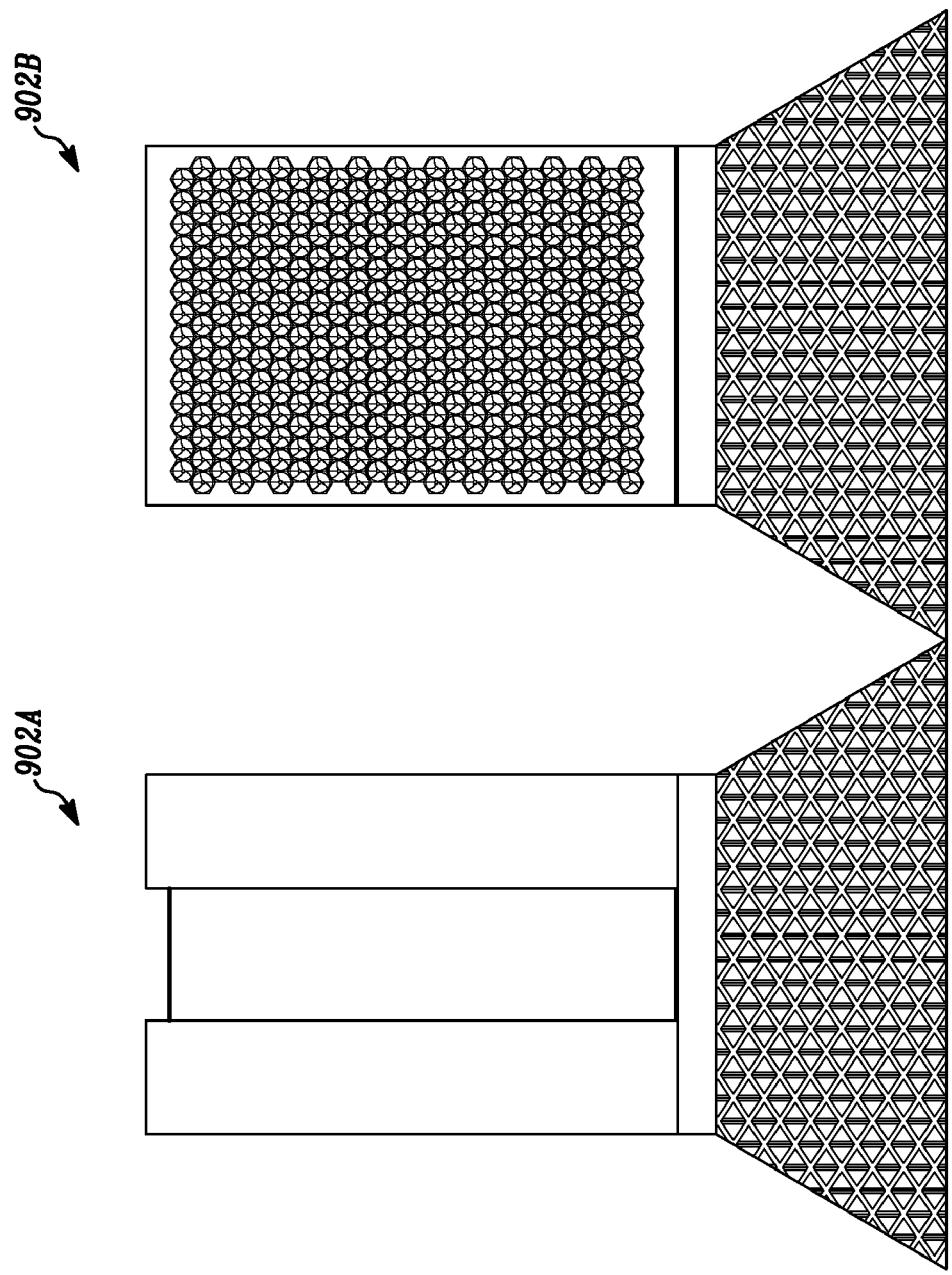
FIGS. 9A and 9B depict a series of arrays side and front elevations.
Figure 11:
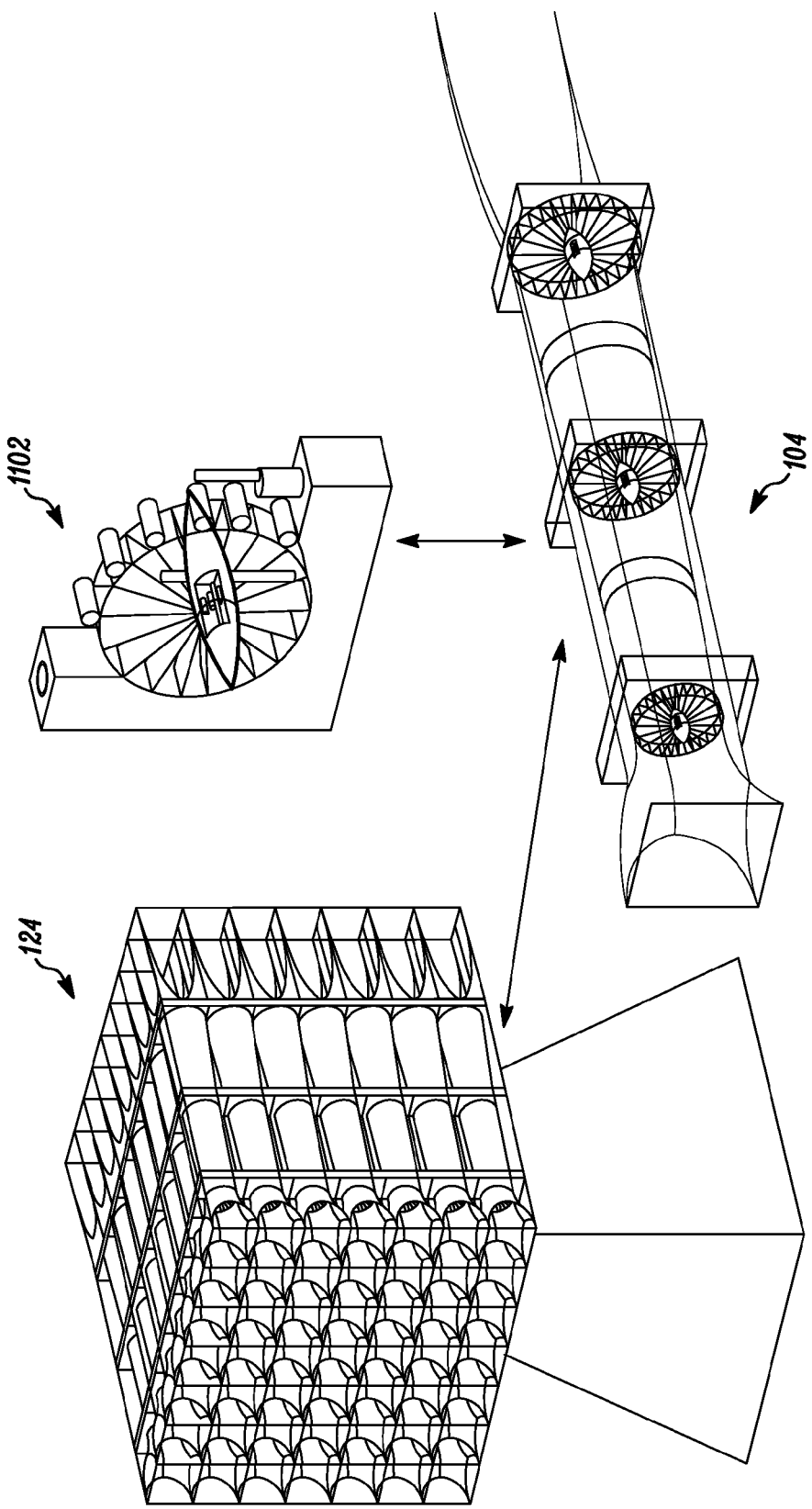
FIG. 11 depicts an array with three integrated generators.
Figure 12:
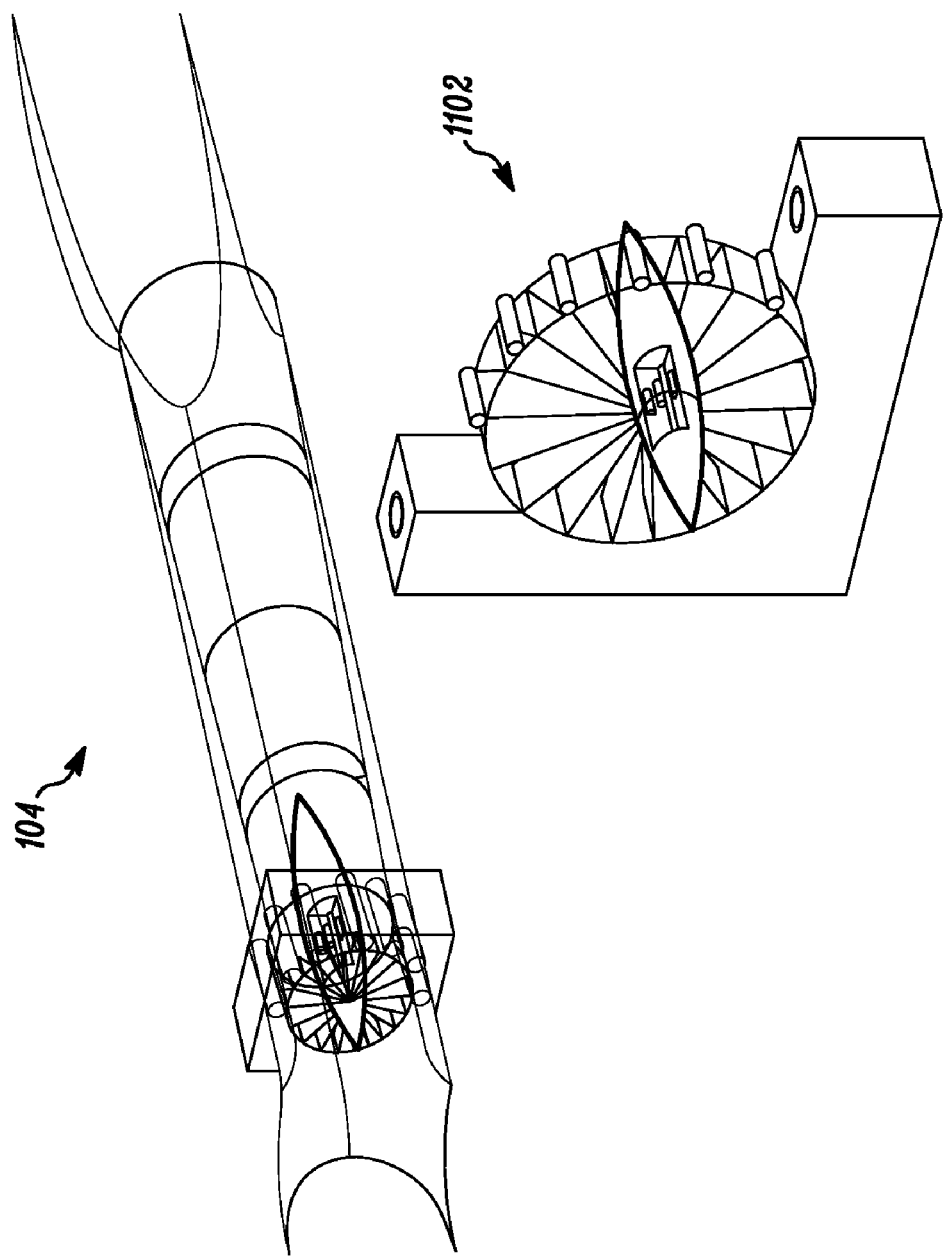
FIG. 12 depicts an integrated generator-module example.
Figure 13:
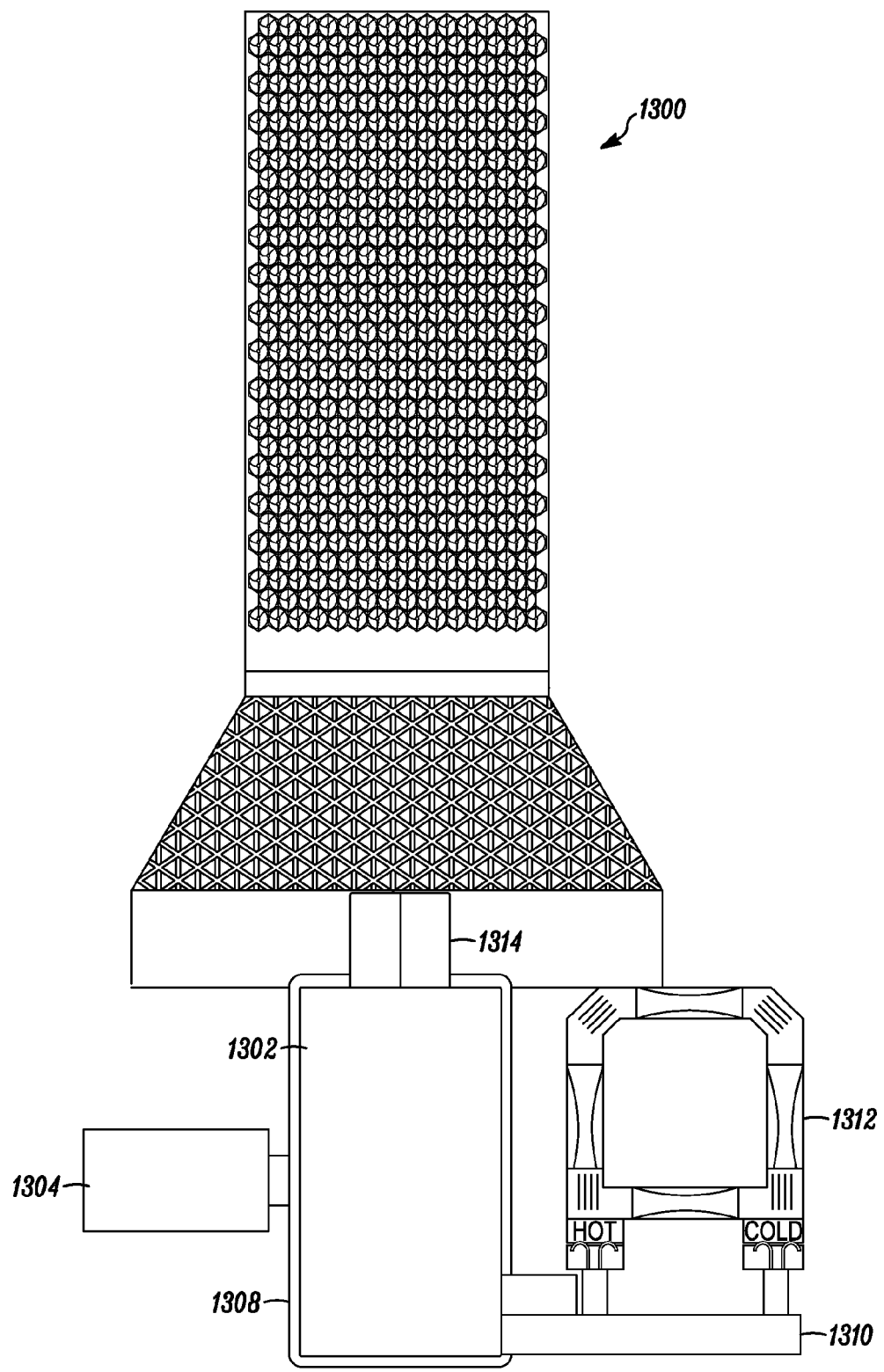
FIG. 13 depicts an array with storage.
Figure 14:
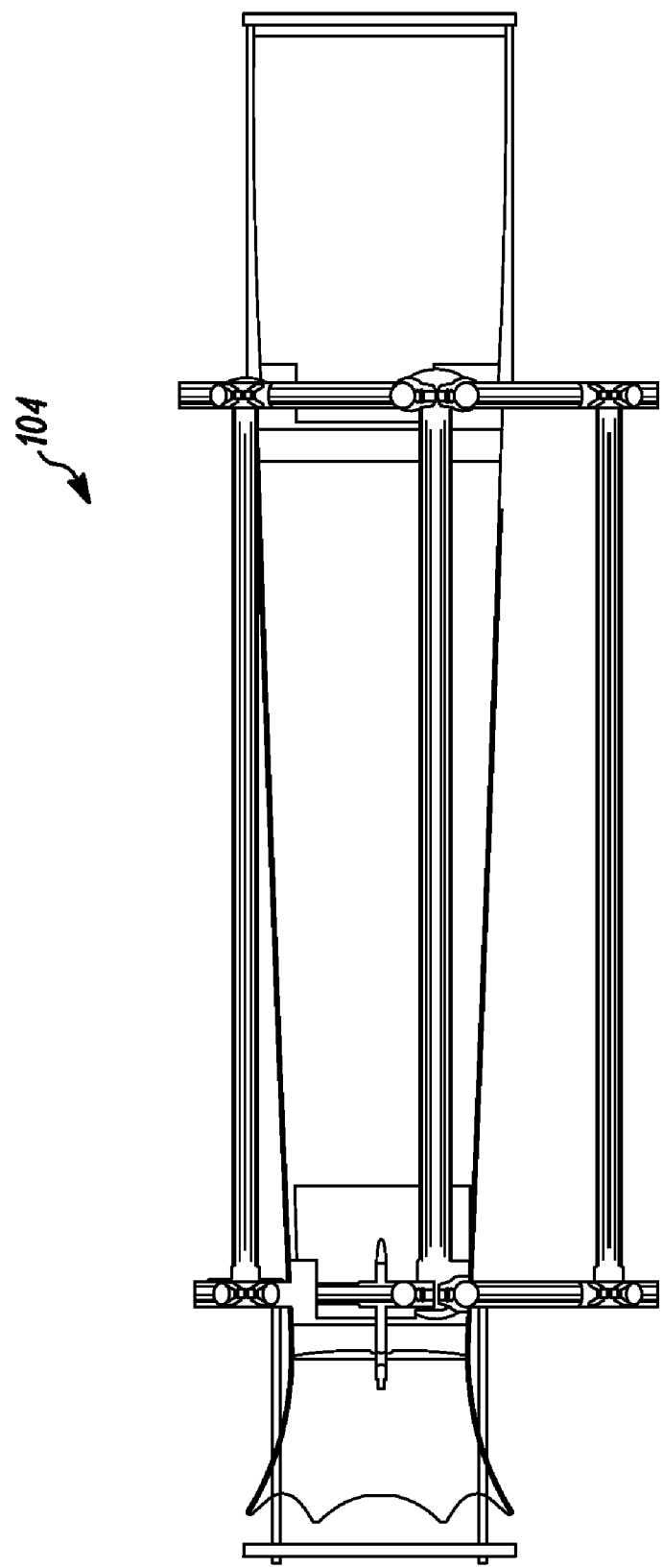
FIG. 14 depicts a module in a triangular superstructure.
Figure 15:
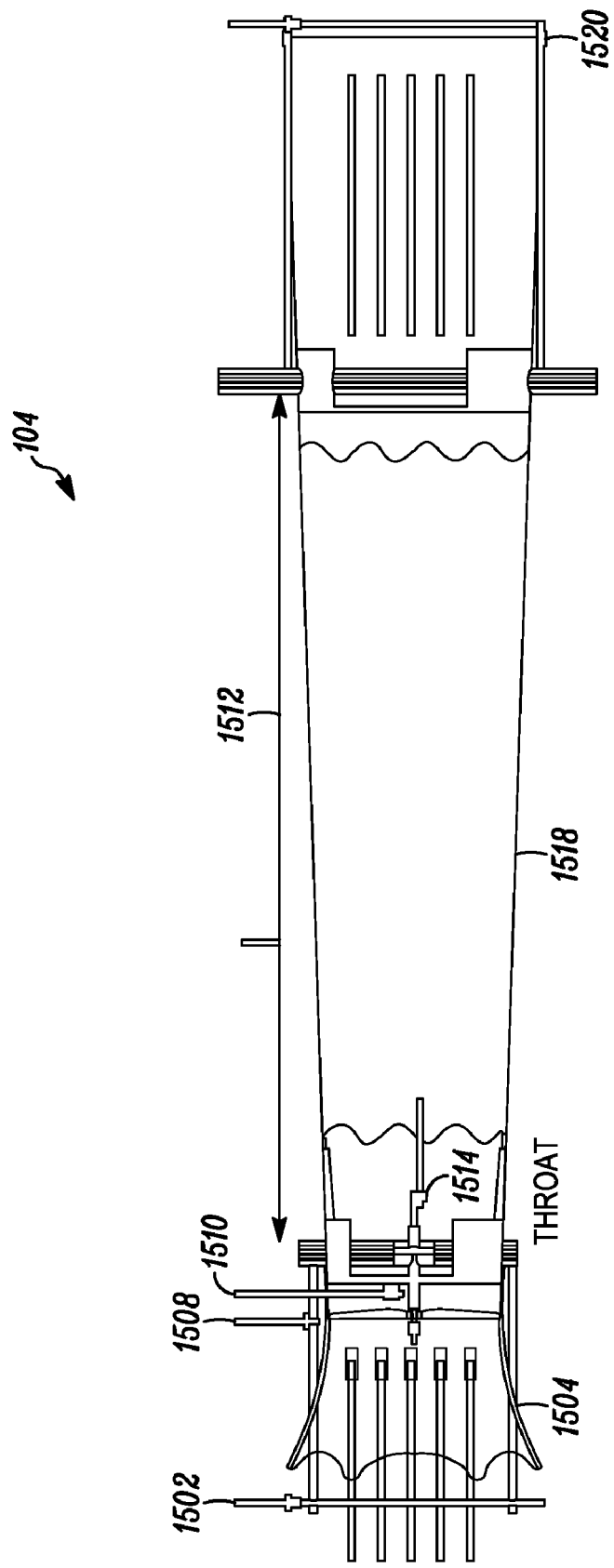
FIG. 15 depicts components of a nozzle.

FIGS. 9-22 depict various aspects of the invention. FIG. 9 depicts a series of arrays side and front elevations 902A and 902B. FIG. 10 depicts non-uniform array with orientation tails in side elevation 1002A, top view 1002B, and front elevation 1002C. FIG. 11 depicts an array 124 with nozzles 104 including three integrated generators 1102. FIG. 12 depicts an integrated generator 1102—module 104 example, where the nozzle may include PM turbine blades/rotor and exterior stator. FIG. 13 depicts an array with storage 1300, including a pressure vessel 1302, fluid turbine 1304, fluid containment 1308, vortex tube 1310, flow chamber 1312, and turbine compressors 1314. FIG. 14 depicts a module in a triangular superstructure 104. FIG. 15 shows details the major components of an example nozzle 104, including the inlet screen 1502, inlet 1504, rotor 1508, transmission/generator 1510, supports 1512, control and management 1514, diffuser

Figure 17:
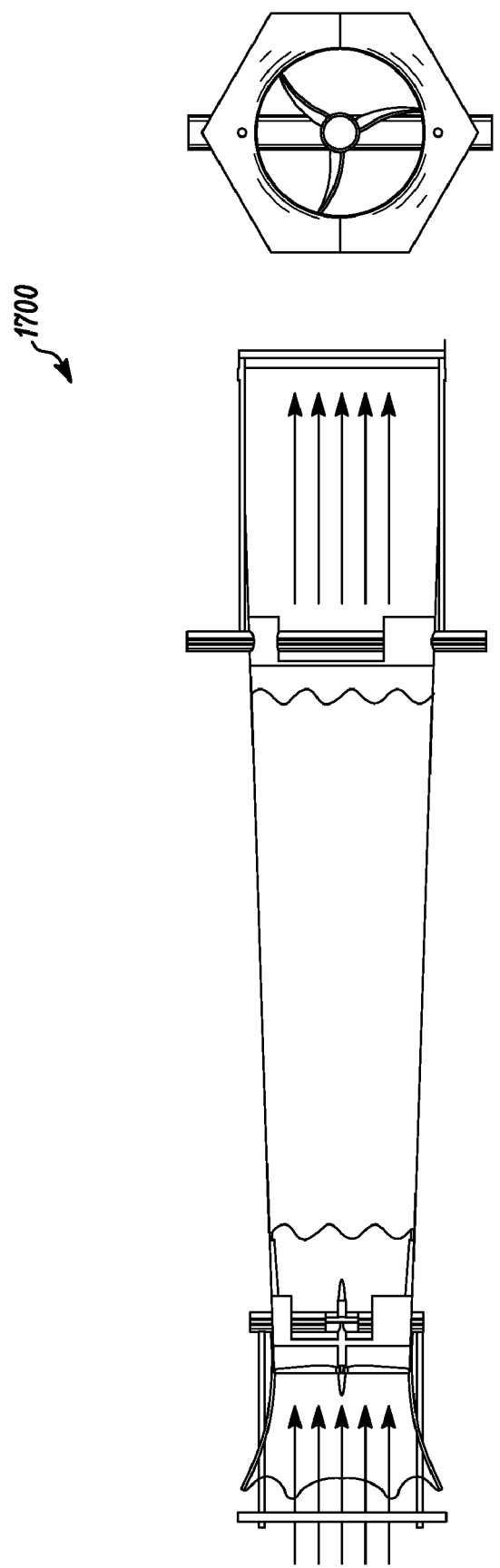
FIG. 17 depicts a side elevation of a hexagonal nozzle.
Figure 18:
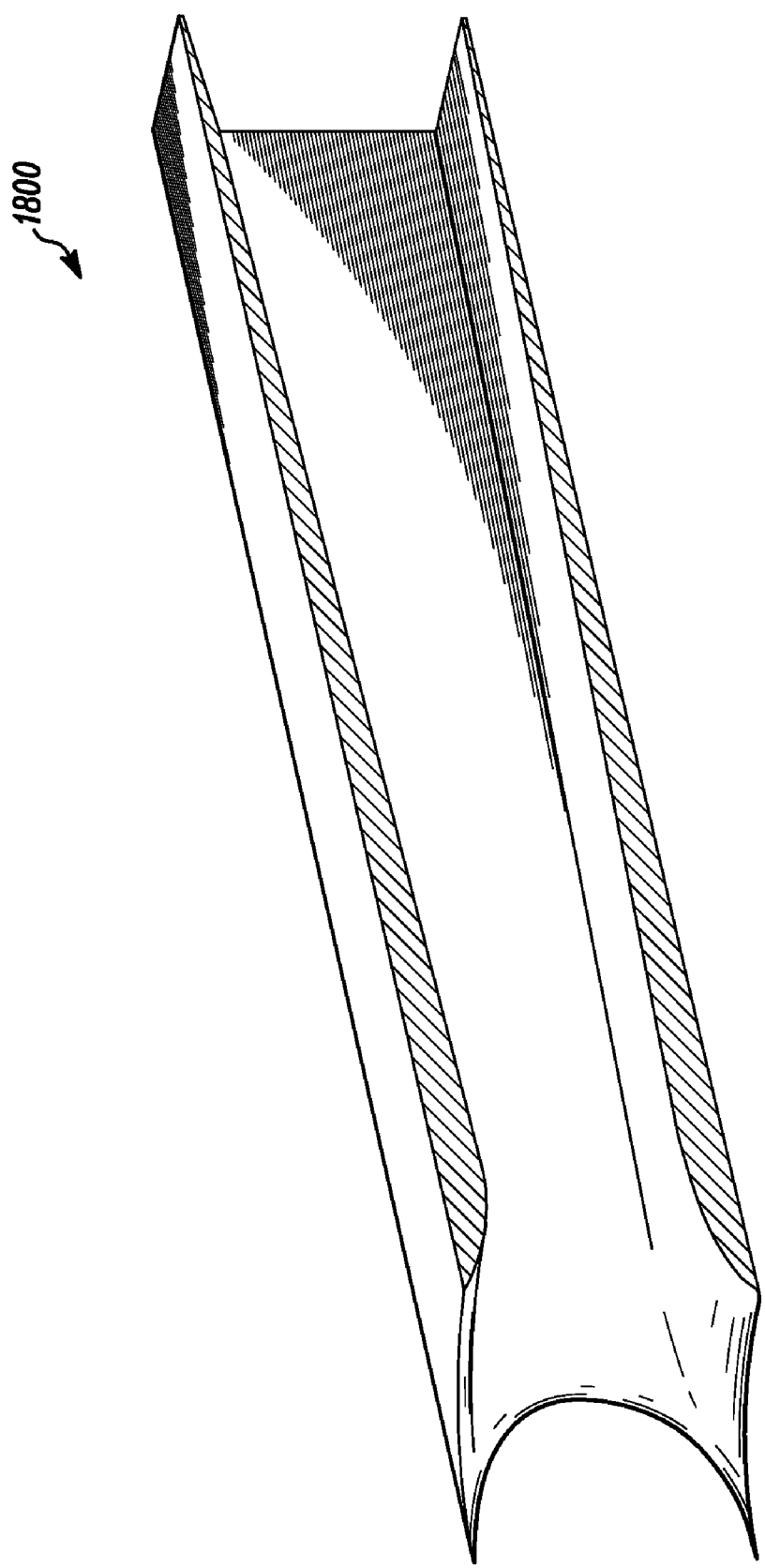
FIG. 18 depicts a nozzle with a circular throat and polygonal exit.
Figure 19:
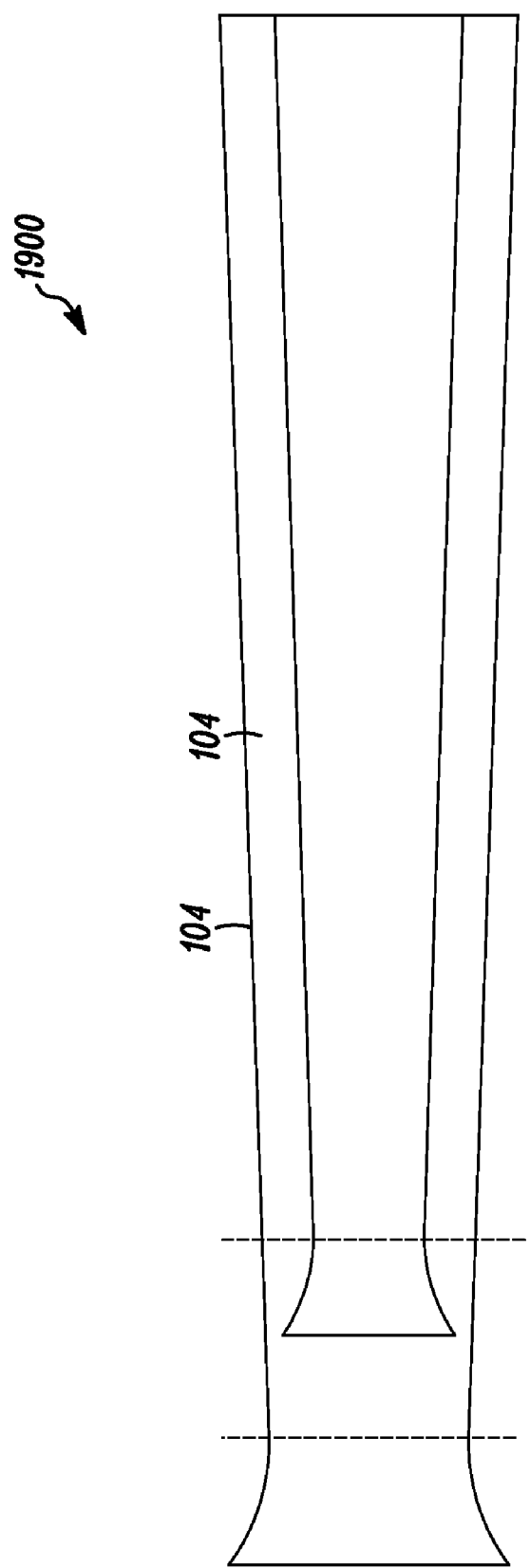
FIG. 19 depicts two nested nozzles.
Figure 20:
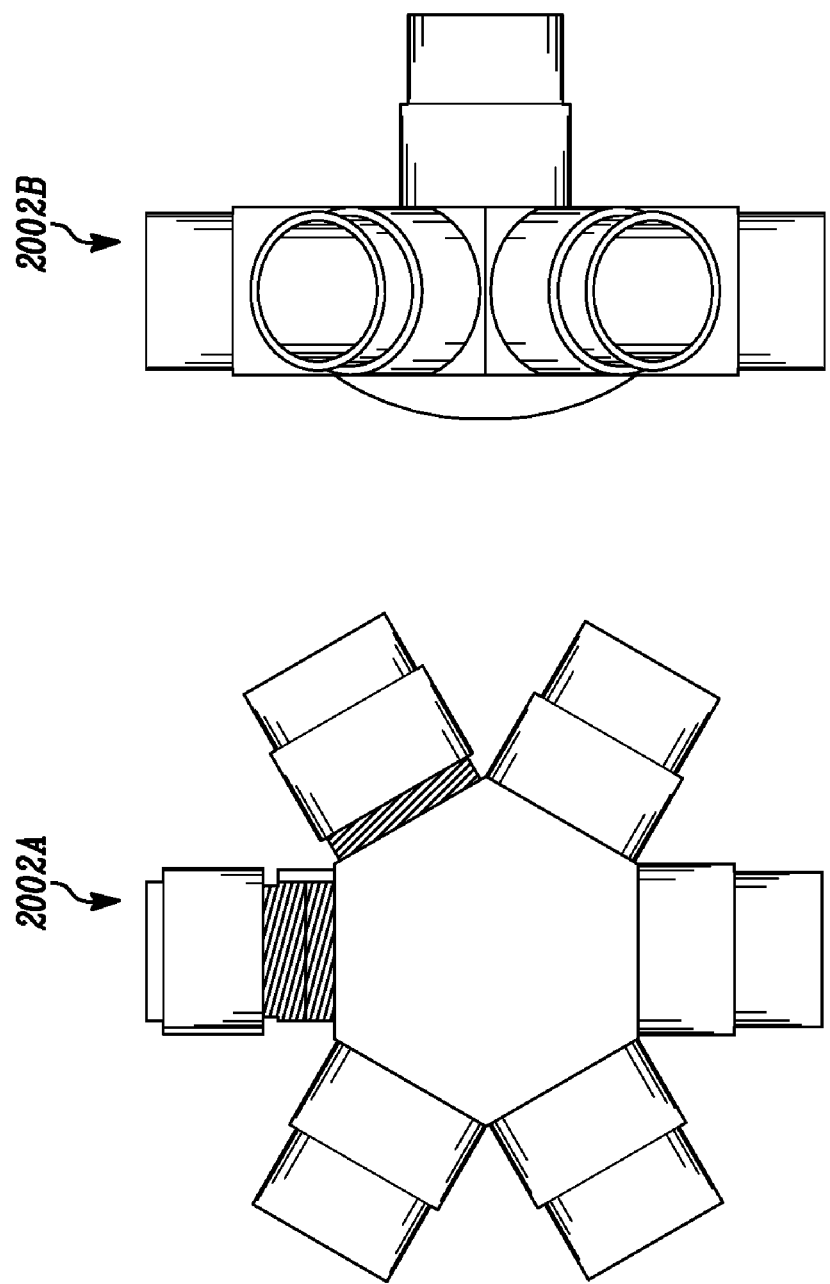
FIG. 20 depicts a superstructure connector.
Figure 21:
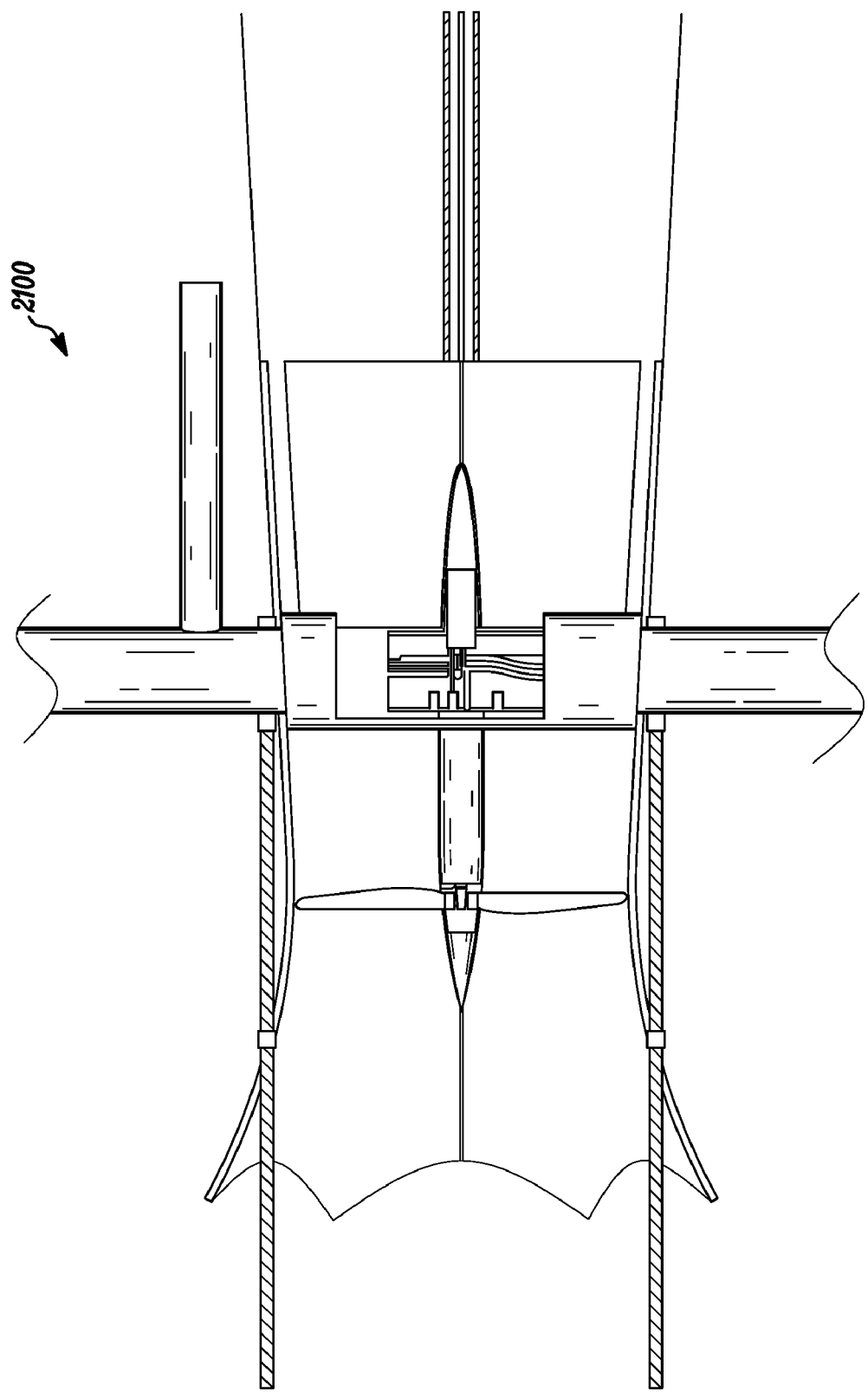
FIG. 21 depicts a horizontal axis wind turbine generator arrangement.
Figure 22:
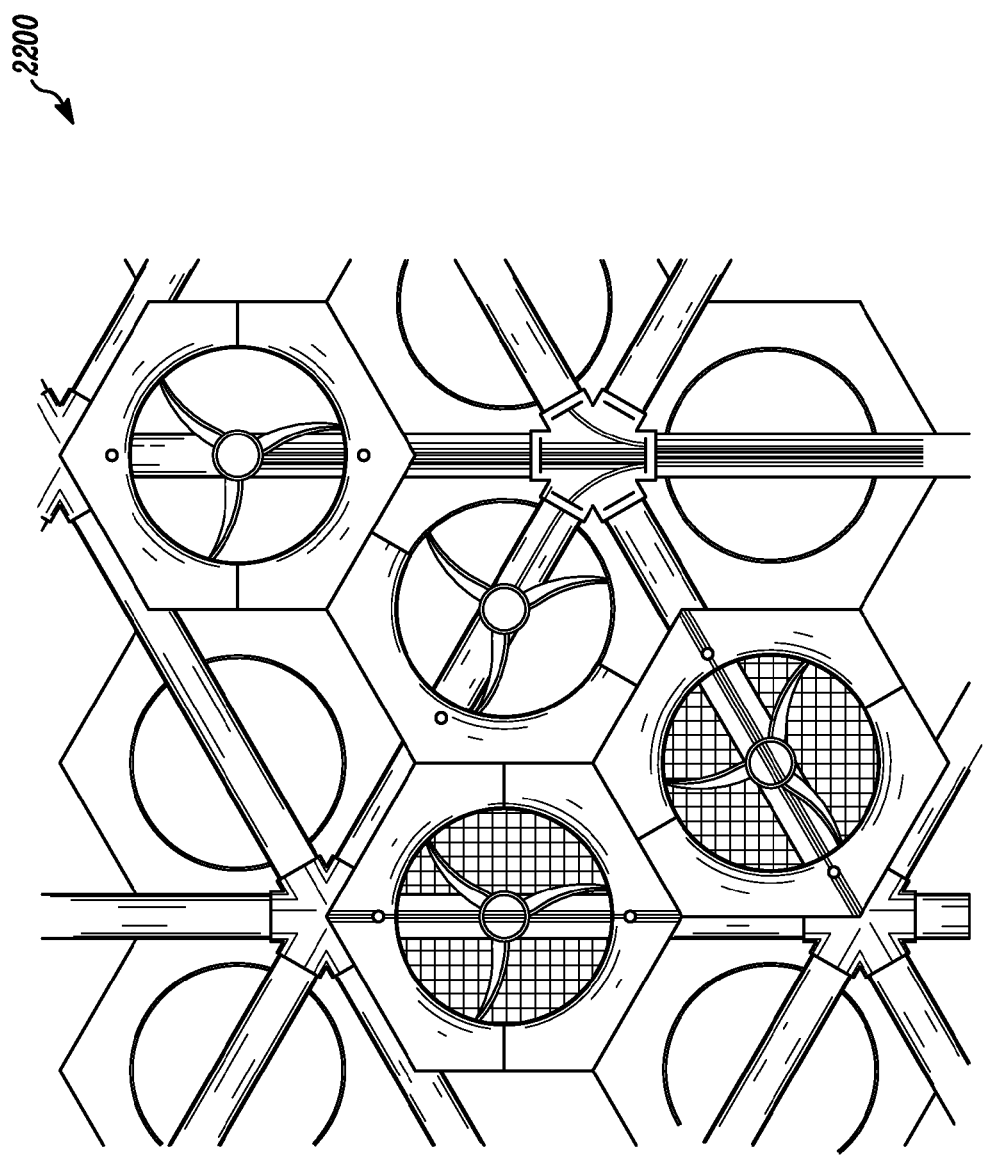
FIG. 22 depicts a superstructure and module arrangement for hexagonal modules.

1518, and exit screen 1520. FIG. 16 shows two nozzles 104 in a serial arrangement 1602. FIG. 17 depicts an embodiment of a front and side elevation of a hexagonal nozzle 1700. FIG. 18 shows an example of a nozzle with circular throat and polygonal exit 1800. In this example, a nozzle with a circular throat may interpolate from 1/r curvature at the throat to 0 curvature at the polygonal exit. In embodiments, intervening slice polygons may be Reuleaux polygons. FIG. 19 shows and example of two nozzles 104 nested together 1900, where splitting the rate of constriction between the two nozzles and nesting the smaller nozzle into the larger may increase the acceleration. FIG. 20 depicts a front view of a superstructure connector 2002A and a side view of a superstructure connector 2002B. FIG. 21 depicts a horizontal axis wind turbine generator arrangement 2100 with module protection screen mounts. FIG. 22 depicts a superstructure and module arrangement 2200 for hexagonal modules.

The module may be an important aspect of the invention, where a module may be an integrated element that is inserted into the array as a plug and play component. The module may be comprised of structural components, nozzle fascia, rotor, generator, transmission, power management components, and the like. A module may be assembled as elements that fit separately onto a given superstructure cell. The module may have at least one automated locking/unlocking mechanism that may attach said module to both the superstructure and its neighbor modules. This may allow single modules to be removed and replaced at need without effecting the operation or structural integrity of the array.

In embodiments, the module may have at least one structural component that provides support for the main nozzle surface, including support and protection for the power components. The structural components may constitute the main load- and pressure-bearing components of the array. Additionally they may include bundled power management and transfer components that connect into the main power conduit array.

In embodiments, an inertial rotor may manipulate rotational momentum to provide variable rotational inertia by way of a variable radius weighting system, where the rotor blades and hub may be comprised of a single or plurality of staged chambers. In addition, a weighted material may be allowed to move based on centripetal motion toward the outer radius. This may be executed with a weighted material that may be controlled in its balance under rotation. In the case of a fluid, the fluid may be allowed to cycle through a series of chambers thereby creating a more stable inertial rotation and energy output. This inertial rotor may also be executed by way of weights and flexible structures, such as springs, memory plastic, and the like, where the flexible structure and weight may be slotted into a single internal chamber in the rotor blades. As rotation and centripetal force increase the weight may extend the flexible structure to the tip of the rotor and thereby change the inertia of the rotor to a more optimal profile for the rotor's use. Weights or fluids may also be controlled by way of actuators. In embodiments, the weighted material may be maintained at an extended position during certain conditions, such as when fluid forces are falling off, when fluid forces are leveled off, when fluid forces are at a maximum, and the like, where the extended position may be a maximal rotation position. In embodiments, the present invention may provide an array of nozzles adapted to generate electrical power from the flow of air. A rotor may be configured to operate within a wind power generating turbine, where the rotor may be configured to have varying amounts of inertia, such as the rotor including a blade on a spring to provide varying inertia at different rotation speeds, the rotor including a fluid component internal to a blade to provide variable inertia, and the like.

In embodiments, the nozzle portion of the module may be important in power production. Nozzle types for manipulating the fluid flow may include solid body w/single fascia, solid body w/plurality of fascia, partially open body geometry, and the like. There may be differentiating characteristics to the underlying geometry of the nozzle. To optimize plane use a quadric surface geometry may be utilized where the inlet of the nozzle is formed by the truncation of a radial or radial/elliptical function at a polygonal boundary. This may allow the nozzle to cover a polygonal intake area with variable intake curvature while having an effective momentum focusing circular structure and expanding to a closely similar polygonal outlet area. The ability to cover a non-circular, for example a square inlet area, may yield a more efficient use of the fluid plane, and the quadric geometry may maximize fascia separation and minimize overpressure relative to the throat. Additionally, the complexity of the surface geometry may be extended by application of quadric or radial structures to the underlying geometry.

A second characteristic may be the radial function used to determine the curvature of the constrictive region conforms. The optimal curvature in the prior art for a radial nozzle may be an arc section from a circle, such as between 1.8 to 2 d, where d is the diameter of the throat. Such curvature may engender the loss of a large portion of the mass available at the intake area.

In embodiments, different types of single arc and multi-arc curvatures may be used depending on the level of nozzle constriction, such as a single arc radial or elliptical curvature used for exclusively low constriction rates, a single arc intersection of two radial functions used at low or medium rates, a single arc execution based on an arc proportion determined by the vector interpolation of momentum distribution described in the method section of this invention, multi arc and single-body or multi-body fascia for higher constriction rates, and the like. This curvature may also vary depending on its angular position relative to bounding polygon and the center of the throat.

In embodiments, the divergent geometry in configurations of the current invention may be predicated on a ratio of rate of constriction to intake to divergent section that results in a volumetric ratio function of the convergent volume to the divergent volume wherein the volumetric ratio increases with the rate of constriction. As an example, a 2× constriction may require a volumetric ratio in excess of 1:7, which given the parameters described in above with regard to constriction may result in a less than 4 degree divergent angle. Additionally a variable nozzle may provide a constriction rate of the nozzle dynamically adjusted to the flow velocity to maintain velocity within the module at a given rated speed. This may allow the reduction of variability in the wind resource and allow the array to output at a given rating consistently.

In embodiments, the array superstructure and array installation may be provided, where the array superstructure may be comprised of power transfer and management and control components, module structural support elements, the array support structure, and the like. Power transfer components may be bundled into the modular structural support columnar elements extending from the top to the base of the array and allowing the module power systems to transfer power with a minimum number of connections and resistance. The superstructure may be either centralized, such as with a mast and boom structure, or distributed, such as with multiple columnar supports.

Figure 23:
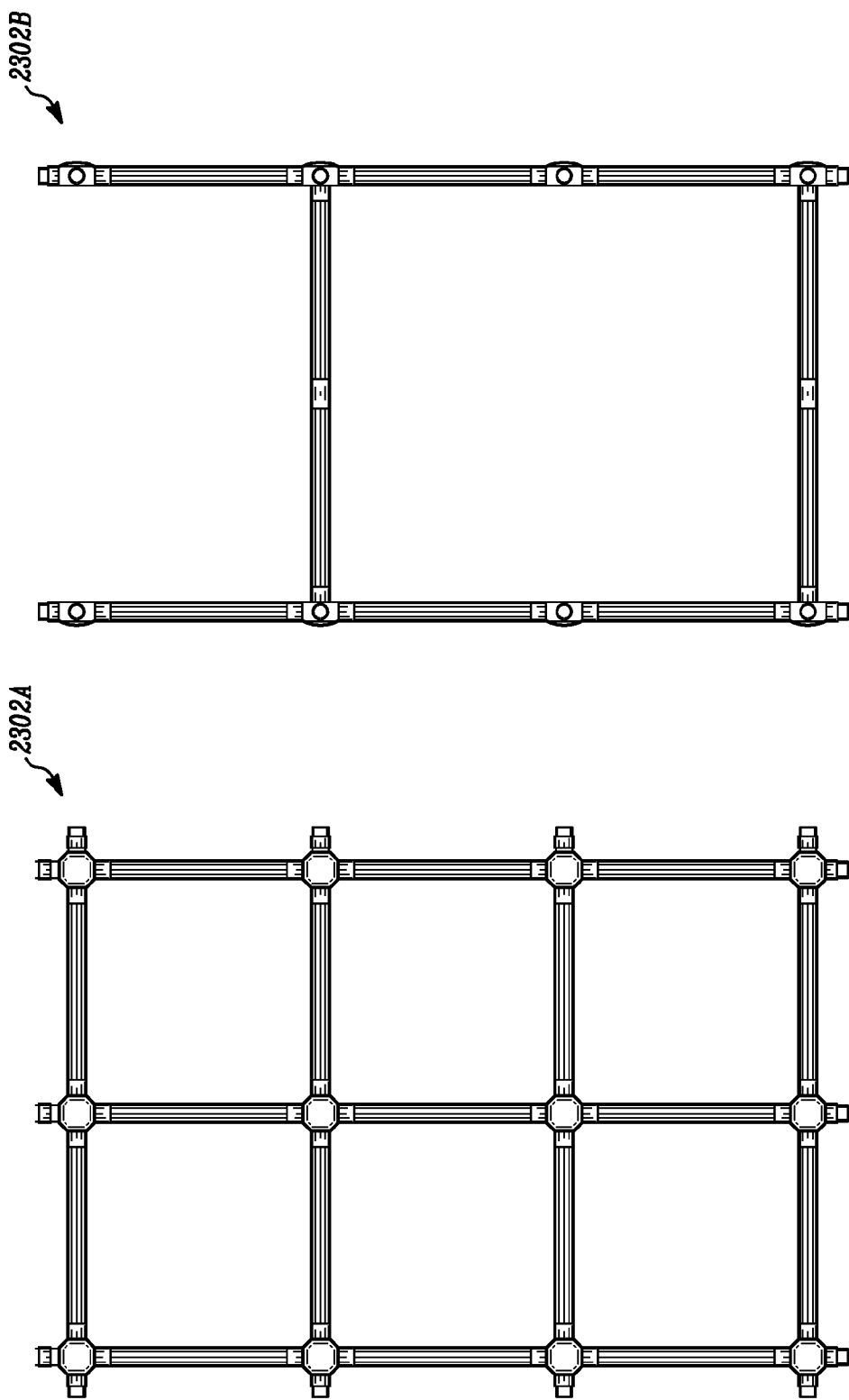
FIG. 23 depicts a space frame for a square array.
Figure 25:
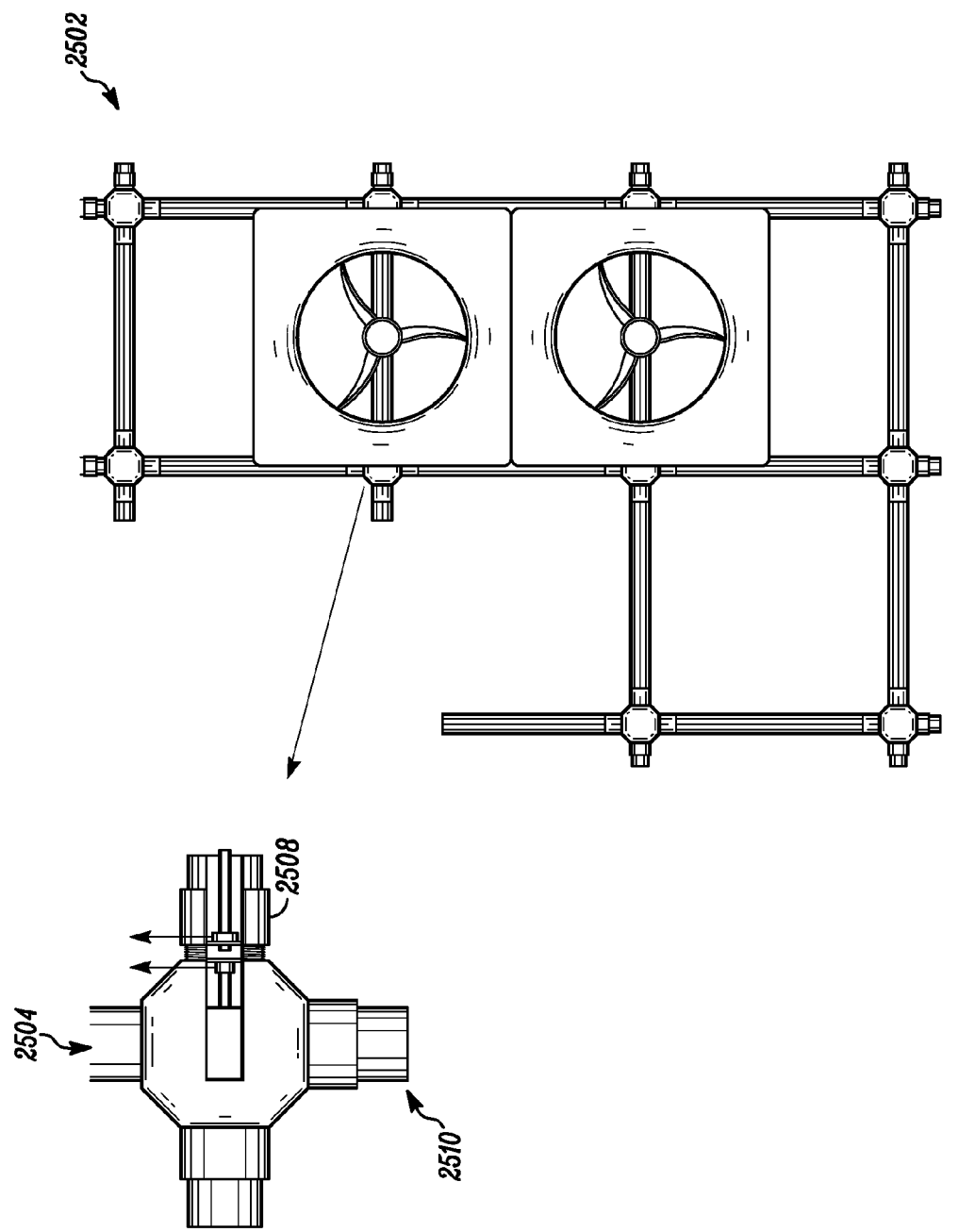
FIG. 25 depicts an example of power transfer in a square array.

In embodiments, the present invention may provide a nozzle adapted for use in a wind power generating turbine, where the nozzle may include networked or distributed power control and transfer. The power control may optimize the power production within a plurality of nozzles and may monitor power production for performance, maintenance, replacement, and the like. The power control may dynamically manage load requirements for a plurality of nozzles, such as when the management is local, global, and the like. The power control may optimize performance through use of neural networks, genetic algorithms, fuzzy algorithms, probabilistic predictive-corrective feedback loops, and the like, to maximize output and minimize losses. The power control may use a dedicated communications system, routing system, distributed communications system, and the like, to control individual elements within a plurality of nozzles. The power control may utilize digital electronics, analog electronics, an electronics chip, electronics logic gates, centralized processing, parallel processing, distributed processing, be hardwired, wireless, and the like. The power transfer may be integrated into structural components, external to structural components, and the like. The power transfer may include topography that may minimize resistance losses, such as with a branch-trunk network structure, a direct generator-main trunk connection structure, and the like. FIG. 23 depicts a space frame for a square array in two different configurations 2302A and 2302B. FIG. 24 depicts nozzle polygons with different entrance shapes with embedded structural members 2402A and 2402B, where the view to the left shows a larger structural member embedded, and the view to the right shows a smaller structural member embedded. FIG. 25 shows a power transfer arrangement 2502 in a square array showing the power transfer structure with nozzles in place. This may depict an example of a modular implementation where the horizontal structural member is embedded in the module and then locks into the columnar component to form the space frame. Other embodiments of this may include a clamshell approach, direct assembly, and the like. FIG. 25 also shows a transfer joint with 35 kV main columnar cable 2504 connection, 25 kV generator cable connection 2508, and connector plates 2510.

In embodiments, the superstructure configuration may be based on a particular array implementation. Array implementation may follow any number of geometries based on module geometry, such as hexagonal, rectangular, triangular, trapezoidal, and the like, where array geometry may not be dependent on module geometry. Array rows may additionally be mounted individually to allow individual row response to wind direction. These rows may be mounted on individual bearings, or the like, of the types described herein, or may be mounted centrally to a column where the outer fascia of the column and the inner fascia of the row may be made up of the materials as described herein with reference to a material properties bearing. In such cases each row may be fitted with mechanical or flow based orientation mechanisms. Each array layer may additionally be executed with power management suited to the conditions at array height, to increase overall output, to stabilize said output based on variation of power curve and dynamic loading as a function of increased velocity w/increased height, and the like. In addition, the support structure may be executed as either a central column or a series of columns. In the case of a series of columns, a number of machine placement configurations may be used to maximize land use vs. installation output. For instance, a checkerboard or filled matrix configuration may be preferred wherein the foundation pilings are shared between arrays at each intersection of the grid to optimize the yield to installation cost ratio.

In association with the installation, energy storage may be provided. Due to the variability of the resource it may be desirable to have a cost-effective method of energy storage for a wind energy machine. Compressed air or pumped hydro storage or batteries or other facilities for storage as are known in the art may be a cost effective way to store wind-produced energy wherein the energy produced by the array may be used to compress air or pump water up a gravity gradient. The stored energy may then be used to power a turbine that produces energy based upon grid demand not wind variability. A major problem with some storage solutions is efficiency relative to cost. In the case of hydro the energy storage requires a large facility and availability of water to affect storage. For this reason compressed air may present a more generally applicable solution with fewer requirements in terms of space and construction. For instance, compressed air and vortex tubes may be used to create a density based closed loop flow system from which energy can be gathered, where vortex tubes can be used to separate flows into the energetic and non-energetic components with an input of compressed air. Depending on the pressure of compressed air, temperature outputs between the hot and cold outputs of the vortex tube can be substantial, on the order of 100 C or more. As in a basic engine schematic, these outputs may be used in a closed loop system to create a hot and cold sink wherein the rate of flow may be determined by the temperature differential between the sinks While the energy contained in the raw flow is still inefficient with regard to amount of energy used to compress the source gas, the introduction of optimized convergent/divergent (C/D) nozzles may provide a way to artificially increase the amount of kinetic energy present at the point of conversion in the closed loop flow and thereby the amount of power recovered from the storage process.

In its simplest form, the storage/recovery device may include methods of pressurizing the preferred medium, a pressure vessel for storage of the compressed medium, a secondary external pressure vessel to recapture thermal energy released by compression with a method of controlling the flow to the turbine, a controlled valve to release the pressurized medium in the primary vessel based upon grid demand, at least one vortex tube, a flow chamber, a facility to channel or transfer thermal properties of the hot and cold streams into the flow chamber, a plurality of embedded nozzles within the flow chamber to increase proportion of kinetic energy in the flow, a facility to control and manage the power derived from both pressure systems, a facility to gather all resultant KE and transfer the power to the grid, and the like. The baseline KE and thermal energy that drives the system may be captured through use of additional turbines such as a steam turbine deriving steam pressure and flow from heat given off by the pressure vessel during the air compression phase or KE turbine capture of the energy of the fluid flow used to drive the closed loop system.

In embodiments, the present invention may include a plurality of process and functional components, such as orienting the array, a nozzle for accelerating the air into the array element, a rotor motor that converts the kinetic fluid energy into mechanical energy, a gear box for translating the mechanical energy into usable rates or controlling the load applied to a facility for KE conversion allowing the energy conversion process to operate at in an optimal range, a generator to convert the mechanical energy into electrical energy, energy storage, a facility for converting or conditioning the energy produced into a desired form, a substation and grid interface, fuel cell loading, and the like. In embodiments, storage of energy may be taken from after the generator in the form of electrical energy, or before the generator in the form of mechanical energy such as described herein. The array may be used in a direct energy transfer system, such as for pumping water, milling, pumping oil, pressurization, gas pressurization, hydrogen separation, fuel cell loading, and the like. Mechanically, the present invention may include a plurality of components, such as the modules themselves, arrays of modules, arrays and arrangement of arrays, the superstructure, bearings, and the like.

In embodiments, the module or array may be provided with a way to orient itself relative to the fluid flow. For instance, a tail may be provided to self orient the structure, such as a tail placed on a rotating support axis that spins the module or array to the wind's direction, or the structure of the nozzle or the array may be constructed in such a way to engender more orienting properties. There may also be other configuration features that contribute to orientation, such as through side cladding shape, providing different orientations at different levels, allowing different levels or modules or array segments to orient independently, and the like.

In embodiments, the nozzle's configuration may provide an important element of the invention, such as a 2.75 constriction nozzle producing a 6 to 7.5X power increase, and the like. Mass flow rate may be affected by a number of parameters, such as rate of constriction, including intake geometry and diffuser geometries being very sensitive to rate of constriction—as you move from 2 to 2.75, effects may become much more sensitive to things like the intake angle; past simple geometries, second order equations—may become very complex, where more complex geometries and surfacing may become an effect; and the like. In embodiments, a rate of constriction of 2.75 may be a good value, where the relationship of rate of constriction, curvature, length of diffuser, intake, etc. may be sufficient to achieve a large power increase without relying on a complex geometry. With a constriction rate below 2 times the realized power increases might not be sufficient to provide an advantage against HAWT systems with regard to a comparison of swept area used by the whole machine and the relationship between cost and yield. Variable throat constriction may be a factor, with the ability to vary the throat. Temperature may be a factor, where heating the air or other methods of creating additional sparsity rearward of the nozzle may create an improved flow, and may also be effective in a storage system.

In embodiments, the present invention may provide a nozzle adapted for use in a wind power generating turbine, where the nozzle may include a constriction. For instance, the nozzle may include a constriction ratio of the diameter of the throat to the diameter of the intake of about 2 and where the length of the diffuser is more than five times the length of the intake, and where the ratio of the diffuser length to the intake length may be about 7:1. In embodiments, the constriction ratio of the diameter of the throat to the diameter of the intake may be more than 2 and where the nozzle is used in an array of nozzles, or as an individual nozzle. In another instance, the nozzle may include a constriction ratio of the diameter of the throat to the diameter of the intake of about 2.5 and where the length of the diffuser is more than five times the length of the intake, and where the ratio of the diffuser length to the intake length may be about 9:1. In another instance, the nozzle may include a constriction ratio of the diameter of the throat to the diameter of the intake of about 2.75 and where the length of the diffuser is more than five times the length of the intake, and where the ratio of the diffuser length to the intake length may be about 11:1. In another instance, the nozzle may include a constriction ratio of the diameter of the throat to the diameter of the intake of more than about 1.5 and where the length of the diffuser is more than five times the length of the intake. In embodiments, the nozzle may include a converging intake and a diverging diffuser, where the length of the diffuser may be longer than the intake, such as more than five times the length of the intake. In embodiments, a nozzle may be adapted for use in a turbine for generation of power from ambient movement of air, where the nozzle may include an intake and a diffuser and where the length of the diffuser is longer than the intake, such as more than five times the length of the intake.

Nozzle intake geometry may also play a key role in the present invention, such as in the leading edge geometry, curvature, length of intake, exit geometry, and the like. The curvature of the intake may be important, such as when the average angle is greater than 45 degrees in a two times constrictor, then you might get a power loss. Once you go up to a 2.5 rate of constriction, then you may become much more sensitive to curvature and length of intake. Length of the intake may be important, such as in the time that the gradient has to act on the flow. If intake length exceeds the throat by a significant factor, there may be loss. Once intake length is less than the throat length, then suddenly you may see the actual predicted velocities at the throat. Note that if elastic collisions are assumed, momentum may deflect from the leading edge. It may not conform to that, nor to a classic boundary layer problem. The effect of momentum deflection may be greater than anticipated by a momentum diffusion layer analysis. There may be some kinetic energy exchange with the wall that slowly turns with the intake. Looking at sparsity and density of molecules and delta of momentum based on probabilistic movement of molecules in the sparse direction may be provided. The lower rate of constriction, the shorter the intake length may have to be. With an initial sparse gradient, if there is a proper intake angle that allows momentum to be directed toward the throat, a density increase may be experienced in the region of the intake. When there is an incorrect intake geometry at a higher rate of constriction, a toroidal bleed-over on the leading edge may result in mass loss to the exterior of the nozzle.

In embodiments, the present invention may provide a nozzle adapted for use in a wind power generating turbine, such as optimized for leading edge geometry, for curvature, and the like. The leading edge of the nozzle may be optimized based on the angle of incidence to the direction of the flow, where momentum vectors derived from the leading edge may generally clear the throat of the nozzle. In embodiments, the intake leading edge may have an angle of incidence of no more than $1.1*0.5*\theta$, where $\tan \theta = (0.5(D_I-D_t)+D_t)I_I$, and where $D_I$ is the nozzle diameter at the intake, $D_t$ diameter of the throat, and $I_I$ is the intake length. In embodiments, the present invention may provide a nozzle adapted for use in a wind power generating turbine, wherein the nozzle is optimized based on intake length, leading edge shape, diffuser length, and the like. In an example, for a nozzle where the area at the throat is ½ the area of the intake and the intake length is ½ the diameter of the throat, the maximum incidence angle at the leading edge may be 47 degrees. In embodiments, the optimal range may fall between 41 and 37 degrees for 2 times constriction for this set of parameters. The intake may conform to an elliptical, radial arc, a combination of the two, a combination of a plurality of elliptical or radial arcs from the leading edge to the throat, and the like. In embodiments, the nozzle may be optimized based on an intake length to divergent length ratio where the intake length may be equal to or less than the diameter of the throat.

Figure 26:
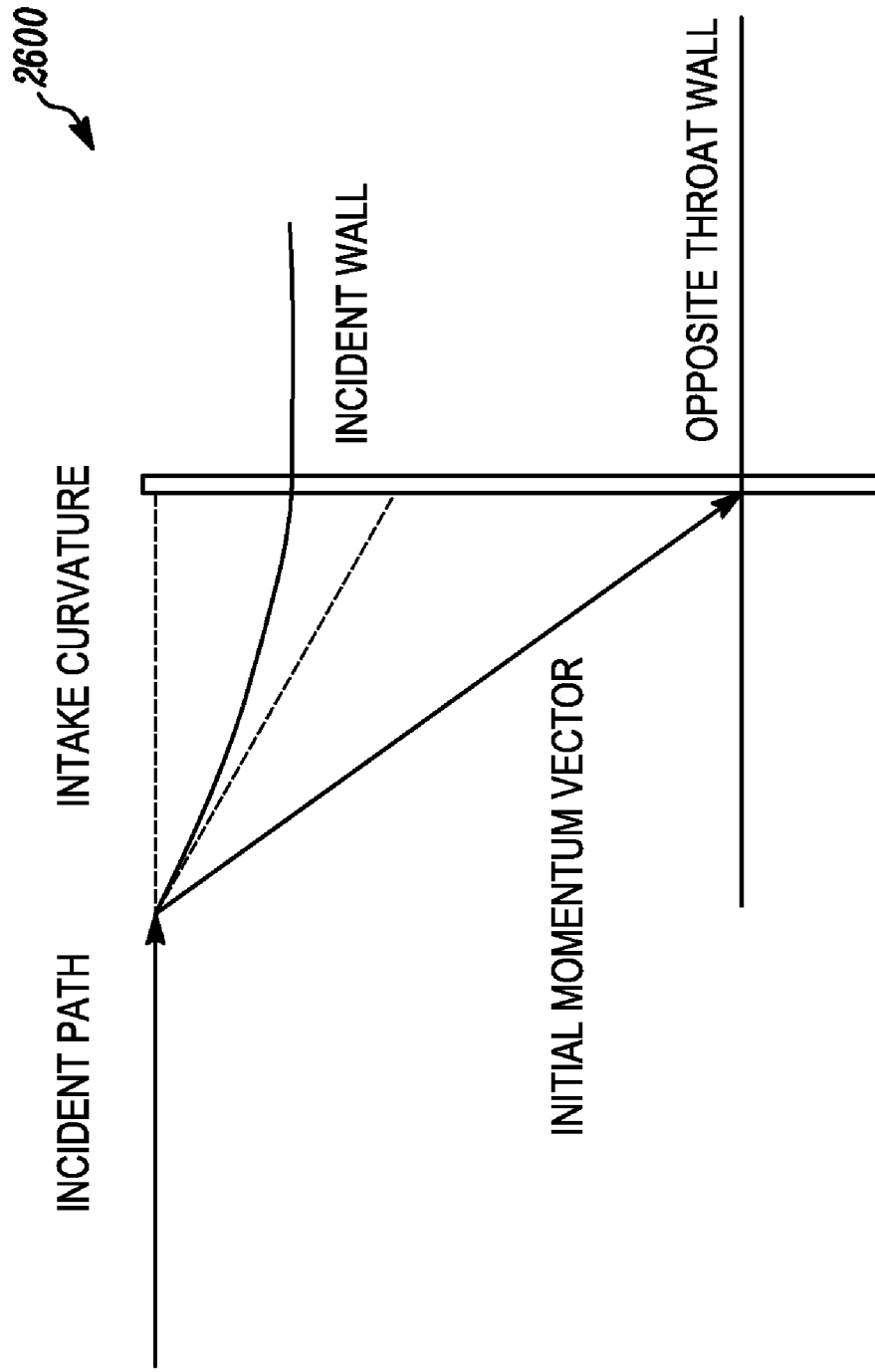
FIG. 26 depicts a diagram of an initial intake momentum vector.

In embodiments, the initial intake momentum vector may be depicted graphically. FIG. 26 shows a diagram depicting an initial intake momentum vector 2600, which may be related to the formula for deriving the minimum leading edge angle. In the diagram, the incident path and incident momentum vector are shown relative to the intake curvature, the incident wall, and the opposite throat wall.

In embodiments, the design of the intake geometry may result in a non-perfect angle with relatively short diffuser. A 4× power increase may result with a 45 degree intake angle, as long as there is curvature, where curvature spreads the force acting against the flow. A basic non-symmetric catenoid (rotated hyperbolic function) may be used. To achieve an array you may artificially truncate the catenoid (taking a funnel/catenoid) and truncating with a hexagon, square, triangle, or other polygon. In using a hexagon, there may be more exterior angular latitude, but straight corners may have to be more curved. Surfacing may be a factor, where there may be small vortex generators on leading edges or over the entire nozzle surface, such as square vortex generators, golf ball dimples, or any surface that creates a thicker displacement layer, but relates to the boundary layer better. In embodiments, the present invention may provide a nozzle adapted for use in a wind power generating turbine. The nozzle may include a diffuser, the cross-section of which may have substantially linear sides from throat to exit. In embodiments, the exit angle of the diffuser may be less than about four degrees. The nozzle may have a facility to generate a voracity or swirl effect proximal to the exit of the diffuser, such as where the diffuser includes a vane to facilitate the effect. In embodiments, the nozzle may have a diffuser, such as a diffuser with a polygonal exit shape, a square exit shape, having symmetric polygonal walls, having symmetric polygonal walls that are truncated, and the like.

In embodiments, low cost materials for nozzles may be a factor, where if there's an efficient pass through, the whole thing orients itself (acts like a big tail on a kite). Once you break into arrays and optimize, you may not need materials such as carbon fiber, eGlass, and the like, but very low-cost, lightweight materials may be used, especially at the top of the superstructure/array, such as a polycarbonate thermofoam, and the like. A combination of inexpensive and expensive materials may also be used wherein the mechanical properties of a fiber in combination with a closed or open cell foam may result in an overall cost reduction. In embodiments, the present invention may provide an array of nozzles adapted to generate electrical power from the flow of air. The array may include nozzles made with polycarbonate thermofoam, polymer, a fiber/resin composite, a syntactic foam, a closed cell foam, an open cell foam, with gelcoat, and the like. In embodiments, the present invention may provide a nozzle adapted for use in a wind power generating turbine. The nozzle may include at least one of a plurality of mass produced components. The components may be manufactured through rotomolding, injection molding, scrimp molding, thermoforming, lay-up, vacuum molding, filament winding, and the like. The materials used in manufacturing the components may include acrylonitrile butadiene styrene (ABS), polycarbonates (PC), polyamides (PA), polybutylene terephthalate (PBT), polyethylene terephthalate (PET), polyphenylene oxide (PPO), polysulphone (PSU), polyetherketone (PEK), polyetheretherketone (PEEK), polyimides, polyethylene,polypropylene, polystyrene, polyvinyl chloride, polymethyl methacrylate, polyethylene terephthalate, and the like. The materials used in manufacturing the components may include at least one of acrylic, aramid, twaron, Kevlar, technora, nomex, carbon, tenax, microfiber, nylon, olefin, polyester, polyethylene, dyneema, spectra, rayon, tencel, vinalon, zylon, asbestos, basalt, mineral wool, glass wool, syntatic foams, carbon foam, polyurethane foams, polystyrene foams, metal foams, and the like. The components may be designed to enhance the structural properties of the nozzle to provide reduced cost of material, reduced weight of material used, minimized assembly time, minimized transport costs, and the like.

In embodiments, drill-throughs may be a factor, where a drill may go through from the outside to increase the flow from an ambient outside air, or perform vaning with drill-through to introduce the ambient air and change swirl. In embodiments, the present invention may provide a nozzle adapted for use in a wind power generating turbine, where the nozzle may include a through-hole to facilitate air flow.

In embodiments, more complex intake geometries may be a factor, such as combinations of geometries, truncating a catenoid with a polygonal shape, taking a quadric function and applying it on an ellipse to the surface creating aerodynamic shapes that channel well (e.g., shark scales, single or multi-layer scalloping, whale fin, and the like), extending quadric truncation onto the surface of the nozzle spreading the momentum from off of the leading edges and bringing in the intake stream into a less oppositional mode, a series of linearly or orthogonally concave curvatures onto a convex shape, applying to the walls at a larger scale, vortex generators within the nozzle itself (e.g., squares, dimples, vortex film, and the like), forward wedging to channel the flow toward the throat, concave and convex curvature, split diffuser in half rearward of the throat, and the like.

In embodiments, the present invention may provide a nozzle adapted for use in a wind power generating turbine. The nozzle may have a leading edge and an intake curvature between the leading edge and a throat of the nozzle, where the leading edge and intake curvature of the nozzle may be adapted to focus momentum vectors of air particles in the intake region to facilitate air flow within the nozzle. In embodiments, the nozzle may have a leading edge and an intake surface with an intake curvature between the leading edge and a throat of the nozzle where the leading edge and intake curvature of the nozzle are optimized based on the predicted gradient of air particles within the nozzle, the predicted energy transfer of air particles in interaction with the intake surface of the nozzle, the predicted focus of momentum vectors of air particles within the nozzle, and the like. The nozzle may have a leading edge and an intake length between the leading edge and a throat of the nozzle, where the intake length of the nozzle may be less than the diameter of the throat of the nozzle, such as by two times. In embodiments, the intake length may be less than the diameter of the throat, between one-half and about equal to the diameter of the throat, and the like. The geometry of the nozzle may be adapted based on calculation of the probability of movement of air molecules from dense to sparse regions within the nozzle. The surface of the nozzle may include a vortex generator. The nozzle may be configured with surface shaping to optimize flow from the leading edge, such as based on quadric truncation of an ellipse, multiple quadric functions similar to an n-iteration fractal, shark scale shape, scallop scale shape, whale fin shape, and the like.

In embodiments, nozzles may be in series, such as nesting nozzles rearward of the throat, where the one in the throat may come very close to a theoretical level of increase, and the outside one may get 90% of its theoretical level of increase. In embodiments, the nozzle module may be integrated as one piece, such as making the blades of the rotor of the turbine an integrated component. Other less optimal forms may also be used and combined into an array such as super-venturi's, wide-angle diffusers, two dimensional nozzles, flat wall nozzles, and the like.

In embodiments, the present invention may provide a nozzle adapted for use in a wind power generating turbine. The nozzle may have an intake geometry configured to optimize airflow based on momentum vectors in the intake region, where the momentum vectors may derive from interaction with the angle of the leading edge of the nozzle, the nozzle may be configured to generate momentum vectors that are directed to clear the throat of the nozzle after interaction with the leading edge of the nozzle, and the like. The nozzle may be arranged in series with at least one other nozzle. The nozzle may be formed with a constriction ratio between the intake area of the nozzle and the throat area of the nozzle, such as about 2.75, between 2 and 4, between 2.5 and 3.5, and the like. In embodiments, the nozzle may include a constriction ratio of the area of the throat to the area of the intake of about 2 and where the length of the diffuser may be about seven times the length of the intake. In embodiments, the nozzle may include a constriction ratio of the area of the throat to the area of the intake of about 2.5 and wherein the length of the diffuser is about nine times the length of the intake. The nozzle may be configured with the capability to vary the area of the throat. In embodiments, a facility may be provided for modifying air temperature or density in the environment of a nozzle to increase flow through the nozzle, such as modifying air temperature through heating air in the proximity of the outtake of the nozzle.

In embodiments, diffuser geometries may be a factor, such as exit angle, length of diffuser, splitting the diffuser in half, in quarters, and the like, increasing the diffuser efficiency, the diffuser shape, the radial swirl, and the like. For instance, as the rate of constriction increases, the optimum diffuser may become longer, and longer as a relative ratio to the intake, such as at 2 there might be a 1:7 optimal ratio of diffuser length to intake length, at 2.5 there might be a 1:9 optimal ratio, and the like. The diffuser shape may be a curve, taken straight to the outlet, convert the radial function to a polygonal function, use long or wide angle diffusers, use optimized nozzles for wind conditions with long diffusers, and the like. The radial swirl may create low-level swirl or higher rates of vorticity in the exit region or rearward of the diffuser, where curved vaning may create an exterior, radial motion of the gas as it exits, which may create an additional layer of sparsity inside the diffuser. In addition, the swirl may be created using ambient air, vaning could be used with drill-through to introduce the ambient air and increase the swirl, and the like. Other mechanical methods of creating sparsity as described herein may be utilized, such as an inverse rotor attached to the main KE converting rotor may be used with an optimized geometry and an array implementation. Such methods of increasing sparsity might allow the use of a non-optimized geometry that could have a positive effect on the cost parameters of the machine.

In embodiments, the relationship of intake geometry and diffuser geometries may change based on the rate of constriction. To create a high mass throughput, as you increase rate of constriction, the intake and diffuser geometries may become far more important.

In embodiments, the rotor parameters may be important in the current invention, such as the shape of the blade and surfacing (which may create vortices both on the upper and lower surface of the blade). A plurality of blade shapes may be employed, such as using vortex generation on the lower edge (which may add to the lift of the blade), lower angle for more power (but if the angle goes to zero, there may be no lift, so some low number may be good, such as a mean angle of four degrees), minimize the drag effect on the top of the blade due to the boundary layer effect (which may be hard to control if the direction the gas is coming from is unknown, so creating different kinds of blade shapes that minimize boundary layer separation above the blade may be valuable), drill throughs to address the boundary layer, making blades a inexpensively as possible, and the like. For example, the rotor may be two meters long, formed of thermoplastic, could be hollow, and operate with a basic swept-twist airfoil. Adjustable pitch may be used to increase blade efficiency at higher velocities by adjusting to a lower pitch angle.

In embodiments, the present invention may provide an array of nozzles adapted to generate electrical power from the flow of air. A rotor may be configured to operate within a wind power generating turbine where the rotor includes a complex topography vortex generation facility on the blade, such as a vortex generation facility on the lower surface of a blade, such as a vortex generation facility on the upper surface of a blade, vortex generation facility includes providing a dimple on the surface of the blade, a shark scale topography, and the like. A rotor may be configured to operate within a wind power generating turbine, where the rotor may include a low angle relative to the plane of rotation of the rotor, such as the angle being less than approximately four degrees.

In embodiments, the rotor may be a variable inertia rotor, where if the mass of the rotor is centralized around the hub, there is less inertia to start the rotor. In embodiments, there may be a facility for smoothing the mechanical energy output of the rotor, the power capture may be extended as the wind drops off where there may be more power during drop off as the weight is placed out on the edge, change the dynamics of rotor between low speed state and high speed state thereby holding it longer, and the like. In embodiments, the configuration may shift the mass to the outward part as it gets as rotation rate increases, such as by attaching a memory plastic spring, by using a rubber elastic actuator, by using a metal spring, by spring loaded actuation, by actuation with a coil with a current going through it, by a fluid, by a mechanical actuator, by enlarging the rotor, through centripetal motion, and the like. By utilizing a spring, narrowing at lower speeds may be avoided, which may happen on drop-down of the wind. A start weight may also be used at the center, then move out and hold peak power production with inertial at high speed and as the wind drops. In embodiments, a mass on a spring may be used to move the inertia out to the edge of the rotor, such as by putting a flat or round pipe up the central axis of the rotor, putting a mass on the spring, slotting it, and letting it get to the end, where as it slows down, the spring pulls it back in, or the spring releases a weight, and the like.

In embodiments, the rotor may utilize a variable blade, such as starting out with six blades, and then activate an actuator for pressure-based switch allowing some blades to collapse in order to reduce the total number of active blades. For example, this may be done with any prime multiple, such as eight dropping to four and then dropping to two, or twelve drops to six which drops to three, and so on. In this instance, the prime number blade may have the most structure, with the secondary and tertiary with less structure, such as being made from thermoforms that slot into the hub, and collapse as the wind speed increases. In embodiments, energy capture at a given fluid velocity might go from 12% to 30% with the right blade number, so if one wants to get a good power curve over a range, one might get the right blade configuration and maximize over a whole range of velocities. This may translate into a significant increase in annual yield. For instance, what is considered lower speeds may be 60-70% of maximum (distribution) at any wind site. Today's systems often ignore the low wind, because one gets so much more power out of the high wind areas. Most of East Coast on-land and close urban sites (other than directly on shore—are class 3 or 4 sites. The entire Southeast is a Class 1 site. Where the wind works now (Class 5), there are other problems, because of distance from major urban centers. Thus, setting up a system that works at low wind and still works at high wind is very effective.

In embodiments, the structural configuration of the module may be important to the present invention. For instance, the module may be an integrated assembly that is put together separately with superstructure elements connected into the module, and then everything is connected together. In embodiments, the structure could be a hexagonal, square, triangular, and the like arrangement that components are placed into, a basic geodesic structure and put module components into, and the like. There may be a need for actuators in the superstructure itself, so that the cover can be opened and closed. In embodiments one may build columns (power transfer columns) and fill in the space with modules. Each superstructure element of a module may click into a bus that clicks into the main one (as opposed to providing individual lines. If done modularly, then one component could be popped out, and another popped in, thereby providing a complete modular implementation, with a running stock of replacement modules. In embodiments, the modules could be on sleds with their own way of getting down to the ground or may be installed by way of a built-in installation platform. There could also be a Pseudo-modular implementation, by making the super structure and inserting elements of the module individually. Components could be assembled in installation versus off-site. One could make modules in pieces, such as a clamshell top piece and a clamshell exit piece for the nozzle, where one puts the generator onto super structure first. Guide poles or a form of guided crane may be utilized for removal of parts for replacement. There may be a slot in the superstructure, such as forward and rearward on the superstructure with slotting poles such that modules are installed onto the slotting poles. Modules may be manufactured on-site, such as manufacturing in a tractor-trailer, where for instance, nozzles may be made on site. Once the process is automated, the likelihood of human error may be lower.

In embodiments, there may be wildlife protection/anti-fouling systems such as screens on the same pole as used on the superstructure, where birds and bats may pose a problem. In embodiments, bugs may not be a significant issue, but there may be self-cleaning surfaces utilized, such as certain plants, like lotus leaves, where viscosity of the inherent molecules may not bond to the surface. Modularity may allow slotting out the screens and cleaning them. In embodiments, the present invention may provide a nozzle or array of nozzles adapted for use in a wind power generating turbine, where the nozzle may be adapted for extreme conditions, such as earthquakes, high wind, ice, and the like. The adaption for extreme conditions may include mechanisms to allow the nozzle to survive earthquakes, where the mechanism may be a fluid foundation, a gyroscopic mechanism, a pintle mechanism, a frequency damping mechanism, and the like. The adaption for extreme conditions may include mechanisms to allow survival of high winds, such as category 5 winds. The adaption for extreme conditions may include mechanisms to allow for partial structural degradation of the nozzle. In addition, the adaption for extreme conditions may include mechanisms for deicing the nozzle. The nozzle may also be protected by a wildlife inhibitor, such as a broadcasted sonic inhibitor, a mechanical screen, an olfactory inhibitor, and the like.

In embodiments, arrays of nozzles and the arrangement of the arrays may be an important aspect of the invention, where there may be advantages in an arrayed configuration. For instance, as compared to monolithic, if an efficient proportion is one to ten, then you may need much more power to efficiently use the space required by a monolithic nozzle, and it may not be stable without some structural components made out of expensive aerodynamic materials. In certain embodiments, the distance needed to reestablish flow after the outlet of the turbine is approximately the depth of about one array, and one may thus stack arrays behind each other, such as in the checkerboard of FIG. 2 or in a co-mounted configuration.

In embodiments modules may be configured in the arrays to cover a significant portion of the plane of the array. In embodiments the best way to cover the plane may be to have the truncated catenoid geometry. If a comparison is made between an array and a conventional turbine, one may start to see big differences, such as an array on platform compared to a tall turbine. Additionally, the area of the array may not have to be a fixed shape or size. For instance, the array could start at 30 m and go up to 90 m, or it can start lower. In embodiments, the present invention may provide an array of nozzles adapted to generate electrical power from the flow of air, where the array may include nozzles of variable type at different height. For instance, some nozzles may be larger at greater heights than nozzles at lower heights, have lower constriction at greater heights than nozzles at lower heights, and the like. The array doesn't have to have a circular structure, so it might be 115 m by 35 m, or alternately, it might cover a similar swept area in a similar of different proportion. In embodiments, more power may be derived, because there is more area at the higher wind speed. Another advantage may be that in a traditional single large blade turbine there may be different wind speeds at the top verses the bottom of the prop, and the difference may produce uneven stress loads and production at some mean figure. In the current invention each row may get more than the rows at the bottom, with no stress load between the top and bottom rows. The top one or two rows, on their own, may gather more than the entire traditional turbine prop. The ability to manipulate how you handle the area of the array is a major factor in generated power, footprint, and the absence of the need for custom building, and the current invention may allow the custom design, generating energy based on the power curve, wind distribution, and the like. In embodiments, with an array design, the configuration for an efficient, modular, space frame super structure may be re-used for many different sites.

In embodiments, array parameters may include the optimal number of modules, where the parameters may include tangential wind loads, icing, inertial components, cost of making the rotor, load bearing, power yield, area covered, nozzle depth, tradeoff of height and depth, and the like; the vertical starting point at which the array begins; the vertical point at which the array ends; the width of the array; depth of the array; shape of the modules, such as square, diamond, hexagon, triangle, rectangle, combined packing shapes of polygons, packing polygons, and the like; shape of the array, such as square, diamond, triangular, trapezoid, shaped cladding (where something that bleeds the wind in the direction the nozzles bleeds the wind, with duplicate outside coverage of the nozzles, and/or extending of the cladding); variability of the modules, such as sizes and shapes; bearings, such as between array rows to orient independently or for the whole array, a magnetic bearing, a wind bearing, bearings for rows of arrays, and the like; uniformity, such as outside modules smaller than inner modules or the inverse, impact on structural bearing of the array, impact on the electrical distribution, and the like; load bearing properties, such as managing load across the array; the ability for a series configuration, such as placed end-to-end, in a grid, based on a fraction of the exit speed, and the like; turbulent mixing over the outer part of the module, such as with vortex generators, axial stream tubes, like drill-throughs, trailing edge on airfoil with vortex generator, optimizing the trailing air mix; combined outer shape of the array; the superstructure; installation properties of the individual array; installation properties of the wind farm, such as dimensions relative to each other; arrangements of the arrays; and the like. In embodiments, laying out the arrays into a wind farm configuration may entail a plurality of design parameters, such as the minimum optimal dimensions across the array, the front array numbers and dimensions verses the back, where the arrays are placed in the wind farm, whether the wind farm can be placed near urban spaces, on top of a hot spot, close to transmission line, and the like.

In embodiments, the super structure parameters may present important aspects to the present invention, such as modularity; applying space frames to the superstructure of the array; integrating with the shape of a given module; integrating with the power structure; load bearing supports, such as relative to the length of the modules, a need for lateral support, square shapes bearing less than a diamond shape, and the like; shaped space frame, such as cladding on the space frame, deciding which members need to be thick, placement of lateral support, and the like; structural space frame as an electrical conduit; transferring power through the super structure, such as attaching/conducting power, placement of busses, placement of connectors, need for main bus columns, attachment of modules within the structure to the main bus column, running wire from each one to a central bus to transfer to the grid in one big cable, minimizing resistance to help allow efficient distribution of energy, minimizing complexity and cost of installation and maintenance, and the like; pipe shapes; superstructure weight distribution; and the like. In embodiments, the present invention may provide a structural array for generating electrical power from the flow of air, wherein the structural array may be a composite space frame wind producing array super structure. The space frame may be made of composite or alloy materials. The space frame may include variable profile structural members, variable solidity members, variable members, fixed members, and the like. The space frame may also include properties to enhance structural properties, material use, material cost, material weight, and the like.

In embodiments, the electrical system may present important aspects to the present invention, such as electrical distribution within the superstructure; dynamic voltage regulation; high voltage handling; load regulation; load management/load parsing, such as a higher load on the upper end of the array, parsing the load on a single machine with an array of turbines, and the like; load splitting; power/energy transfer, such as power conditioning of power from any array, network architecture to distribute load, managing a network, neural networks, substation, grid interface, and the like. In embodiments, the storage system may present important aspects to the present invention, such as whether energy to compress a fluid or gas, where energy diverts from the grid into a compression system to say, run turbine compressors off of energy, a water vessel to use heat as you are compressing, blowing compressed air into vortex tube, radiators on bottom of circulating chamber, build a mini version of the wind in a circulation chamber, put turbines in the configuration to produce a very efficient storage system, making wind flow based on hot and dense using nozzles to convert that helps stabilize the output over an hour and then goes out to the grid, stabilize over an hour, use vortex tubes to create massive pressure differentials, and the like.

In embodiments, the present invention may provide an array of nozzles adapted to generate electrical power from the flow of air, where an electrical load management facility may be provided for managing variable electrical load associated with different power generation components of the array. Alternately, a mechanical load management facility may be provided for managing variable electrical load associated with different power generation components of the array.

In embodiments, the present invention may provide an array of nozzles adapted to generate electrical power from the flow of air, where the array may include power control. The power control may be networked or non-networked. The networked power control may include power transfer, such as power transfer being integrated into the structural components, external to the structural components, including a network topography that minimizes resistance losses utilizing at least one of a branch and trunk network structure and direct generator-main trunk connection structure, and the like. The networked power control may optimize the power production within the array and monitor power production of the array for performance, maintenance, replacement, and the like. The networked power control may dynamically manage load requirements for at least one of a plurality of arrays. The networked power control may use optimization methods such as neural networks, genetic algorithms, fuzzy algorithms, probabilistic predictive-corrective feedback loops and the like, to provide maximizing output, minimizing losses, and the like. The networked power control may use a dedicated communications system, a routing system, distributed communications system, and the like, to control individual network elements within at least one of a plurality of arrays. The networked power control may utilize digital control. analog control, and the like, may utilize an electronics, electronics chip, electronics logic, and the like, use centralized or distributed processing, be hard-wired or wireless, including at least one of an electronics chip and management algorithm, and the like.

In embodiments, the present invention may provide an array of nozzles adapted to generate electrical power from the flow of air, where the array may include power conversion elements, power management elements, and the like. The power conversion and management elements may be connected to a power frequency converting mechanism, power conditioning mechanism, and the like, to prepare the power generated for storage, transmission, use, and the like, where the mechanism may be an LVDC converter, HVAC converter, LVDC frequency converter, HVAC frequency converter, and the like. In embodiments, power management may be local, global, and the like. The power conversion and power management elements may utilize power diodes, thyristors, transistors, power MOSFETs, IGBTs, and the like. In embodiments, the power conversion and power management elements may operate the array for fixed speed generation, operate the array for variable speed generation, performed by electrical facilities, performed by mechanical facilities, and the like.

In embodiments, the present invention may provide a nozzle adapted for use in a wind power generating turbine, where the nozzle may convert kinetic energy from the wind into at least one of electrical and mechanical energy. In embodiments, the conversion may be made with a conversion mechanism including at least one of a DC direct drive rotating machine, AC direct drive rotating machine, flywheel, generator, transmission/gearbox, synchronous singly-fed DC rotating machine, synchronous singly-fed AC rotating machine, asynchronous singly-fed DC machine, asynchronous singly-fed AC machine, asynchronous doubly-fed DC machine, asynchronous doubly-fed AC machine, induction singly-fed DC machine, induction singly-fed AC machine, induction doubly-fed DC machine, induction doubly-fed AC machine, MHD DC rotating machine, MHD AC rotating machine, Maglev DC rotating machine, Maglev AC rotating machine, low-speed DC rotating machine, low-speed AC rotating machine, medium speed DC rotating machine, medium speed AC rotating machine, high speed DC rotating machine, high speed AC rotating machine, variable speed DC rotating machine, variable speed AC rotating machine, fixed speed DC rotating machine, fixed speed AC rotating machine, variable frequency DC rotating machine, variable frequency AC rotating machine, fixed frequency DC rotating machine, fixed frequency AC rotating machine, squirrel cage DC rotating machine, squirrel cage AC rotating machine, permanent magnet DC rotating machine, permanent magnet AC rotating machine, self-excited DC rotating machine, self-excited AC rotating machine, superconductor DC or AC rotating machine, superconductor AC rotating machine, 1-n phase DC rotating machine, 1-n phase AC rotating machine, coreless DC rotating machine, coreless AC rotating machine, vibrational mechanism, and potential energy based mechanisms. The conversion mechanism may also be controlled by at least one of an electrical and mechanical power control management facility.

In embodiments, the present invention may provide a nozzle adapted for use in a wind power generating turbine, where the nozzle may include speed and load management facilities wherein the speed management optimizes the relationship of rotor speed, power conversion, and aerodynamic losses. The speed facilities may include electrical or mechanical mechanisms to operate the machine at variable or fixed speed. The load management facilities may include either electrical or mechanical management of the load applied to the rotor or generator. Electronic load management may be performed by means of power electronics. Mechanical load management may be performed by means of a transmission or gearbox or a geared, CVT, or applied field type.

In embodiments, the present invention may provide a nozzle adapted for use in a wind power generating turbine, where the nozzle may include power conversion management elements. The power conversion management elements may be connected to at least one of a power frequency converting mechanism, power frequency conditioning mechanism, LVDC to HVAC converter, LVDC to HVAC frequency converter, and the like, to prepare the power generated for at least one of storage, transmission, and use. The power management may be local, global, and the like. The power management elements may utilize power electronics, such as a power diode, thyristor, transistor, power MOSFET, IGBT, and the like. The power management elements may operate the array for fixed speed generation, variable speed generation, and the like. In embodiments, power management may be performed by mechanical facilities.

In embodiments, detailed aspects of the nozzle configuration may be important to the present invention, where the differentiators between current technologies and the current invention may include polygonal truncation of a figure of revolution to create the underlying geometry, leading edge (LE) geometry as constrained/determined by intake length, curvature, and LE angle relative to constriction, use of intake and constriction parameters to determine diffuser geometry, and the like.

In embodiments, the current invention may use a particular nozzle geometry to accelerate a flow under constriction to a high percentage of its theoretical velocity increase. The nozzle may conform to the basic Converging-Diverging or DeLavel structure with the constriction rate of the convergent end serving to accelerate the incoming flow and the diverging to "re-expand" said flow. The nozzle geometry may be based on a molecular fluid dynamics theory that differs substantially from the continuum approach and is also dissimilar to numerical methods, such as Lattice Boltzmann Method (LBM's) or Monte Carlo methods. The nozzle geometry differentiators may include the basis geometry, specific geometry with regard to LE characteristics and volumetric ratios, and surface geometry.

In embodiments, plane use optimization may be achieved by way of a basis quadric surface geometry wherein the inlet and exit geometry of the nozzle is formed by an asymmetric (with regard to both axes) hyperboloid of revolution of one sheet truncated at an orthogonal regular or Reuleaux polygonal boundary. The hyperboloid of revolution may be obtained by the use of an asymmetric catenary function or a closely similar combination of radial/elliptical or truncated radial/elliptical and linear functions. In an adjusted catenary form the hyperboloid of revolution can be obtained with the following equations and conditions. For the intake mapping values the hyperbolic cosine function, $y=a*\cos h(x/a)$, can be used for the set of real numbers where $x<0$ and where 'a' is determined as a function of desired rate of constriction and intake length. For exit values, the set of real numbers where $x>0$, the following formula is used, $y=(a''*\cos h(x/a''))-(a''-a)$, where n determines the rate of divergence/increase from the initial $(0, a)$ throat value for the y values of the function.

In embodiments, the polygonal truncation of the hyperboloid of revolution may allow the nozzle to cover a polygonal intake area with variable intake curvature while having an effective momentum focusing circular structure and expanding to a closely similar polygonal outlet area. The ability to cover a non-circular, for example a square inlet area, may immediately yield more efficient use of the fluid plane. The preferred polygons or combinations thereof are those that can be tightly packed and provide a minimal surface area solution with regular polygon/s used for complete plane coverage or Reuleaux polygon/s used when a percentage of freestream flow through the given structure is desired. Higher order regular polygons may also be used to allow a percentage of freestream flow.

With regard to the exit it can be formed either by truncation of the asymmetric catenoid or linear element or by interpolating the relative arc curvatures to from a value of $1/r_t$ at the throat (where $r_t$ is the radius of the throat) to 0 at the exit expanding therein to the dimensions of the entrance polygonal truncation. In the case of the Reuleaux polygon the curvature of the arc segment forming the sides is used as the lower value. In the regular polygon and Reuleaux polygon exit cases the geometry is based on the figure of revolution but does not constitute a figure of revolution. Additionally, in the case where a portion of parallel exit is preferred this can be added as an extension of the truncating polygon. In this regard, global (e.g. for the whole nozzles vs. a bounded area in the nozzle) rate of constriction and thereby the parameters of a regular truncating polygon is given by, $$r = Ai/At$$

$$\text{or } r = \frac{(n/4)s^2 \cot(\pi/n)}{\pi(.5d_t)^2} \text{ or } s = \frac{r\pi(.5d_t)^2}{(n/4)\cot(\pi/n)}^{.5}$$

where n is # of sides, s is the side length, r is the rate of constriction, and $d_t$ is the desired throat diameter.

The resultant geometry may be constrained by the following parameters in order to insure high-mass flow through the nozzle. The initial angular LE value of the radial or catenary function for the curvature of the constrictive region can be determined two dimensionally in its simplest form by using a radial arc approach and is given by the convergence of i for the following equations, $$i = \frac{.5(d_l - d_t)}{1/\sin\theta - (1/\sin\theta^2 - 1)^{.5}}$$

and $$i = \frac{d_t - .5(d_l - d_t)}{\tan\theta}$$

wherein $\theta$ = vector resulting from initial incident leading edge angle $i$ = intake length from leading edge to throat $d_l$ = diameter of intake $d_t$ = diameter of throat Dependent on the value of y and the rate of constriction, this can be a catenary, radial, elliptical, or truncated radial, truncated elliptical, or combination thereof constrictive/convergent section.

In embodiments, the present invention may provide a nozzle adapted for use in a wind power generating turbine. A nozzle may be adapted for use in a wind power generating turbine, where the maximal optimal curvature of the nozzle intake may be determined two dimensionally in its simplest form, such as in the case of a radial arc, may be given by the convergence at the initial angular leading edge, such as the value of i for the following equations: $i=(0.5(d_l-d_t))/(1/\sin\theta-(1/\sin\theta^2-1)^{0.5})$ and $i=(d_t-0.5(d_l-d_t))/(\tan\theta)$, where $\theta$=vector resulting from initial incident leading edge angle, i=intake length from leading edge to throat, $d_l$=diameter of intake, and $d_t$=diameter of throat. This optimization may be applied two dimensionally or three dimensionally to a catenary, radial, elliptical, truncated radial, truncated elliptical, or the like function. In addition, a nozzle may be adapted for use in a wind power generating turbine, where the optimal curvature of the nozzle intake may be greater than two times the throat diameter.

The geometry of the i value convergence may be applied globally across the intake derived from an i boundary maxima or at some lower boundary i value. It may also be applied locally with interpolated values, wherein the truncation boundary's minima and maxima are solved separately and then used with a weighted interpolation (matching the curvature of the maxima-minima interstitials) to determine the local i convergence relative to varying intake lengths across the polygonal boundary. When applied locally the resultant geometry does not conform to a normal figure of revolution as in the divergent case above. An additional constraint herein is that the mean value for i be preferably equal to or less than the diameter of the nozzle throat. An additional constraint is to maximize the rate of curvature of the wall within the other geometric parameters and this can be inherently optimized by the preceding equations. In this regard the value of $\theta$ can be relaxed by a coefficient defined by the following relationship: $C_r=1+2((1/r)^r)$, wherein r is the rate of constriction. Thereby the relaxation coefficient approaches a minimal value as the rate of constriction increases.

Extant "optimal" intake curvatures, researched under pressurized conditions, indicate that the optimal curvature for a radial nozzle, regardless of rate of constriction, is an arc section from a circle between 1.8 to 2 d where d is the diameter of the throat. Research in furtherance of this invention has shown that such curvature engenders the loss of a large portion of the mass available at the intake area.

With regard to the divergent portion of the nozzle an angular value from throat to exit may be used to determine the volumetric ratio of the divergent length to convergent length. The constraint herein is that the angle of the divergent wall be no more than 5 degrees, with the angle relative to rate of constriction preferred being described by the following equation, $\emptyset=C_d(a+b+b^{5+a})$ where $a=1/r$, $b=r^{1/r}$, and $C_d$ is an adjustment coefficient related to intake length, wherein r is the rate of constriction. Therefore the divergent geometry is the current invention is predicated on a ratio of rate of constriction to intake length to divergent length that results in convergent to divergent volumes wherein the volumetric ratio increases with the rate of constriction. It is this combination of specific LE geometry with a variable, rate of constriction and intake dependent, convergent-divergent volumetric ratio that enables high percentage mass flows. Additionally the complexity of the surface geometry of the nozzle can be increased by application of quadric or other complex structures to the basis geometry. This may include small-scale structures used for flow enhancement or larger scale structures for structural or flow enhancement.

Said quadric functions can be bounded to create n-structure surfaces, e.g. scales or dimples, or can be applied globally across the surface as in corrugation or scalloping or rearward truncated scalloping, bounded by the initial truncating polygon. Scale and origin points of the quadric structures can be varied and the surfaces can be compound, with multiple layers of quadric structures mapped against the preceding layers' basis geometry. This allows the combination of various global and local flow-enhancing elements to maximize the nozzle mass throughput. Additionally said quadric structures can have drill-throughs in either single layer or channel implementations to the near wall characteristics of the flow.

In embodiments, the present invention may provide a nozzle adapted for use in a wind power generating turbine. The nozzle may include a variable wall profile, such as a wall profile utilizing linear scalloping. The nozzle may include complex wall topography, where the complex wall topography may maximize structural properties, minimize material use, minimize material weight, and the like. The complex wall topography may have a uniform circular profile, polygonal profile, and the like. The complex wall topography may provide a variable profile, such as with linear scalloping, being generally radially curved, being generally elliptically curved, and the like. The complex wall topography may provide a variable density structure, uniform, variable, and the like. In embodiments, the complex wall topography may provide nozzle components that may be variably adapted to the lowest cost solution for local load bearing parameters within the nozzle. The complex wall topography may provide nozzle components that are made of rigid materials, flexible materials, and the like.

In embodiments, the performance characteristics may be provided. A number of single layer quadric truncated and non-truncated nozzles have been fabricated based on the above parameters. Nozzle constriction rates have ranged from 2-4 with regard to the ratio of the intake to the throat. In cases where the desired rate of constriction exceeds 4, single layer quadric geometries are insoluble as i tends to infinity within the constraint of the LE vector solution. In such cases multi-layer and/or multi-body quadric structures are preferred. Nozzles were fabricated in two throat size ranges 25 cm and 10 cm with the attendant geometric parameters deriving from the structural descriptions above.

As is well known in the art the Bernoulli equation describes the continuum pressure-velocity relationship of a fluid flowing through a constriction wherein the rate of constriction results in an equal rate of acceleration for the mass in question as detailed by the change in KE (u) and internal energy (p). The majority of extant work in nozzle optimization is therefore based on pressure measurements. There is however a substantial divergence in the prior art (Reid et al) between the empirical measurement of volumetric mass flow and. pressure efficiency of nozzles. This indicates that, with regard nozzle efficiency, pressure might not be the most accurate variable. The mass throughput of a particular nozzle geometry is the variable of primary importance in categorizing efficiency. Mass flow efficiency categorization of these nozzles derives from velocity and power data. In comparing velocity results with power results, which are directly dependent on mass throughput, the nozzle performance can be accurately judged by their close agreement. The velocity relationship relies on the mass flow equation, Mdot=puA, where p equals density, such that, for given areas $A_1$ and $A_2$, $Mdot_{a1}=p_1 A_1 u_I$, and $Mdot_{a2}=p_t A_2 u_t$, and solving for $u_t$ with Mdot and p values being the same for both in incompressible flow gives, $u_t=u_I A_1/A_2$ or simply the $u_I$ value is multiplied by constriction ratio of the intake to the throat thereby providing the theoretical velocity increase in u for a given constriction.

Mass loss to the exterior of the nozzle will therefore be apparent in the velocity measurements based on the following, where the maximum mass flow rate is $Mdot_{max}=p\ u_I A_1$ and, $Mdot_{actual}=pu_a A_2$, mass loss % at throat=$u_a A_2/u_I A_1$=$Mdot_{actual}/Mdot_{max}$ by which the mass efficiency of the nozzle can be judged based on actual velocity measurements. With regard to power analysis, the power equation can be derived by combining the KE and mass flow equations wherein the Mdot term is substituted for the mass term. Thereby the theoretical ratio of power at the intake and throat adjusted for area difference becomes, $$R_{pt:pi} = \frac{(A_i(A_t/A_i))*p*(u_iA_i/A_t)^3}{A_ipu_i^3} = \frac{A_t}{A_i} * \frac{u_i^3 A_I}{A_t} * \frac{1}{u_I}^3 = \frac{A_I^2}{A_t}$$

And therefore, $$Pt=Pi*R_{pt:pi}$$

And the nozzle mass flow can be expressed as a function of power, $Mdot_{actual}=P_{actual}/0.5u_{actual}^2$ Where, $u_{actual}=(0.5\ A_t p/P_{actual})^{1/3}$ and given simultaneous measurement inside and outside the nozzle, $Mdot_{actual}/Mdot_{max}=(P_{actual}/0.5u_{actual}^2)/(P_{max}/0.5u_{max}^2)$. Where, $u_{max}=u_I A_i/A_t=(0.5 A_t p/P_{max})^{1/3}$ and, $P_{max}=P_i*(A_i/A_t)^2$. Thus the same mass loss rate can be determined as in the velocity case. For example a nozzle with a constriction of 2 would yield a 2 times velocity increase and a 4 times power increase. If the mean measured velocity increase is 1.7, the mass flow efficiency would be approximately 0.85 of the maximal value. With regard to power this mass flow results in a power increase of approximately 2.5. Conversely, a mean velocity increase of 1.85 indicates a 0.94 value for mass flow which results in a 3.3 power multiple.

With regard to the structural parameters described above optimum mass flow performance range for this nozzle type is detailed in the following table:
Table of Optimum Parameters for Structural Variables with Mass Throughput and Measurement Ranges:

| r | $\Theta_{LE}$ | $C_r$ | $L_i/d_t$ | $L_d/L_i$ | $\varnothing_D$ | Mdot % | V inc. mean | P inc. mean |
|---|---|---|---|---|---|---|---|---|
| 2 | 31 | 0.5 | >1, opt .5 | >6 | <2 | .92-1 | 1.8-2 | 3-4 |
| 2.75 | 27 | 0.12 | >1, opt .8 | >8 | <1.5 | .95-1 | 2.5-2.75 | 5.625-7.56 |
| 4 | 25 | 0.03 | >1, opt ~1 | >12 | <1 | .815-0.9 | 3.25-3.6 | 8.66-11.6 |

It was found that divergent length and function thereof is mainly dependent on intake length not throat diameter, as in prior art, although in higher rate constrictions these values are forced to approach each other by geometric and curvature constraints. Variation of the intake length and the diffuser length but not the throat diameter resulted in little or no performance difference, providing the ratio of $L_d/L_i$ was maintained, $L_i<d_t$, and the nozzle conformed to the other geometric parameters. Variation of throat diameter with static $L_d/L_i$ proportions again resulted in little or no performance difference.

The optimum divergence angle was found to differ from those previously described in the art. It was also found that the narrowness of the optimum range was inversely proportional to the rate of constriction. Mass throughput degraded steeply in testing outside the optimum range described. Higher rate constriction nozzles were especially sensitive. Additionally it was found that variation of intake length in excess of the described range substantially degraded performance especially if combined with a variation of the diffuser length below the described range.

No substantial mass flow difference was noted between truncated and non-truncated nozzles of the same rating, indicating that the truncated nozzle might be more efficient simply based on its geometric coverage of the wind plane, and therefore preferred. Additionally a 2.75 nozzle had a secondary quadric layer applied after its initial phase of testing. A performance improvement based on power capture was noted. Additionally the nozzles were tested in staged and nested configurations wherein in the first case the nozzles were tested at some nominal separation with little or no performance degradation. In the second case nozzles were nested within each other with the smaller being placed at a nominal distance rearward of the larger throat to achieve better throughput on higher rate constrictions.

As detailed in the previous section nozzle flow acceleration is premised on the principle of conservation of mass. Bernoulli and Navier-Stokes equations are considered the governing equations for fluid flow at standard pressure and density. This regimen is generally known as the continuum regimen wherein a fluid model is based on macroscopic properties. Navier-Stokes equations are usually solved numerically as no general solution is known. In addition to these approaches there are various numerical methods applied to fluid flows ranging from Lattice Boltzmann to Monte Carlo methods. At some level however most of these solutions are based on empirical adjustment of the theoretical result to match test data. Additionally there is very little wide-scope experimental data regarding the performance of nozzles. Gibson and Reid provide the most comprehensive data in the art but in both cases the studies are limited to isolating the effects of one characteristic of the nozzle such as 2 dimensional divergent length in Reid. Most recent work is premised on numerical estimations or design testing.

Numerical studies such as Tekriwal use pressure variables to calculate accuracy of numerical simulation against empirical pressure data, but ignore flow rates or derive flow rates from the pressure variables. Additionally the basic assumptions therein are based mainly on the work of Gibson and Reid which are relatively constrained in scope. Problematically prior art provides no satisfying explanation for the nozzle's improved function with the divergent section in the subsonic regimen. Likewise there is little research on the actual properties of a flow along a gradient. Formulas such as the linear interpolation pressure gradient force (PGF) equation, $$F(m/s^2) = \frac{1}{p} * \frac{p_1 - p_2}{n},$$

approximate flows reasonably well but do little explain the mechanisms of the flow itself or the properties said flow displays either at initial condition or in steady state. As can also be seen the simultaneous use of the pressure and density terms is problematic.

This can be said generally of the fluid dynamics equations. They are very good for approximating performance under specific conditions, usually pressurized, but generally the solutions do not match experimental data closely in the area under consideration, e.g. mismatch between theoretical performance and test data that is especially true of nozzles. The almost complete lack of research in non-pressurized conditions adds to the imperfect understanding of nozzle function. The divergence between experimental data and theory is usually explained by variation of a real gas from an ideal gas or frictional effects or some slight error in fabrication. More likely it is due to oppositional geometry enhancing flow effects that would otherwise by masked by the free volume proportions of single-body research.

Since single-body constitutes the majority of solid body research data and the basis of Prandtl boundary layer theory and Blasius' work, the error rate in predicting nozzle performance is a strong indicator that there are some inherent flaws to understanding the mechanics of flows as embodied by the fluid dynamics (FD) equations. For these reasons extant theory does not provide a solid basis from which to optimize nozzle design in and of itself. Given the dearth of experimental data in the area especially in the subsonic regimen this means that use of extant theory to enhance design is mainly educated guesswork.

Since an efficient nozzle design is one of the purposes of this invention, it was desirable to develop a flow model which indicated different design paths by which a nozzle might be optimized, one which explained the interaction of the various nozzle regions and which matched experimental data. This requires a detailing of the problems with the current set of assumptions and development of a model of the types of flows a nozzle such as the designs described herein are likely to encounter in operation and thence a more in depth description of solid body interaction with said flows.

The most pressing problems in this regard may include, assumption of solid body interaction being substantially similar regardless of the type of fluid flow, use of the Pressure Gradient "force" (PGF) to explain the mechanism of fluid flows, assumption that subsonic flow in the continuum regimen is of uniform density, assumptions associated with the distinctness of free-stream and boundary layer, assumption that pressure can provide a substantially accurate description of fluid behavior, assumption that pressure, velocity, and density are substantially differentiated variables, and the like.

First there are two distinct conditions that result in fluid flows. One is when a displacement volume is introduced into a fluid system that results in the distribution of the momentum from the volume of introduction throughout the system until the system again reaches a state of equilibrium. Two is when energy is introduced into a fluid system that effects the system-wide distribution such that flow is created by the properties of the imbalance in distribution and continues until a state of equilibrium is again reached. Solid body interaction with a flow that is substantially of one type or another must, by its very nature, have different parameters. Any given flow is likely to include elements of each type of flow (e.g. a plane flying into a headwind), but the majority of interaction in a given localized system can usually be ascribed to one or the other. These two types of flow are best described as wake flow and gradient flow. In the first case introduced force drives the flow, whereas in the second case density drives the flow.

This brings us to a second adjustment with regard to the current model of flows. Both the macroscopic and microscopic properties of a fluid flow are describable by revising the variable set used. In this regard the Bernoulli equation can be characterized as a statement of proportion and, while useful for measurement, it is not very useful for mechanics. The macroscopic pressure-velocity relationship is simply a convenient description of the proportion of unidirectional net momentum vs. omni-directional momentum at the molecular level as determined by the thermal/energy properties of the system in question, wherein the unidirectional component is the bulk velocity and the omni-directional is the bulk "pressure". In the case where this net flux across the system in question has not been caused by displacement, there is only one potential source—statistical movement based on the kinetic energy of the molecules in the system and a variation in molecular density.

This can be most conveniently viewed in the context of an n-dimensional matrix for which the population of the matrix has n degrees of freedom from state t to state t+1 wherein the probability of any given path is substantially equal and random and the population is constrained to shift position at every time step, e.g. Brownian motion. The desired sampling rate of said matrix would be the mean molecular separation although the matrix can be scaled to represent the mean properties of groups of molecules. If the matrix is subjected to a sparse-dense mapping wherein the population of the matrix is denser in area a than in area b, then the statistical net momentum/movement, e.g. flow, is found in the dense to sparse direction. Providing an approximation of thermal energy input into a system by constraining density variation at each time step to be substantially similar to the preceding time step, this method of representation provides a close approximation of short-term steady state flow as one might find in a wind system.

From this model it is clear that gradient flows are a statistical expression of the density variation in a system and the level of kinetic energy present in the system, not the product of PG "force". Thereby the continuum assumption of uniform density in a fluid flow in the subsonic regimen is clearly at odds with the mechanics of the flow itself. Therefore the assumption of uniform density must be held to local constraints of intermolecular repulsion and thermal expansion.

Additionally it can be seen that both the macroscopic properties of velocity and pressure are functions of the microscopic properties of molecular density, root-mean-square (RMS) velocity, and translational momentum. In this regard these macroscopic variables can be done away with in favor of the more accurate model. This revised model must now be developed to be of use in solid body design. The first step therein is a definition of the mechanics of the flow.

Similar to the rest energy calculation the potential maximum of the flow in terms of energy or velocity can be calculated based on an instantaneous unidirectional flow, e.g. all molecules flowing from a standard density region to vacuum, by setting the velocity equal to the mean RMS velocity of the mass under examination. In this way any portional flow can be characterized as a percentage of the RMS unidirectional velocity.

Since velocity can be expressed as a function of momentum and mass, the velocity of a given intermolecular slice can be expressed as the net transfer of momentum and mass between slices with the mass transfer between the slices determined by the density : sparsity difference. In a steady state flow this transfer would be constant between the slices somewhat similar to a cascade effect.

In this regard there will be a net momentum increase between any given pair of slices, $n_n$ and $n_{n+1}$. At each slice $n_1$, $n_2$, $n_3$ ... $n_n$ the momentum increase will be additive in the sparse direction as each slice has a net momentum increase between samples t and t+1. Thereby the velocity profile of the gradient field is dependent on the specific dense sparse distribution of molecules for the field in question and the sum of momentum transfer and number of slices within the field.

In this way the macroscopic properties of velocity, e.g. the bulk transfer of mass over a given distance, can now be represented by the microscopic fluid conditions and more specifically the microscopic momentum field.

This is of special import with regard to the introduction of a solid body into the gradient field. Specifically with regard to nozzles this implies that the velocity increase at the throat is no longer a function of mass conservation as in the continuum model. Instead it results from changes in the density gradient field caused by the introduction of the solid body and differences in the momentum transfer resulting from those changes.

The nature of the field in the steady state may be such that the maximal value the rate of momentum transfer may be concurrent with the maximal rate of change in the density gradient wherein said rate of change can be assumed to be non-linear and likely parabolic.

With the uniform density constraint relaxed and the bulk properties no longer dependent on mass conservation, this has substantial implications with regard to boundary layer. Assumptions of the distinct separation between conditions in the boundary layer and the freestream are no longer valid as the foundation for the boundary and freestream separation is the mass continuity of the freestream.

It is useful now to treat the nozzle as a separate field within the larger density field. Assuming steady state condition for a nozzle in a gradient flow, the maximum rate of constriction for a radial inlet nozzle occurs at the leading edge of the nozzle inlet. This implies that the greatest density change within the nozzle field will occur in the region of the leading edge. Density will increase proportionally to the local rate of constriction and the thermal constraints of the field and thereby momentum will increase in the flow direction at a similar rate.

This has several implications for the visible boundary layer. While some momentum is lost in the LE region as incident molecules collide with the nozzle wall, subsequent collisions should conform to general parameters of elastic collisions between molecules. Thereby there exists a mean (e.g. statistically directional diffuse reflection) direction of the n molecules incident to the LE, with some parameter of momentum loss. The momentum vector of the molecules deflecting from the LE region will reflect into the stream upon each collision while the individual molecules will continue to collide with incoming molecules on a mean free path basis until the initial incident path becomes closely orthogonal to the nozzle wall. Under this model there is a formation of a boundary layer which satisfies the no slip and visible boundary layer conditions but this boundary layer does not contain the momentum as is assumed in extant boundary layer theory.

With regard to design optimization this implies that the LE vector is of substantial importance in transferring momentum into the inward intake regions. Additionally this implies that there is a relationship between the rate of constriction and parameters of the LE dependent nozzle function as is borne out by experimental data.

Conversely there is a limit at which the density increase becomes such that the net momentum transfer from the external field into the LE region is opposed by the density increase such that there is also probabilistic momentum transfer in the direction generally opposite to the flow engendering mass loss. Such a condition leads to the entrainment of less mass into the nozzle and mass and momentum loss to the exterior of the intake and a lesser rate of momentum transfer to the inward regions of the intake.

This condition can be experimentally observed most easily in a converging nozzle. In a converging nozzle as the rate of constriction grows the rate of velocity increase is noted to shrink indicating a mass build up in and forward of the intake. This is observable in smoke visualizations of converging nozzles wherein when the rate of constriction becomes sufficiently large the flow becomes stagnant to the point where the observable boundary layer does not form. Length over which the constriction occurs also contributes to this effect. It can also been seen in the attachment of shock to a solid body in the sonic regimen.

A velocity increase is noted in the use of a converging nozzle usually at much lower rate than the theoretical increase. An examination of the density gradient in the converging section is of interest here. As the LE density condition increases a region of additional sparsity is created rearward of the LE. In the case of a strictly converging nozzle the exterior field density at the throat is not a sufficient gradient for the flow to attain a rate of momentum sufficient to clear the LE density and allow the full mass available at the intake to enter the nozzle.

Under such conditions it is likely for the momentum field to be parabolic achieving a maximum rate within the inlet where the rate of constriction acts as a counterbalance to the potential maximum rate of transfer.

As a note this model also serves to explain the experimental difference between radial and straight inlets. In a radial inlet the maximum rate of constriction is localized to a relatively small region wherein the density increase is localized. Conversely a straight or funnel inlet has a constant rate of constriction creating a constant density increase through the intake to the throat.

With a localized density region at the LE the diffuser functions to increase the dense sparse rate of the gradient field which the nozzle contains. The increased diffuser length with increased constriction serves to increase the volumetric ratio by which the gradient is controlled and thereby clear the forward density in the LE region. Based on the rate of constriction and thereby the rate of LE density increase, the length of the diffuser determines whether the rate of maximum momentum transfer is at or close to the throat.

If this maximal rate is clear of the intake region, a condition exists such that the increased density is cleared and the limiting condition resulting in flow opposing the flow field is not reached. The increased velocity at the throat is thereby due to the combination of the gradient between the LE region and the exit and the initial momentum influx from the exterior field. In this regard the diffuser serves to control both the properties of the gradient field and the rate at which the mass and momentum transfer occurs from the throat to the exit.

Figure 27:
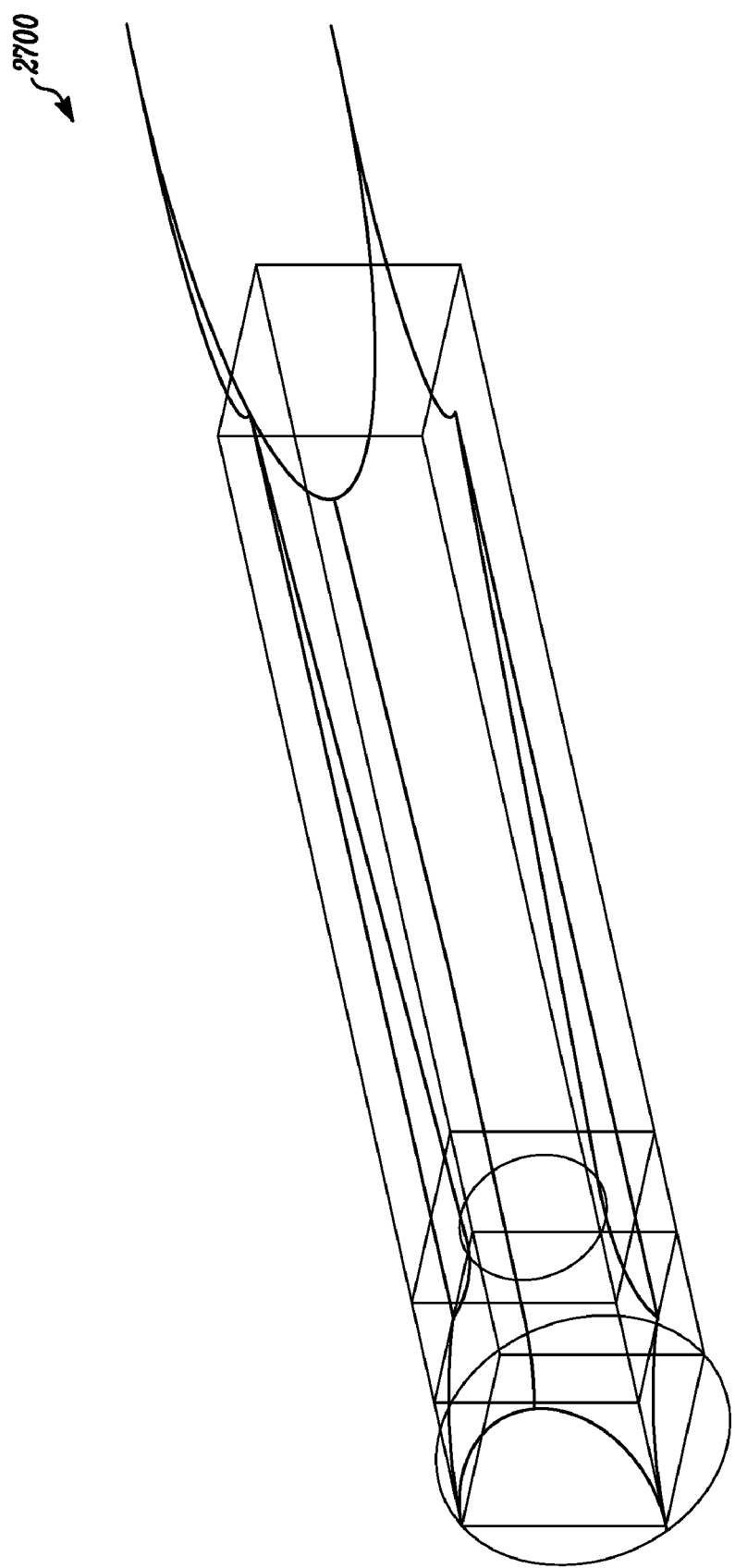
FIG. 27 depicts a nozzle with truncation intake and exit.
Figure 28:
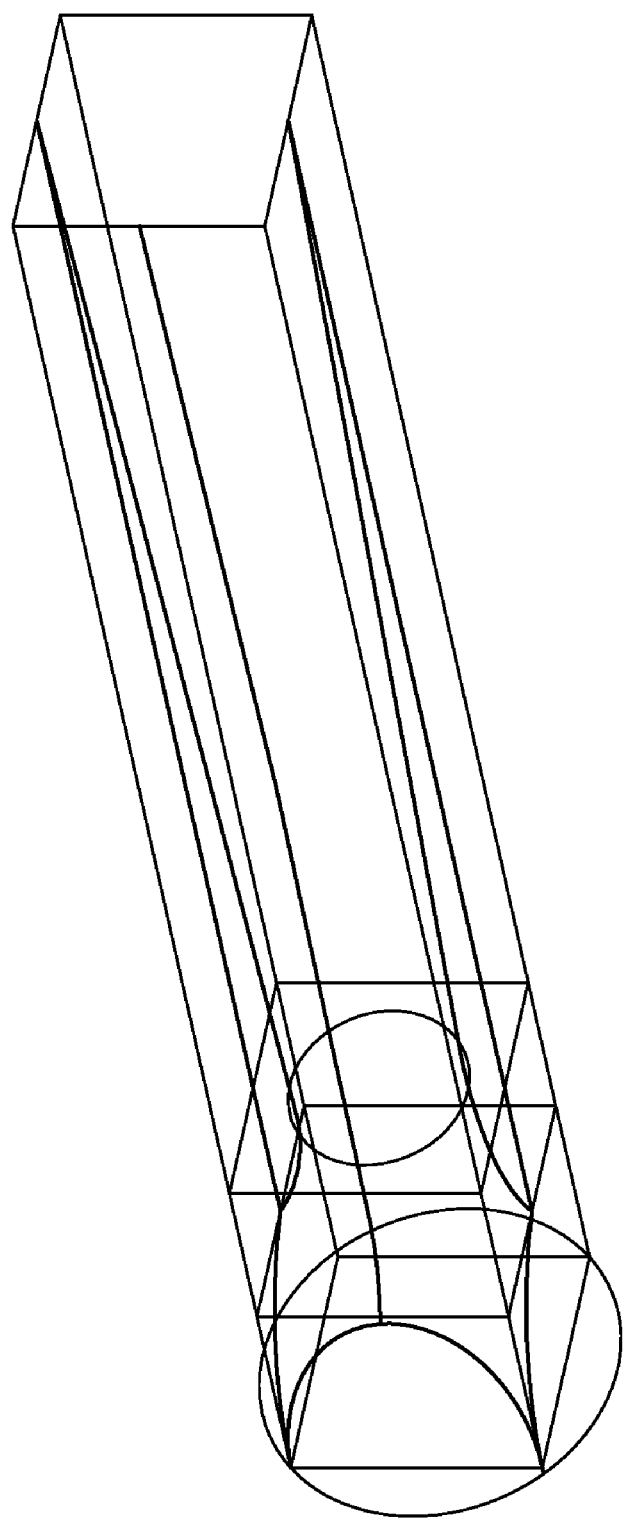
FIG. 28 depicts a nozzle with truncated intake and 1/r–0 interpolated curvature.
Figure 29:
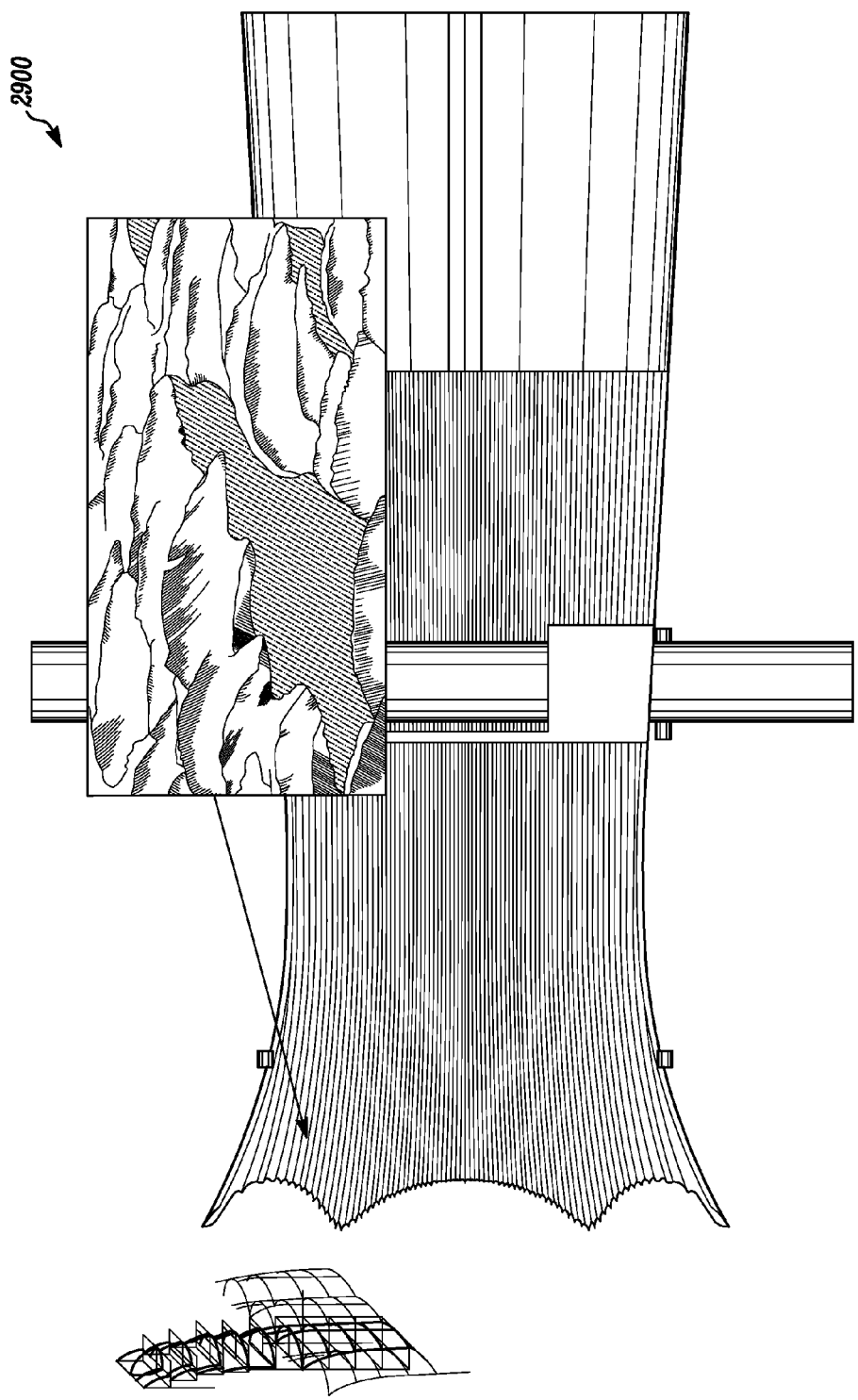
FIG. 29 depicts an arc section diagram for inlet geometry.

In embodiments, this describes the basic function of the nozzle regions under a revised model. This model delineates the properties of the different nozzle regions and provides a foundation both for the explanation of regional function and the design of high throughput nozzles. In illustration of the above discussion, FIG. 27 depicts a nozzle with truncation intake and exit 2700, FIG. 28 depicts a Nozzle with truncated intake and 1/r–0 interpolated curvature 2800, and FIG. 29 depicts an arc section diagram for inlet geometry 2900.

In embodiments, aspects of a variable blade rotor are presented. A variable blade number-type rotor is described wherein the number of blades a rotor presents to the flow varies with flow speed. In an embodiment, FIG. 30 depicts a six-blade open configuration 3002, showing the primary 3004 and secondary 3008 blade, and the primary 3010 and secondary 3012 hub of the pressure mechanism. As is well known in disc theory, rotors with different numbers of blades and different profiles have performance profiles that closely fit a given flow velocity range. Since it is desirable to optimize the power output of a flow driven power device, a rotor that adapts the disc solidity presented to the flow would be more efficient at gathering power across a variety of speed regimens than a fixed solidity rotor.

Figure 31:
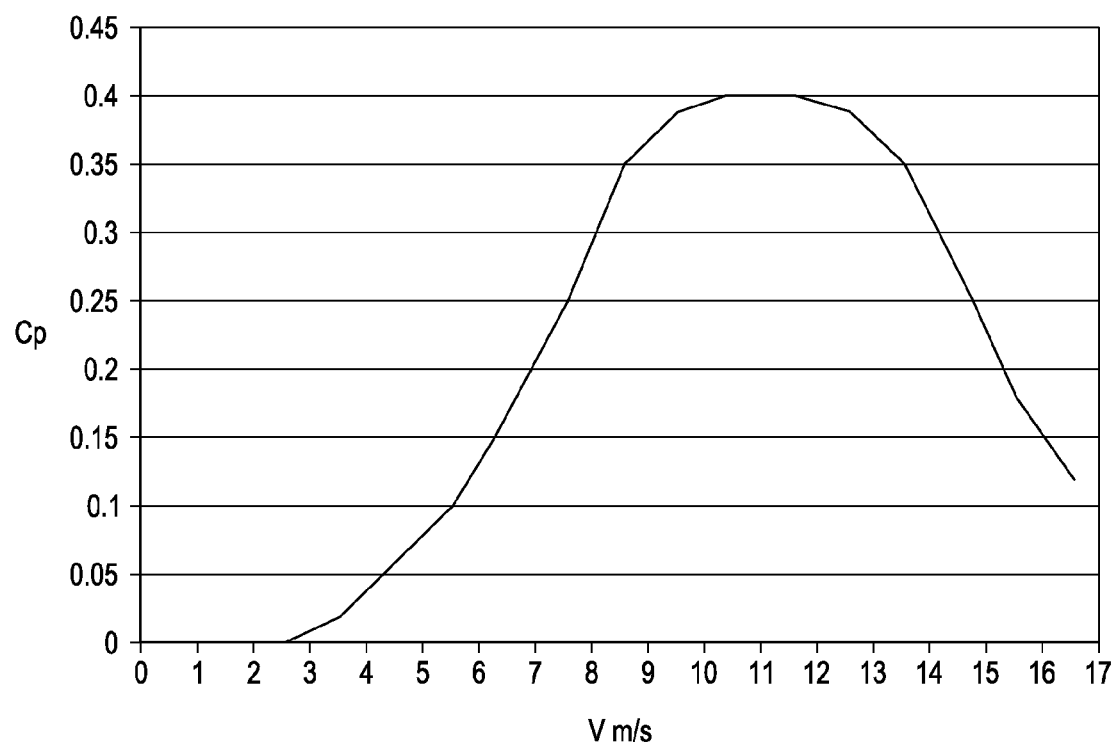
FIG. 31 depicts a 3-blade rotor efficiency plot.

A 3-blade rotor efficiency plot 3100 is shown in FIG. 31. $C_p$ represents the proportion of power available at the area covered that the rotor is able to convert. This is a direct result of the rotational speed as it relates to tip/blade speed and the loading of the rotor through the generator. The power plot of this relationship forms the well-known power curve.

Figure 32:
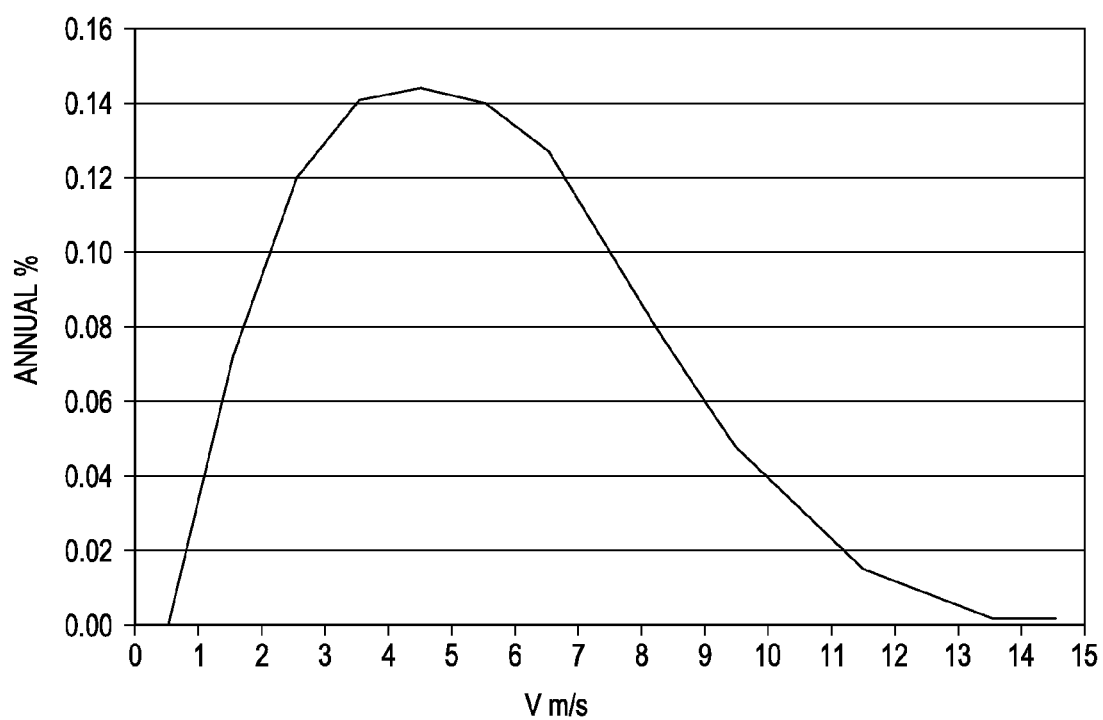
FIG. 32 depicts a plot of annual velocity distribution.
Figure 33:
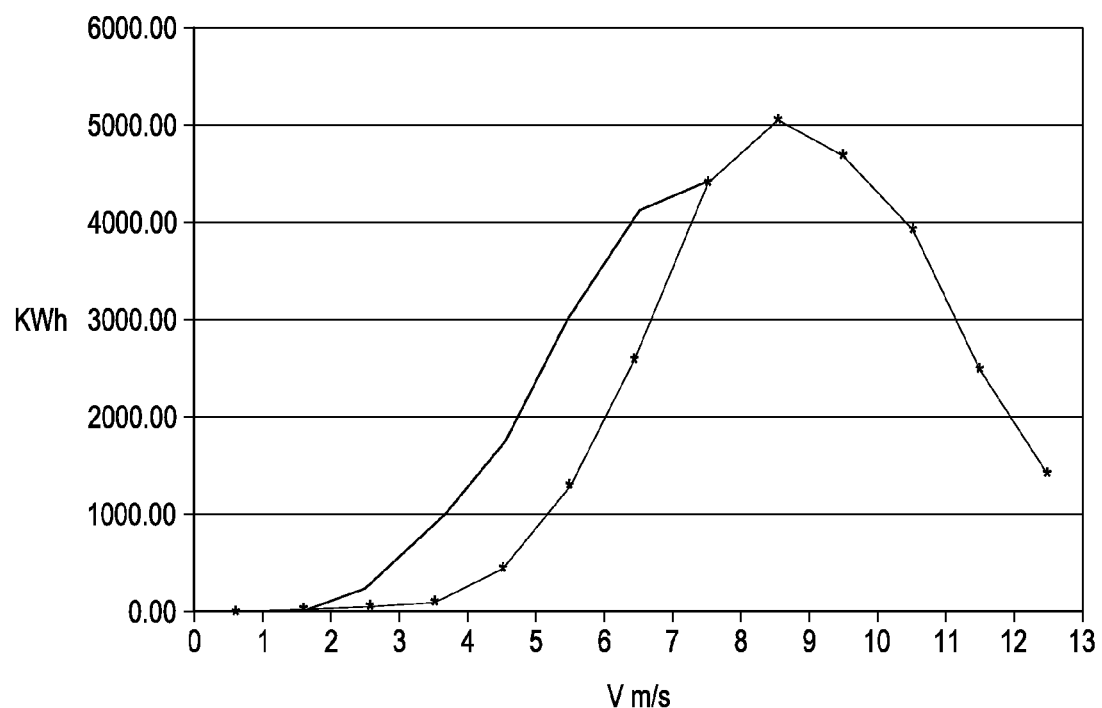
FIG. 33 depicts an annual distribution power output by linear velocity.

FIG. 32 shows a Weilbull distribution of annual velocity 3200. Taken in combination these result in FIG. 33, a comparison 3300 of a 6>3-blade $C_p$ profile and a 3-blade $C_p$ profile for annual power : velocity distribution. As linear velocity increases, tip speed increases, and the rotor reaches a limiting rotational value based on the aerodynamic properties of the blades and disc solidity making the typical 6-bladed rotor inefficient in the ranges above 6 m/s.

Figure 34:
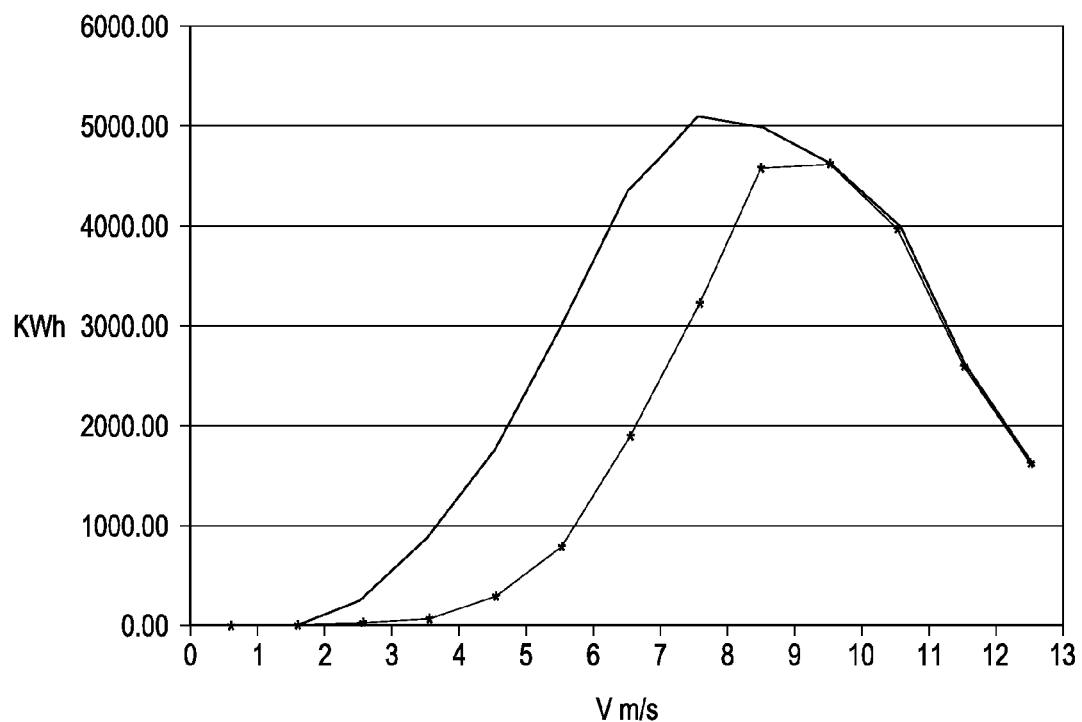
FIG. 34 depicts annual distribution with heavier loading to shift.

While this efficiency range is highly dependent on the loading scheme both with regard to the gearbox/transmission and electrical loads, assuming an optimized design for both mechanical and electrical loading there is a clear efficiency limit to a blade set based on its rotational speed. Enhanced loading schemes, as plotted 3400 in FIG. 34, that shift the rotational aerodynamic efficiency range upward without negatively effecting efficiency of power capture are preferred in this invention. That said, in the 1 m/s to 6 m/s range the 6-bladed rotor captures more of the KE available in the raw flow. Given a situation wherein the majority of a given flow on a time period basis is in the lower ranges the advantage of having variable disc solidity is clear.

The variable solidity rotor may have a plurality of prime number rotors sets (e.g. 1, 2, 3, 5, etc) co-axially mounted inclusive of a facility which allows the secondary, tertiary, . . . nth rotor set to slot into each preceding set. As an example, for a 3 blade primary rotor with three sets, the initial stage would be a 12 blade rotor which would close to a 6 blade rotor and then into the primary set of 3.

The facility for closing said primary rotor sets may be inclusive of both dynamic pressure driven and/or actuator/mechanical methods. Rotor sets can either be of closely similar properties in terms of aerodynamics and mass or of divergent blade structural, mass, and aerodynamic properties.

In embodiments, rotor sets may be mounted to a series of dual position slip rings wherein when the dynamic force on a given set is exceeded the ring is released and dynamic force on the blades shifts it to a closed position on the following set of blades. A mechanism is slotted on closure such that when the dynamic force on the closed blade sets indicates a drop in velocity the blade set is released to open position.

In this embodiment the rotor is constituted of 3 sets wherein the primary set is a structurally reinforced swept-twist thin airfoil blade and the secondary set and tertiary sets are thin swept-twist airfoils. The camber geometry of the secondary set is fitted to the lower surface of the tertiary set and similar fitting geometry is used for the primary and secondary sets. Geometry is such that the blade pitch between states is not altered. Each set is optimized for higher-speed profiles, to extend the usable range of each blade state to maximum efficiency.

Figure 35:
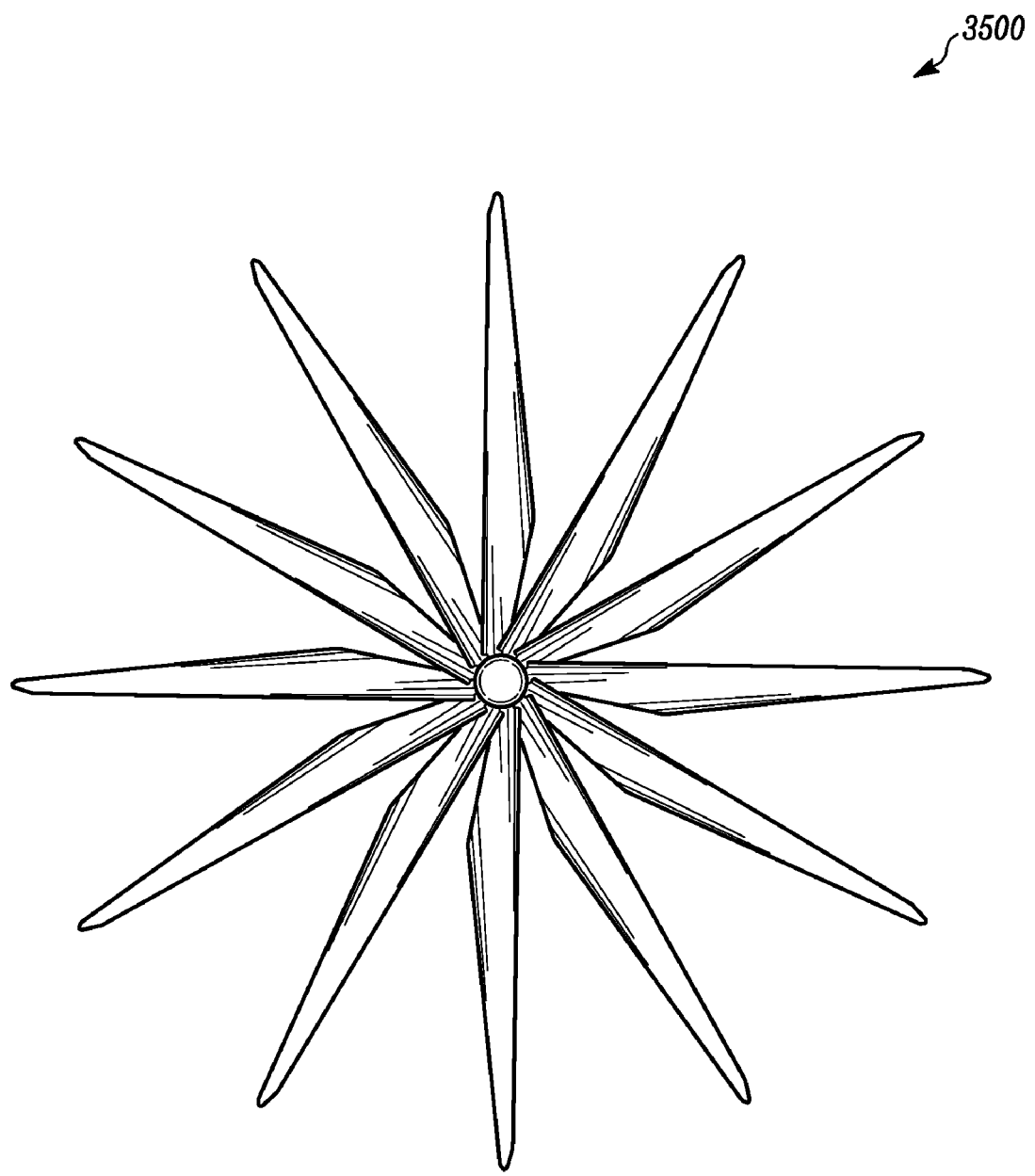
FIG. 35 depicts 12 blades in an open position, where velocity is approximately in the range of 1-3 m/s.
Figure 36:
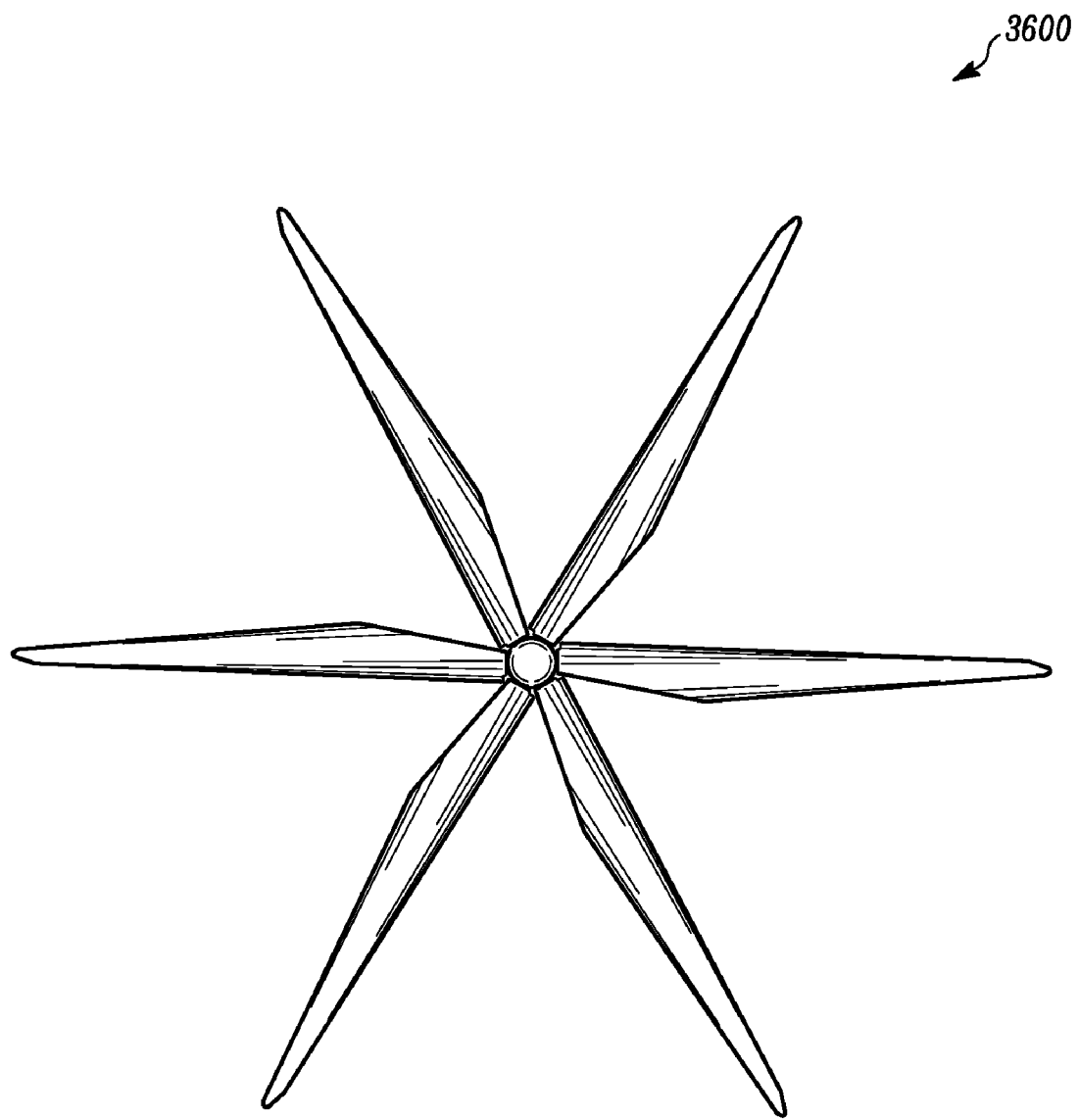
FIG. 36 depicts 6 blades in an open position, where velocity is approximately in the range of 3-6 m/s.
Figure 37:
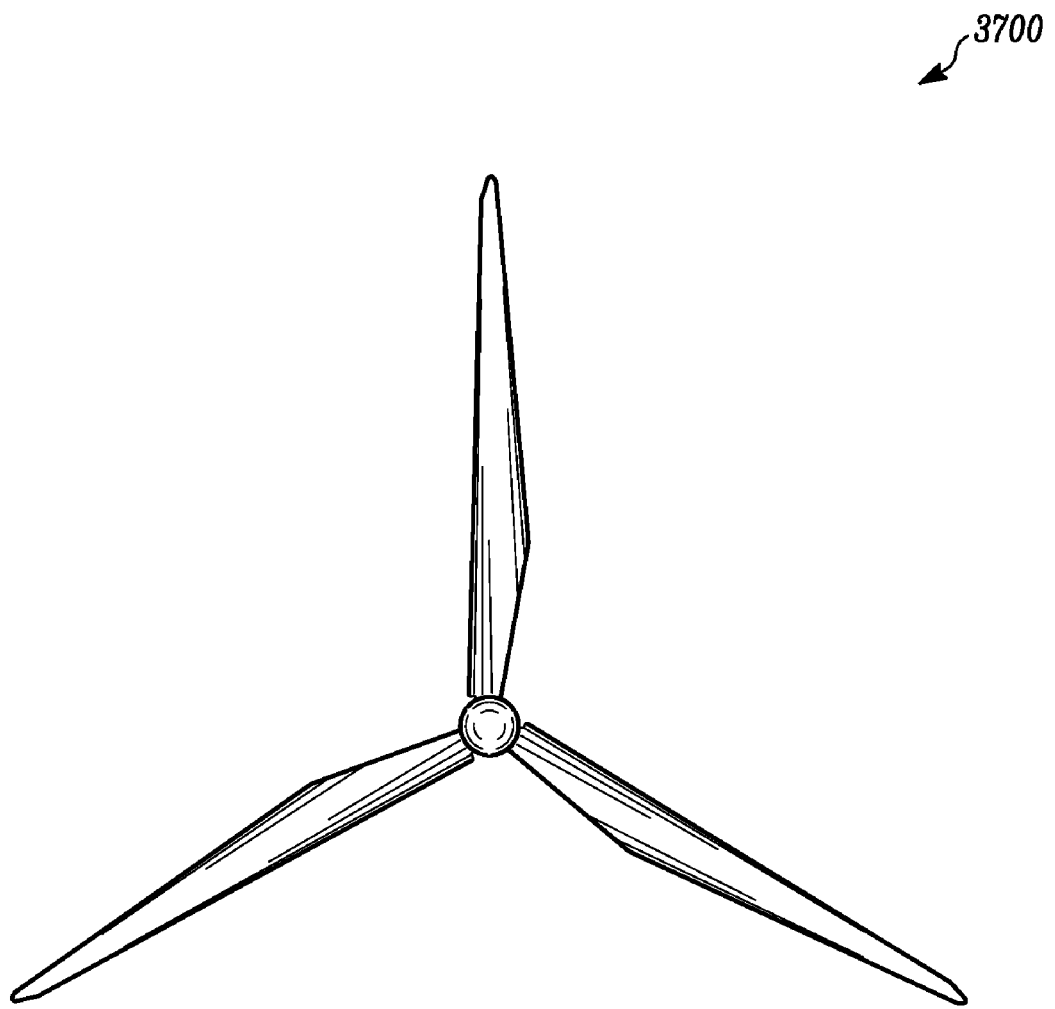
FIG. 37 depicts 3 blades in a closed position, where velocity is approximately 6+m/s.
Figure 38:
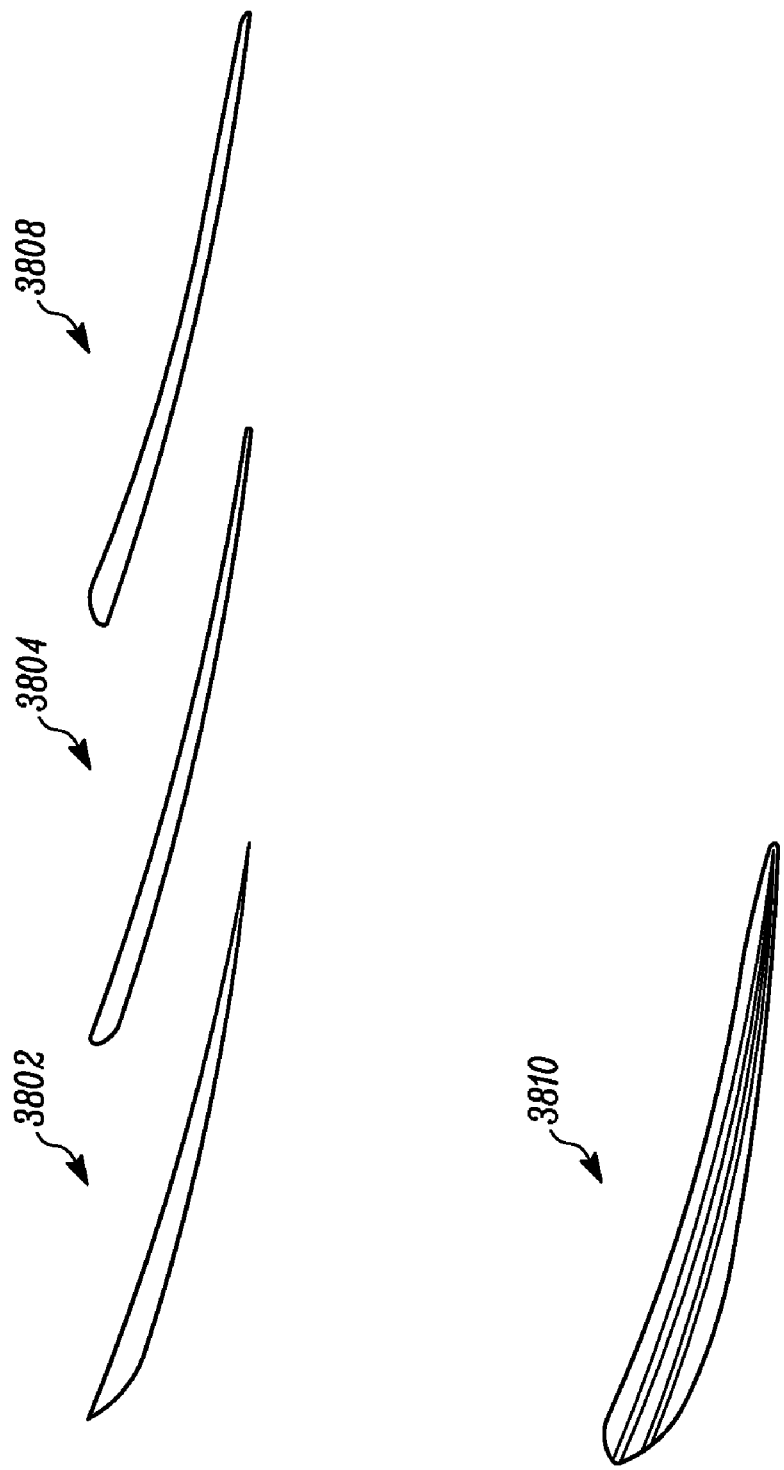
FIG. 38 depicts a sample of open and closed profiles.

In embodiments, the primary blade set is inclusive of structural components that allow mass distribution to be controlled on the rotor per provisional application. FIGS. 35-38 show certain aspects of the blade configurations previously discussed, where FIG. 35 depicts 12 blades in an open position 3500, where velocity is approximately in the range of 1-3 m/s, FIG. 36 depicts 6 blades in an open position 3600, where velocity is approximately in the range of 3-6 m/s, FIG. 37 depicts 3 blades in a closed position 3700, where velocity is approximately 6+m/s, and FIG. 38 depicts a sample of open and closed profiles 3210, where the open profile shows the primary blade 3802, the secondary blade 3204, and the tertiary blade 3208.

In embodiments, an inertial rotor may provide advantages by enhancing rotational stability under dynamically variable conditions, wherein the outward centripetal force of the rotation is used to enhance the inertia of a rotating body by way of a variable radius mass distribution system. A material may be allowed to move based on centripetal motion toward the outer radius of the rotating body. This can be executed with any material that can be controlled in its balance under centripetal force. Said material can also be controlled by way of actuators.

In embodiments, an inertial rotor may be comprised of single or plurality of rigid or semi-rigid bodies symmetrically or asymmetrically joined in a contiguous or non-contiguous manner around a centroid of rotation wherein there exist facilities to control the mass distribution within the plane/planes of rotation and thereby the inertial characteristics of said rotation in a manner advantageous to the desired use.

In embodiments, the invention may constitute a rotatable body 302, as shown in FIG. 39, with a central mass reservoir 3904, a facility for controlling said mass 3908, and an outer mass reservoir 3904. Said reservoir can be either a single or plurality thereof. The initial condition is with the mass central to the axis of rotation wherein there is little additional energy required to begin rotation. As the body's rotation accelerates the mass may be moved toward the outer radius 3910 and 3912 through the mass control mechanism 3908, which may include but not limited to centripetal acceleration or mechanical or other actuators. The additional mass in rotation on the outer portion of the body provides a more stable rotation with greater relative inertia.

In embodiments, the control of the mass within the rotor radius may be achieved by way of variable mass flexible structures, e.g. weights/springs or memory plastic/foam or other suitable material known in the art, wherein the flexible structure, with an external element of the structure having greater mass than the internal element, is contained in an housed chamber extending axially through a single or plurality of solid bodies. As rotation and centripetal force increase the weight will extend the flexible structure to the maximal desired external radius of the rotating body. As detailed below these structures can include magnetic properties of use in both mass distribution control and field generation.

In embodiments, a contiguous substance is housed within a single or plurality of central portion/s of the rotor assembly wherein channels extend axially through a single or plurality of bodies attached to said central hub. The substance can be any substance that conforms to a given viscosity wherein the substance will shift mass toward the outward radius through the channels only under rotation while maintaining contiguity through the radial channels and central hub such that as centripetal force is reduced the viscosity (coherence) of the substance will draw the outer mass back into the central hub. As detailed below said material can also include magnetic properties of use in both mass distribution control and field generation.

In embodiments, a fluid may be allowed to cycle through a single or plurality of axial channels. Said fluid can be a standard dense fluid or can be fluids with special properties such as magneto-rheological fluids wherein the electro-magnetic properties of the fluids can be used to control mass distribution within the solid body under rotation. In such a rotating body the magnetic fluid, or other magnetically "enhanced" substances or structures such as those mentioned above, while being controllable in its distribution through the body by way of electromagnetic fields may also serve the purpose of generating useful electro-magnetic fields as the substance or structure achieves its maximal radial position. Such executions of the current invention can be achieved with either a fixed method of field generation or in combination with a single or plurality or counter-rotating bodies. In addition, mechanical actuators may be used to granularly control the mass distribution of the substance or structure under consideration.

Figure 40:
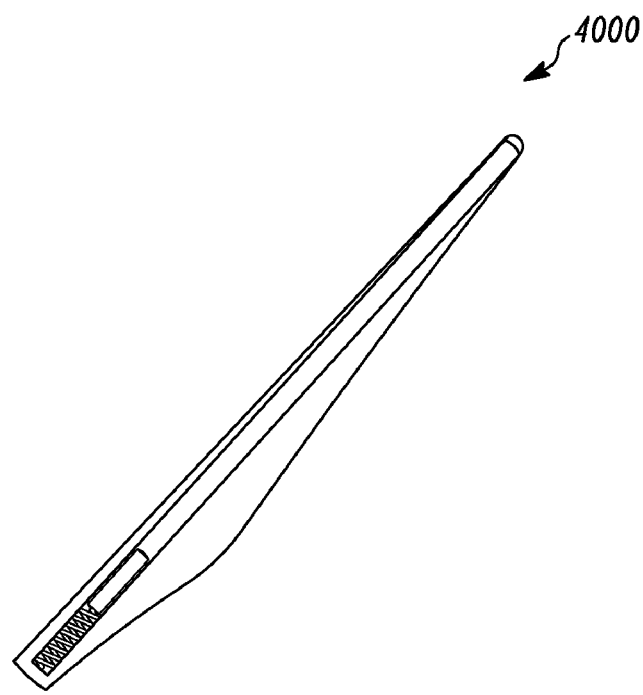
FIG. 40 depicts an initial position for a weighted structure.
Figure 41:
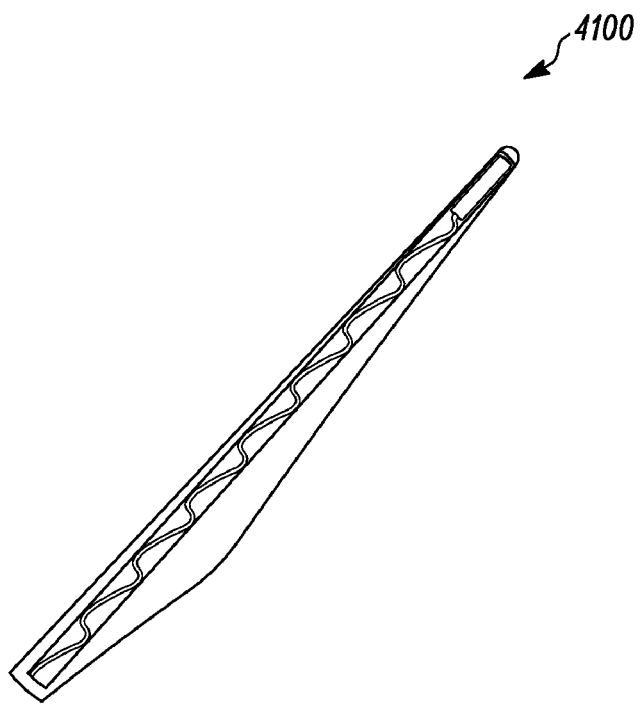
FIG. 41 depicts a weighted structure in a subsequent position.
Figure 42:
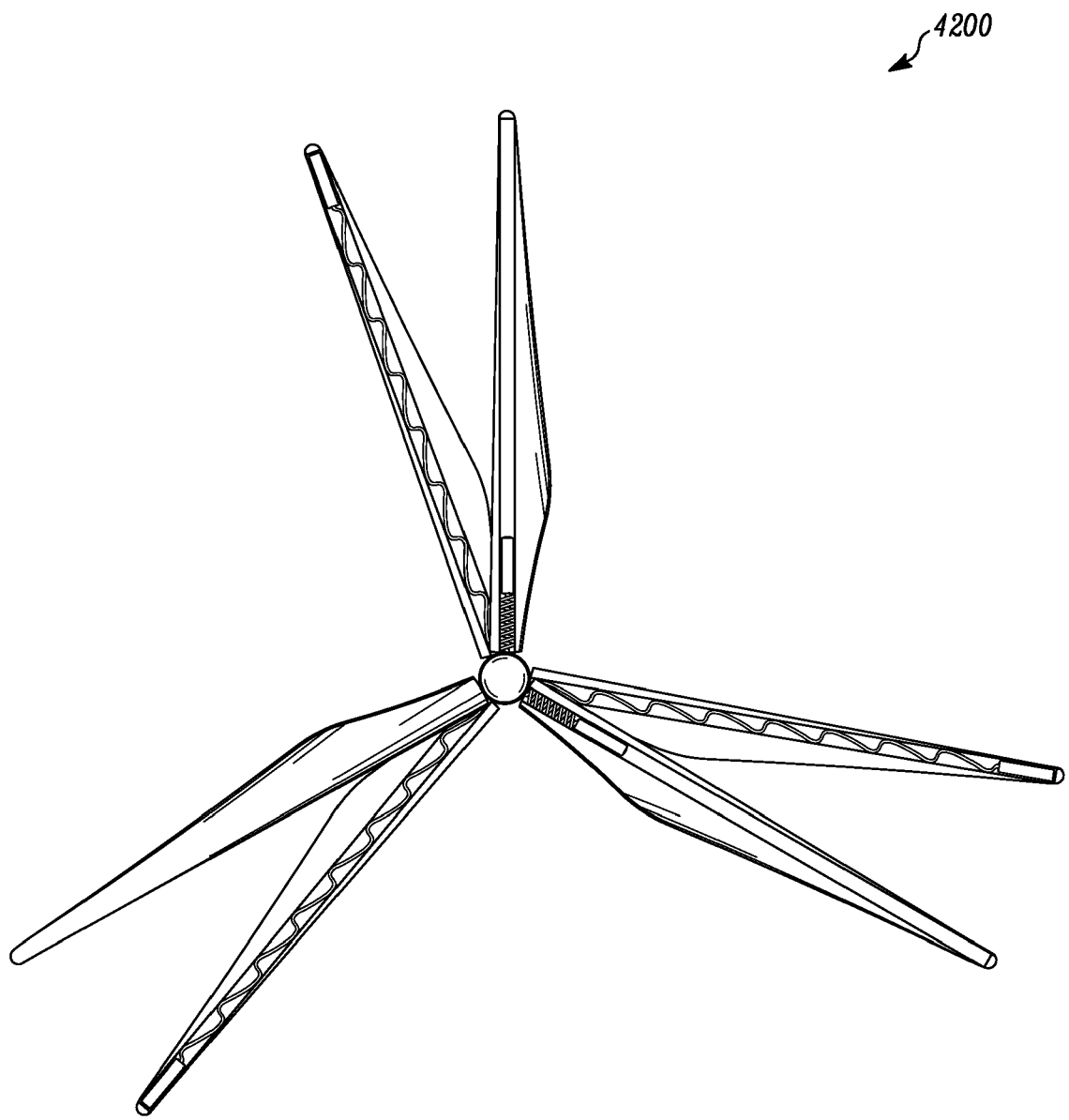
FIG. 42 depicts a 3 blade structure in motion.
Figure 43:
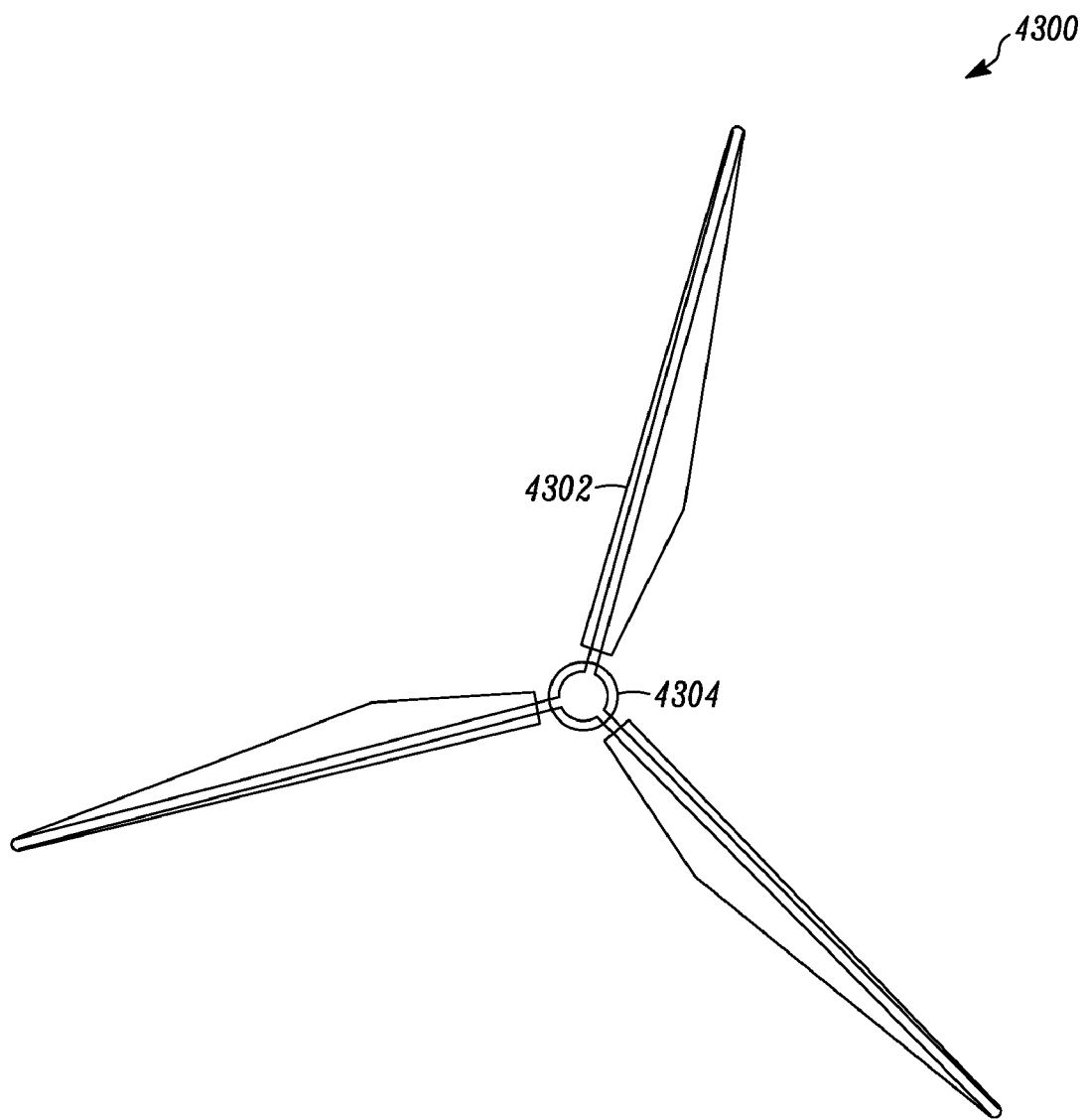
FIG. 43 depicts a 3 blade structure with mass control channel and central mass reservoir.

FIGS. 28-31 show embodiments relating to aspects of an inertial rotor as described herein, where FIG. 40 depicts a weighted structure initial position 4000, FIG. 41 depicts a weighted structure in a subsequent position 4100, FIG. 42 depicts a 3 blade structure in motion 4200, and FIG. 43 depicts a 3 blade structure 4300 with mass control channel 4302 and central mass reservoir 4304.

While the invention has been described in connection with certain preferred embodiments, other embodiments would be understood by one of ordinary skill in the art and are encompassed herein.

All documents referenced herein are hereby incorporated by reference.

What is claimed is:

1. A nozzle for use in wind energy conversion, the nozzle comprising:
    a throat coupled in fluid communication with a wind power generating turbine, the throat having a diameter;
    a leading edge distal from the throat; and
    an intake length between the leading edge of the nozzle and the throat of the nozzle, wherein the intake length is less than two times the diameter of the throat.

2. The nozzle of claim 1, further comprising a wind energy conversion module that includes the nozzle and a wind power generating turbine, the wind energy conversion module forming a modular portion of a modular wind energy system that includes a plurality of wind energy conversion modules.

3. The nozzle of claim 2, wherein the intake length is less than the diameter of the throat.

4. The nozzle of claim 2, wherein the plurality of wind energy conversion modules are networked together.

5. The nozzle of claim 1, further comprising a rotor within the throat.

6. The nozzle of claim 5, wherein the superstructure is shaped and sized for scalable modular networked interconnection of the energy conversion modules.

7. The nozzle of claim 1, further comprising at least one additional nozzle within a diffuser of the nozzle.

8. The nozzle of claim 1, where an intake leading edge angle is less than 45 degrees.

9. A nozzle for use in wind energy conversion, the nozzle comprising:
    a throat coupled in fluid communication with a wind power generating turbine, the throat having a diameter;
    a leading edge of the nozzle, the leading edge upstream from the throat;
    an intake between the leading edge of the nozzle and the throat of the nozzle, the intake having a length; and
    a diffuser downstream from the throat, the diffuser comprising a housing having a length, wherein a diameter of the diffuser is greater than the diameter of the throat, and wherein a ratio of the diffuser length to the intake length is greater than 5 to 1.

10. The nozzle according to claim 9, wherein the ratio of the diffuser length to the intake length increases with a ratio of the intake diameter to the throat diameter.

11. The nozzle according to claim 9, wherein a ratio of an area of the intake to an area of the throat is great than 2 to 1.

12. The nozzle according to claim 9, wherein a divergent angle of the diffuser is less than 4 degrees.

13. The nozzle according to claim 9, wherein a shape of the nozzle conforms to a polygonal truncation of a figure of revolution.

14. The nozzle according to claim 9, wherein the intake length is less than two times the diameter of the throat.

15. A nozzle, comprising:
    an intake having an intake length;
    a throat downstream of the intake;
    a diffuser comprising a housing and having a length, the diffuser downstream of the throat, wherein a diameter of the diffuser is greater than a diameter of the throat; and
    a plurality of vortex-forming aerodynamic shapes on an inner surface of the nozzle on at least one of the intake, the throat and the diffuser, wherein the plurality of vortex-forming aerodynamic shapes acts to increase throughput through the nozzle.

16. The nozzle according to claim 14, wherein the plurality of aerodynamic shapes conform to at least one bounded quadric function for n-structure surfaces.

17. The nozzle according to claim 15, wherein the plurality of aerodynamic shapes are selected from the group consisting of dimples, single-layer scallops, multi-layer scallops and scales.

18. The nozzle according to claim 14, wherein the inner surface of the nozzle includes a variable wall profile.

19. The nozzle according to claim 14, wherein the intake length extends from a leading edge of the nozzle to the throat of the nozzle, and wherein the intake length is less than two times the diameter of the throat.

20. The nozzle according to claim 14, wherein a ratio of the diffuser length to the intake length is greater than 5 to 1.

21. The nozzle according to claim 14, wherein a leading edge of the intake is scalloped according to a quadric function.

* * * * *

UNITED STATES PATENT AND TRADEMARK OFFICE
CERTIFICATE OF CORRECTION

PATENT NO.         : 8,089,173 B2
APPLICATION NO.    : 12/861263
DATED              : January 3, 2012
INVENTOR(S)        : Robert M. Freda It is certified that error appears in the above-identified patent and that said Letters Patent is hereby corrected as shown below:

Column 37, Line 1, "16. The nozzle according to claim 14, wherein the plurality" should read
-- 16. The nozzle according to claim 15, wherein the plurality --

Column 37, Line 8, "18. The nozzle according to claim 14, wherein the inner" should read
-- 18. The nozzle according to claim 15, wherein the inner --

Column 37, Line 10, "19. The nozzle according to claim 14, wherein the intake" should read
-- 19. The nozzle according to claim 15, wherein the intake --

Column 38, Line 3, "20. The nozzle according to claim 14, wherein a ratio of the" should read
-- 20. The nozzle according to claim 15, wherein a ratio of the --

Column 38, Line 5, "21. The nozzle according to claim 14, wherein a leading" should read
-- 21. The nozzle according to claim 15, wherein a leading --

Signed and Sealed this
Twenty-seventh Day of March, 2012

David J. Kappos
*Director of the United States Patent and Trademark Office*